US008463685B2

(12) United States Patent
Masuda

(10) Patent No.: US 8,463,685 B2
(45) Date of Patent: Jun. 11, 2013

(54) MASUDA STICK CHART GENERATION AND DISPLAY APPARATUS

(75) Inventor: Tokutaro Masuda, Kanagawa (JP)

(73) Assignee: Masuda Economic Research Institute Ltd., Kanagawa (JP)

( * ) Notice: Subject to any disclaimer, the term of this patent is extended or adjusted under 35 U.S.C. 154(b) by 638 days.

(21) Appl. No.: 12/665,932

(22) PCT Filed: Jan. 16, 2009

(86) PCT No.: PCT/JP2009/050588
§ 371 (c)(1),
(2), (4) Date: Dec. 21, 2009

(87) PCT Pub. No.: WO2010/082343
PCT Pub. Date: Jul. 22, 2010

(65) Prior Publication Data
US 2010/0185558 A1    Jul. 22, 2010

(51) Int. Cl.
*G06Q 40/00* (2012.01)
(52) U.S. Cl.
USPC .......... 705/36 R; 705/26; 705/38; 705/37
(58) Field of Classification Search
USPC ................... 705/26, 38, 37, 36 R
See application file for complete search history.

(56) References Cited

U.S. PATENT DOCUMENTS

| 7,574,659 | B2 * | 8/2009 | Szabo | 715/738 |
|---|---|---|---|---|
| 7,707,091 | B1 * | 4/2010 | Kauffman et al. | 705/36 R |
| 2003/0074292 | A1 | 4/2003 | Masuda | 705/35 |
| 2004/0225598 | A1 * | 11/2004 | Goldberg et al. | 705/38 |
| 2006/0100934 | A1 * | 5/2006 | Burr et al. | 705/26 |
| 2007/0156573 | A1 * | 7/2007 | Whitehurst et al. | 705/37 |

FOREIGN PATENT DOCUMENTS

| JP | 7-168806 | 7/1995 |
|---|---|---|
| JP | 1995-168806 | 7/1995 |
| JP | 2003-85381 A | 3/2003 |
| JP | 2003-118268 A | 4/2003 |
| JP | 2005-196497 A | 7/2005 |
| JP | 2006-039952 | 2/2006 |
| JP | 2006-244461 | 9/2006 |
| JP | 2006-244461 A | 9/2006 |
| JP | 2008-191974 A | 8/2008 |

OTHER PUBLICATIONS

Lock, S. N.; Fitter's Price Trend Looks Positive; New Straits Times (Kuala Lumpur); Nov. 10, 1997; 2 pages.*
ProQuest Serarch Report, diverge NEAR/10 , Mar. 4, 2013.*
Office Action for related JP App No. 2007-185034 dated Sep. 24, 2008.

* cited by examiner

*Primary Examiner* — Siegfried E Chencinski
(74) *Attorney, Agent, or Firm* — Ladas & Parry LLP

(57) ABSTRACT

A stock price chart generation and display apparatus is provided to make future predictions, easily represent prediction results in chart form, provide users with information needed to grasp buy/sell timing using the resulting chart, and make predictions without depending on data on price changes and the like. The stock price chart generation and display apparatus includes Masuda stick curve generating and drawing unit which generates and draws short-term, medium-term, and long-term Masuda stick curves related to daily sticks, weekly sticks, or monthly sticks; and Masuda future stick curve generating and drawing unit which generates and draws short-term, medium-term, and long-term Masuda future stick curves related to the daily sticks or weekly sticks, in which the Masuda future stick curve generating and drawing unit includes medium-term Masuda future daily stick curve generating and drawing unit which generates and draws a medium-term Masuda future daily stick string of a predetermined number of days after today.

11 Claims, 51 Drawing Sheets

Fig.4

| stock | first day | | | | | |
|---|---|---|---|---|---|---|
| | date | opening price | highest price | lowest price | closing price | trading volume |

| second day | | | | | |
|---|---|---|---|---|---|
| date | opening price | highest price | lowest price | closing price | trading volume |

| third day | | | | | |
|---|---|---|---|---|---|
| date | opening price | highest price | lowest price | closing price | trading volume |

| fourth day | | | | | |
|---|---|---|---|---|---|
| date | opening price | highest price | lowest price | closing price | trading volume |

| fifth day | | | | | |
|---|---|---|---|---|---|
| date | opening price | highest price | lowest price | closing price | trading volume |

⋮

| Nth day | | | | | |
|---|---|---|---|---|---|
| date | opening price | highest price | lowest price | closing price | trading volume |

Fig. 5 daily stick memory unit 101c-1

| stock | | third day | | | | fourth day | | | ... | Dth day | | | |
|---|---|---|---|---|---|---|---|---|---|---|---|---|---|
| name | date | average closing price | | | date | average closing price | | | | date | average closing price | | |
| | | short term | medium term | long term | | short term | medium term | long term | | | short term | medium term | long term |
| | | closing price of the day | | | | closing price of the day | | | | | closing price of the day | | | weekly stick memory unit 101c-2

| stock | | third week | | | | fourth week | | | ... | Wth week | | | |
|---|---|---|---|---|---|---|---|---|---|---|---|---|---|
| name | date | average closing price | | | date | average closing price | | | | date | average closing price | | |
| | | short term | medium term | long term | | short term | medium term | long term | | | short term | medium term | long term |
| | | closing price of the day | | | | closing price of the day | | | | | closing price of the day | | | monthly stick memory unit 101c-3

| stock | | third month | | | | fourth month | | | ... | Mth month | | | |
|---|---|---|---|---|---|---|---|---|---|---|---|---|---|
| name | date | average closing price | | | date | average closing price | | | | date | average closing price | | |
| | | short term | medium term | long term | | short term | medium term | long term | | | short term | medium term | long term |
| | | closing price of the day | | | | closing price of the day | | | | | closing price of the day | | |

Fig. 11

| date | closing price | average closing price for the last three days | calculation formula of average closing price for the last three days |
|---|---|---|---|
| 1 | 800 | | |
| 2 | 1000 | | |
| 3 | 1200 | 1000 | ( 800 + 1000 + 1200 ) / 3 |
| 4 | 1400 | 1200 | ( 1000 + 1200 + 1400 ) / 3 |
| 5 | 1600 | 1400 | ( 1200 + 1400 + 1600 ) / 3 |
| 6 | 1200 | 1400 | ( 1400 + 1600 + 1200 ) / 3 |
| 7 | 1100 | 1300 | ( 1600 + 1200 + 1100 ) / 3 |
| 8 | 1300 | 1200 | ( 1200 + 1100 + 1300 ) / 3 |
| 9 | 1500 | 1300 | ( 1100 + 1300 + 1500 ) / 3 |
| 10 | 1700 | 1500 | ( 1300 + 1500 + 1700 ) / 3 |

(b) second color determination process (a) first color determination process

Fig.39
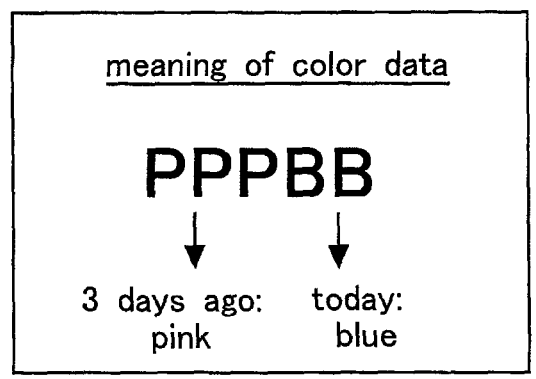
(a)
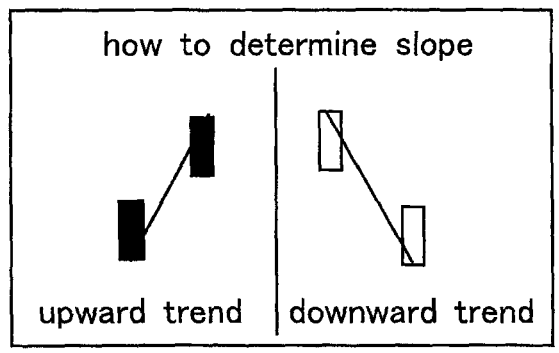
(b)
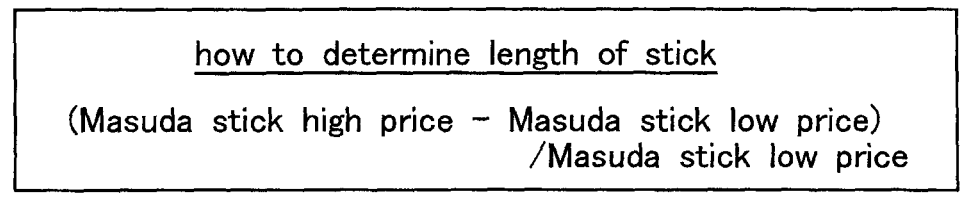
(c)

MASUDA STICK CHART GENERATION AND DISPLAY APPARATUS

CROSS-REFERENCE TO RELATED APPLICATIONS

This application is the U.S. National Stage of International Patent Application No. PCT/JP2009/050588, filed on Jan. 16, 2009, the disclosure of which is incorporated herein by reference.

TECHNICAL FIELD

The present invention relates to a Masuda stick chart generation and display apparatus which expresses price trends of objects traded on the market, such as stocks, bonds, currencies, and commodities, using three Masuda stick curves, namely, a short-term Masuda stick curve, a medium-term Masuda stick curve, and a long-term Masuda stick curve corresponding to daily sticks, weekly sticks, and monthly sticks, respectively.

BACKGROUND ART

The present inventor has proposed a stock price chart (generally referred to as a "Masuda stick chart") which is easy-to-read even for beginners and suitable for prediction of stock price movements (Patent Document 1). Specifically, with the Masuda stick chart, one unit (daily stick, weekly stick, or monthly stick) along a time axis of the stock price chart is represented by a colored stick (vertical bar) whose color corresponds to an increase or decrease trend and whose upper and lower ends are defined by a pair of preceding and succeeding moving average prices.

Also, the present inventor has proposed a method for grasping trends by classifying a stock price chart into six intervals along the time axis based on magnitude relationship among short-term, medium-term, and long-term moving average prices. According to this classification method (generally referred to as "six-color pattern classification"), a stock price chart of any stock can be classified into pattern-A interval which corresponds to the start of a rising trend (short-term>long-term>medium-term), pattern-B interval which corresponds to the rising trend (short-term>medium-term>long-term), pattern-C interval which corresponds to a collapse of the rising trend (medium-term>short-term>long-term), pattern-D interval which corresponds to the start of a falling trend (medium-term>long-term>short-term), pattern-E interval which corresponds to the falling trend (long-term>medium-term>short-term), and pattern-F interval which corresponds to the end of the falling trend (long-term>short-term>medium-term) (see Patent Document 2).

The use of the six-color pattern classification allows even beginners and the like to earn profits relatively easily from stock trading, for example, by placing a "buy order" in a pattern-F interval which corresponds to the end of a falling trend and placing a "sell order" in a pattern-C interval which corresponds to a collapse of a rising trend.

However, this useful feature of six-color pattern classification alone does not always ensure profits from stock trading. This is because the six-color pattern classification does not always apply in a regular manner and occurrence of the six color patterns can often get out of order, resulting in misjudgment of buy timing or sell timing. Therefore, in order to capture the buy timing or sell timing reliably, it is necessary not only to rely on six color patterns, but also to grasp relations among short-term, medium-term, and long-term sticks (lengths of individual sticks, divergences among the sticks, a distance from a closing price, and the like). This has a problem in being very burdensome for beginners, resulting in poor usability.

Patent Document 1: Japanese Patent Laid-Open No. 2003-118268
Patent Document 2: Japanese Patent Laid-Open No. 2003-85381

SUMMARY

As a measure to solve the above problem, it is conceivable to enable future predictions by incorporating knowledge of experts in a computer and thereby implementing sophisticated judgments needed to seize buy timing or sell timing and concretely depict and thereby visualize results of the future predictions in a future area of a chart. This technique allows even beginners to easily acquire information needed for trading by simply observing display in the future area of the chart.

Such stock price charts can be of various types, including a candlestick chart which uses instantaneous price information such as opening prices, high prices, low prices, and closing prices; a moving average chart which uses moving average prices based on a predetermined average time; and a chart which uses percentages of rises and falls. With these charts, there are several problems in representing predicted future prices in chart form.

Specifically, for example, even if one tries to represent predicted future prices in chart form using candlesticks, candlesticks cannot be drawn unless opening prices, high prices, low prices, and closing prices are known, but it is virtually impossible to predict these values accurately. Thus, when a candlestick chart is used to predict future, it is possible only to draw an arrow indicating a rising trend or falling trend at the most, and it is not always possible to provide useful information to users.

On the other hand, in the case of a chart which uses a moving average line, since the moving average line can be drawn as long as moving average prices can be predicted, it is relatively easy to represent results of future predictions in chart form but it is not always easy to accurately predict future based solely on changes in moving average prices of the past. Also, since the moving average curve itself cannot exactly indicate a good time to sell or buy, even if predicted future prices can be expressed in the form of moving average prices, it is not always possible to thereby provide useful information to users.

Also, regarding a chart which expresses the extent of rises or falls in percentage terms, since ranges of variation are limited by a value of 100%, in the case of stocks and the like with a particularly wide range of variation, it is difficult to grasp buy/sell timing in a high price zone or bottom price zone. Thus, this type of chart has a drawback in that although it is relatively easy to make future predictions, it is difficult for users to make judgments in a high price zone or bottom price zone.

Thus, conventionally various stock price charts are available, including those based on instantaneous prices, those based on average prices, and those based on percentage values, but when one tries to introduce a technique for displaying predicted prices on these chart, a problem is pointed out: namely, all the charts have merits and demerits and are not always able to provide useful information to users.

In addition, conventional stock price prediction techniques generally involve typifying past changes in stock prices and making future predictions by applying the typified past changes to current state of stock prices. Consequently, a problem is pointed out: namely, it is necessary to accumulate considerable amounts of past data to make appropriate future predictions according to circumstances on each occasion, and there are still limits, in principle, to accurate stock price predictions because of various factors which can cause stock price fluctuations.

The present invention has been made in view of the above problems and has an object to provide a chart generation and display apparatus which can make exact future predictions, can easily represent prediction results in chart form, can provide users with exact information needed to grasp buy/sell timing using the resulting chart, and can make predictions without depending on past data on price changes and the like.

Other features, objects, operations, and advantages of the present invention will become readily apparent to those skilled in the art upon reading the following description of the present invention.

BRIEF DESCRIPTION OF THE DRAWINGS

FIG. 4 is a diagram showing an example of stock price information;

FIG. 5 is a diagram showing contents of data stored in a data storing unit;

FIG. 11 is a diagram showing an example of how average closing prices are calculated;

FIGS. 39(a) to 39(c) are explanatory diagrams illustrating various rules for creation of future sticks;

DESCRIPTION OF SYMBOLS

Figure 1:
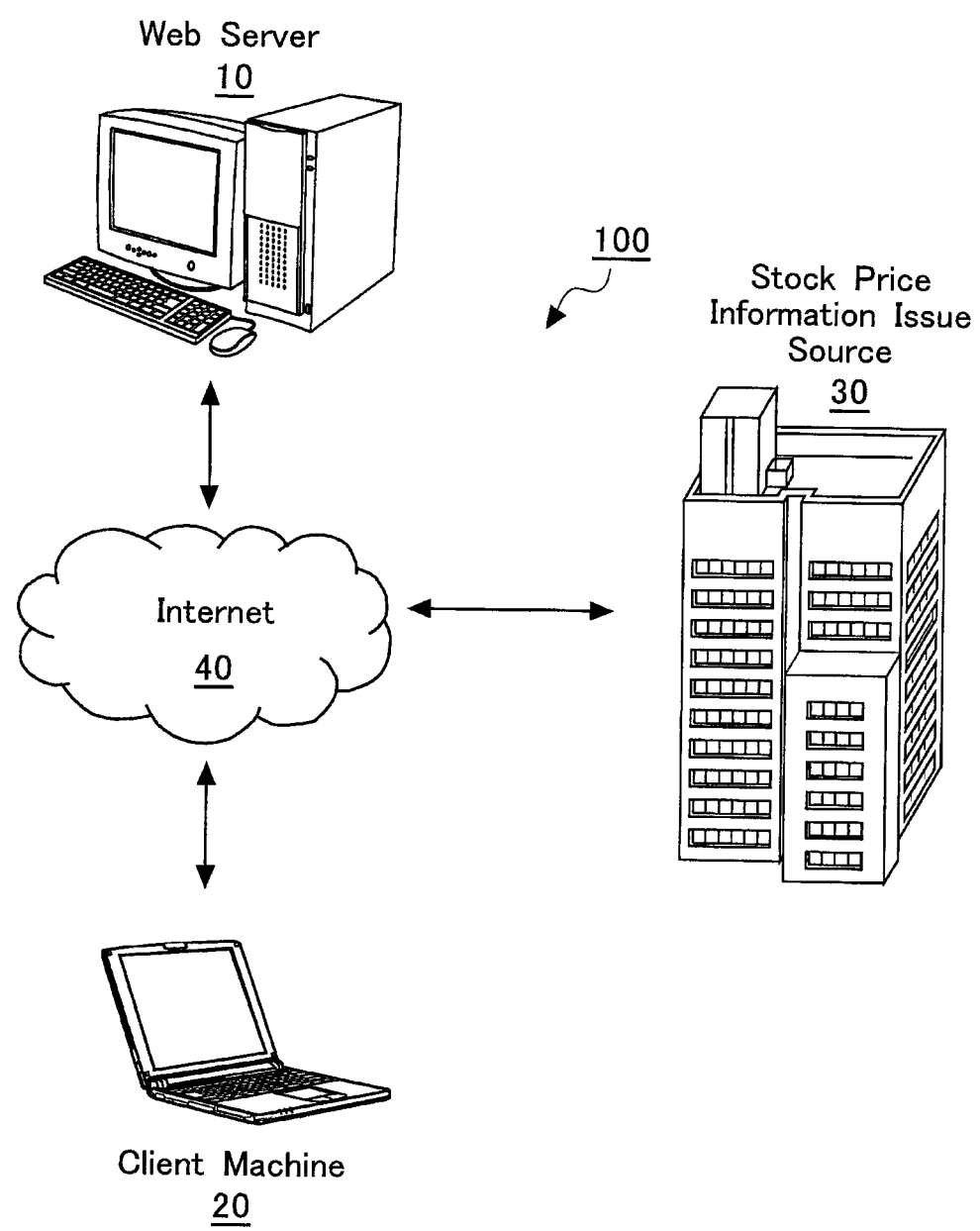
FIG. 1 is a block diagram of a stock price chart generation system to which the present invention is applied.

10 Server apparatus
20 Client machine
30 Stock price information issuing source
40 Internet
100 Stock price chart display system
101 Main body unit
101a Processor
101b Stock price storing unit (database)
101c Stick data storing unit
101c-1 Daily stick storing unit
101c-2 Weekly stick storing unit
101c-3 Monthly stick storing unit
102 Input unit
102a Keyboard
102b Transmission and reception unit
102b-1 Cache memory
103 Output unit
103a Display device
103b Printer device
201 Main body unit
201a Processor
201b Stick data storing unit
201b-1 Daily stick storing unit
201b-2 Weekly stick storing unit
201b-3 Monthly stick storing unit
202 Input unit
202a Keyboard
202b Transmission and reception unit
202b-1 Cache memory
203 Output unit
203a Display device
203b Printer device
MA1 Average price of three weeks closest to reference week
MA2 Average price of thirteen weeks closest to reference week
MA3 Average price of twenty-six weeks closest to reference week
C1 Short-term Masuda daily stick curve
C2 Medium-term Masuda daily stick curve
C3 Long-term Masuda daily stick curve
C1' Short-term Masuda future daily stick curve
C2' Medium-term Masuda future daily stick curve
C3' Long-term Masuda future daily stick curve
L1 Look-ahead line
L2 3-day line
W Future stick display window
t0 Current day
t1, t2 to tn One day ago, and two days to n days ago
t1', t2' to tn' One day ahead, and two days to n days ahead

DETAILED DESCRIPTION

The technical problems described above can be solved by a Masuda stick chart generation and display apparatus configured as described below.

Specifically, as a precondition, the Masuda stick chart generation and display apparatus expresses price trends of objects traded on the market, such as stocks, bonds, currencies, and commodities, using three Masuda stick curves, namely, a short-term Masuda stick curve, a medium-term Masuda stick curve, and a long-term Masuda stick curve corresponding to daily sticks, weekly sticks, and monthly sticks, respectively.

The Masuda stick chart generation and display apparatus includes basic data storing means, Masuda stick curve generating and drawing means, and Masuda future stick curve generating and drawing means.

The basic data storing means stores basic data including a series of daily price strings, weekly price strings, and monthly price strings going back a predetermined period from the present point in time, and a series of short-term moving average price strings, medium-term moving average price strings, and long-term moving average price strings related, respectively, to the series of daily price strings, weekly price strings, and monthly price strings, as well as a pair of neighboring average price strings which define upper and lower ends of daily sticks, weekly sticks, and monthly sticks, and stick color values which represent distinctions between dark and light colors for the daily sticks, weekly sticks, and monthly sticks (i.e., a stick in an upward trend is shown, for example, in pink and a stick in a downward trend is shown, for example, in blue).

Also the Masuda stick curve generating and drawing means has a capability to generate and draw short-term, medium-term, and long-term Masuda stick curves related to daily sticks, weekly sticks, or monthly sticks based on the basic data stored in the basic data storing means.

Furthermore, the Masuda future stick curve generating and drawing means has a capability to generate and draw short-term, medium-term, and long-term Masuda future stick curves related to the daily sticks or weekly sticks based on the basic data stored in the basic data storing means. What is particularly important is that the Masuda future stick curve generating and drawing means includes medium-term Masuda future daily stick curve generating and drawing means which generates and draws a medium-term Masuda future daily sticks of a predetermined number of future days.

That is, based on the basic data stored in the basic data storing means, the Masuda future stick curve generating and drawing means can not only draw short-term, medium-term, and long-term Masuda stick curves related to daily sticks, weekly sticks, or monthly sticks, but also generate and draw short-term, medium-term, and long-term Masuda future stick curves related to daily sticks or weekly sticks. In particular, a medium-term Masuda future daily stick string of a predetermined number of future days is generated and drawn as a Masuda future stick curve.

With this configuration, since in a Masuda stick chart, the short-term Masuda daily stick curve generally represents one week of economic activities, the medium-term Masuda daily stick curve represents one month of economic activities, and the long-term Masuda daily stick curve often represents one quarter of economic activities, the use of the medium-term Masuda daily stick curve which best reflects trends of economic activities out of the three stick curves allows changes in the trend of price movements to be displayed clearly in a future stick area of the Masuda stick chart.

In addition, since the medium-term Masuda future daily stick curve allows a closing price to be calculated backward stably from a pair of constituent moving average prices, it is possible to accurately reproduce the short-term future daily stick curve of the Masuda stick chart.

According to a preferred embodiment of the present invention, the medium-term Masuda future daily stick curve generating and drawing means may include first medium-term Masuda future daily stick string generating and drawing means which determines a divergence value string of divergences between a daily price of today and daily prices of days earlier, by the number of days in a medium-term interval, than a predetermined number of future days, determines a breakdown of the divergence value string by polarity, and generates and draws a medium-term Masuda future daily stick string for a predetermined number of days after today based on determination as to which polarity a majority belongs and according to a predetermined rule.

With this configuration, since a medium-term Masuda future daily stick string of a predetermined number of future days is generated according to a predetermined rule and based on the divergences between a daily price of today and daily prices of days earlier, by the number of days in a medium-term interval, than a predetermined number of future days, a medium-term Masuda future daily stick curve with a relatively high prediction accuracy can be drawn accurately.

According to another preferred embodiment, the medium-term Masuda future daily stick curve generating and drawing means may include second medium-term Masuda future daily stick string generating and drawing means which generates a medium-term Masuda future daily stick string for a predetermined number of days after today according to a predetermined rule if a change in stick color value is detected with a first stick color value continuing for a predetermined number of times or more and then a second stick color value continuing for a predetermined number of times or more up to today in a medium-term Masuda daily stick curve for a predetermined number of most recent days.

With this configuration, when there is a change from a state in which the first stick color continues for a predetermined number of times to a state in which the second stick color continues for a predetermined number of times or more up to the latest daily stick, since there is a strong tendency for the second stick color to continue subsequently due to the nature of the medium-term Masuda future daily stick curve, it becomes possible to draw a medium-term Masuda future daily stick right away without checking a divergence of daily process between each pair of days separated by the number of days equivalent to the medium term, making it possible to simplify a drawing process accordingly.

According to another preferred embodiment, the Masuda stick chart generation and display apparatus may further include a correction means which determines a divergence value string of divergences between a daily price of today and daily prices of days earlier, by the number of days in a medium-term interval, than a predetermined number of near days, and corrects a medium-term Masuda future daily stick string for the predetermined number of near days after today based on determination as to whether absolute values of the divergences in the divergence value string exceed a predetermined value and according to a predetermined rule.

With this configuration, while referring generally to the divergence of daily prices between each pair of days separated by the number of days equivalent to the medium term, the correction means corrects medium-term Masuda future daily sticks for a predetermined number of nearest future days using prediction results with higher accuracy, making it possible to generally improve the accuracy of the medium-term Masuda future daily stick curve.

According to another preferred embodiment, the Masuda future stick curve generating and drawing means may further include short-term Masuda future daily stick curve generating and drawing means which generates and draws a short-term Masuda future daily stick string for a predetermined number of days after today based on the medium-term Masuda future daily stick string generated by the medium-term Masuda future daily stick curve generating and drawing means for a predetermined number of days after today.

With this configuration, not only a medium-term Masuda future daily stick string, but also a short-term Masuda future daily stick string is drawn clearly in a future area of the Masuda stick chart, allowing users to know future changes in both short-term and medium-term Masuda future daily stick strings with high reliability and thereby make future predictions more exactly by considering the relations between the short-term and medium-term Masuda future daily stick strings.

According to another preferred embodiment, the short-term Masuda future daily stick curve generating and drawing means may include daily price string preliminary-calculation means, short-term moving average price string preliminary-calculation means, stick color determination means, and short-term Masuda future daily stick string generating and drawing means.

The daily price string preliminary-calculation means preliminarily calculates a daily price string for the predetermined number of days after today based on the medium-term moving average price string for the predetermined number of days after today calculated backward from the medium-term Masuda future daily stick string generated by the medium-term Masuda future daily stick curve generating and drawing means for the predetermined number of days after today.

The short-term moving average price string preliminary-calculation means preliminarily calculates a short-term moving average price string for the predetermined number of days after today based on the daily price string calculated by the daily price string preliminary-calculation means for the predetermined number of days after today.

The stick color determination means determines a stick color of tomorrow's short-term Masuda future daily stick based on a result of a magnitude comparison between today's daily price and today's short-term moving average price and according to a predetermined rule.

The short-term Masuda future daily stick string generating and drawing means draws a short-term Masuda future daily stick string for the predetermined number of days after today according to a predetermined rule and based on a result of determination as to whether or not stick colors of all of a predetermined number of sticks in the nearest days after today in the short-term Masuda future daily stick string calculated based on the short-term moving average price string obtained by the short-term moving average price string preliminary-calculation means coincide with the stick color of tomorrow's short-term Masuda future daily stick determined by the stick color determination means.

With this configuration, the short-term moving average price string is preliminarily calculated for the predetermined number of future days based on the daily price string calculated by the daily price string preliminary-calculation means for the predetermined number of future days, dark/light color determination means determines whether tomorrow's short-term Masuda future daily stick will be of a dark color or light color, and the short-term Masuda future daily stick string containing the predetermined number of future sticks is drawn based on a result of determination as to whether or not all of the predetermined number of sticks in the nearest future days in the short-term Masuda future daily stick string coincide with tomorrow's short-term Masuda future daily stick in terms of a dark or light color determined by the dark/light color determination means. This further improves the prediction accuracy of the predetermined number of future sticks in the resulting short-term Masuda future daily stick string.

According to another preferred embodiment, the Masuda future stick curve generating and drawing means may further include long-term Masuda future daily stick string generating and drawing means which generates and draws a long-term Masuda future daily stick string for a predetermined number of days after today on an extension line of a long-term Masuda daily stick curve for a predetermined number of days before today.

With this configuration, a medium-term Masuda future daily stick curve, short-term Masuda future daily stick curve, and long-term Masuda future daily stick curve can be drawn in the future area of the Masuda stick chart.

According to another preferred embodiment, the long-term Masuda future daily stick string generating and drawing means may include change calculation means, long-term moving average price string calculation means, long-term Masuda future daily stick string drawing means, and correction means.

The change calculation means calculates a change per day on a straight line joining the today's long-term moving average price and the long-term moving average price a predetermined number of days earlier than today.

The long-term moving average price string calculation means calculates a long-term moving average price string of daily sticks for a predetermined number of days after today based on the change per day calculated by the change calculation means and on the today's long-term moving average price.

The long-term Masuda future daily stick string drawing means generates and draws a long-term Masuda future daily stick string for a predetermined number of future days based on the long-term moving average price string for the predetermined number of future days calculated by the long-term moving average price string calculation means.

The correction means determines a divergence value string of divergences between a daily price of today and daily prices of days earlier, by the number of days in a long-term interval, than a predetermined number of near days, and corrects a long-term Masuda future daily stick string for the predetermined number of nearest days after today based on determination as to whether absolute values of the divergences exceed a predetermined value and according to a predetermined rule.

With this configuration, it is possible to generate short-term, medium-term, and long-term Masuda future daily stick strings, and especially, the long-term Masuda future daily stick string with high accuracy.

According to another preferred embodiment, the Masuda future stick curve generating and drawing means may further include Masuda future weekly stick string generating and drawing means which generates and draws a short-term Masuda future weekly stick string, a medium-term Masuda future weekly stick string, and a long-term Masuda future weekly stick string for a predetermined number of future weeks.

With this configuration, Masuda future weekly stick curves can be drawn, as required, instead of Masuda future daily stick curves in the future stick area of the Masuda stick chart.

According to another preferred embodiment, the Masuda future weekly stick string generating and drawing means may include first polarity-of-divergence calculation means, second polarity-of-divergence calculation means, stick color determination means, short-term Masuda future weekly stick drawing means, medium-term Masuda future weekly stick drawing means, and long-term Masuda future weekly stick string drawing means.

The first polarity-of-divergence calculation means determines polarity of divergences between a weekly price of this week and weekly prices of weeks earlier, by the number of weeks in a short-term interval, than a predetermined number of weeks after this week.

The second polarity-of-divergence calculation means determines polarity of divergences between the weekly price of this week and weekly prices of weeks earlier, by the number of weeks in a medium-term interval, than a predetermined number of weeks after this week.

The stick color determination means determines stick color of a short-term future weekly stick of the next week according to a predetermined rule and based on a determination result of magnitude relationship between the weekly price of this week and the weekly price of a week earlier, by the number of weeks in the short-term interval, than the next week.

The short-term Masuda future weekly stick drawing means collates a series of polarity-of-divergence strings calculated by the first polarity-of-divergence calculation means with typical patterns prepared in advance and draws short-term Masuda future weekly sticks for the predetermined number of weeks after this week based on results of the collation and according to a predetermined rule.

The medium-term Masuda future weekly stick drawing means draws medium-term Masuda future weekly sticks for the predetermined number of weeks after this week according to a predetermined rule and based on results of determination as to which polarity is greater in number, positive or negative, in a breakdown, by polarity, of divergences in the series of polarity-of-divergence strings calculated by the second polarity-of-divergence calculation means.

Furthermore, the long-term Masuda future weekly stick string drawing means calculates a change per week on a straight line joining this week's long-term moving average price and the long-term moving average price a predetermined number of weeks earlier than this week, calculates a long-term moving average price string for the predetermined number of weeks after this week based on the calculated change per week and this week's long-term moving average price, and generates and draws a long-term Masuda future weekly stick string for the predetermined number of weeks after this week based on the calculated long-term moving average price string.

In this way, the Masuda stick chart generation and display apparatus according the present invention can draw not only regular conventional short-term, medium-term, and long-term Masuda stick curves, but also short-term, medium-term, and long-term Masuda future daily stick and weekly stick curves in the future area. Consequently, users can appropriately grasp buy/sell timing of objects traded on the market, such as stocks, bonds, currencies, and commodities, with reference to the objects' future price movements illustrated actually.

Viewed from another angle, needless to say, the Masuda stick chart generation and display apparatus is considered to be a computer program which causes a computer to function as the Masuda stick chart generation and display apparatus.

According to the present invention, in the Masuda stick chart which expresses price trends of objects traded on the market, such as stocks, bonds, currencies, and commodities, using three Masuda stick curves, namely, a short-term Masuda stick curve, a medium-term Masuda stick curve, and a long-term Masuda stick curve corresponding to daily sticks, weekly sticks, and monthly sticks, respectively, a Masuda future stick chart display area is newly provided to display short-term, medium-term, and long-term Masuda future daily stick and weekly stick curves as required, allowing users to appropriately grasp future price trends of the objects and thereby recognize buy/sell timing of the objects.

A preferred embodiment of a Masuda stick chart generation and display apparatus according to the present invention will be described in detail below with reference to the accompanying drawings.

A block diagram in FIG. 1 conceptually shows a configuration of a client-server stock price chart display system which is an embodiment of the present invention.

As shown in FIG. 1, the stock price chart display system 100 includes a server apparatus (Web server) 10 and client machine (e.g., personal computer, PDA, or cell phone) 20 which can be interconnected via the Internet 40. Incidentally, in FIG. 1, reference numeral 30 denotes a stock price information issuing source such as a stock exchange.

Figure 2:
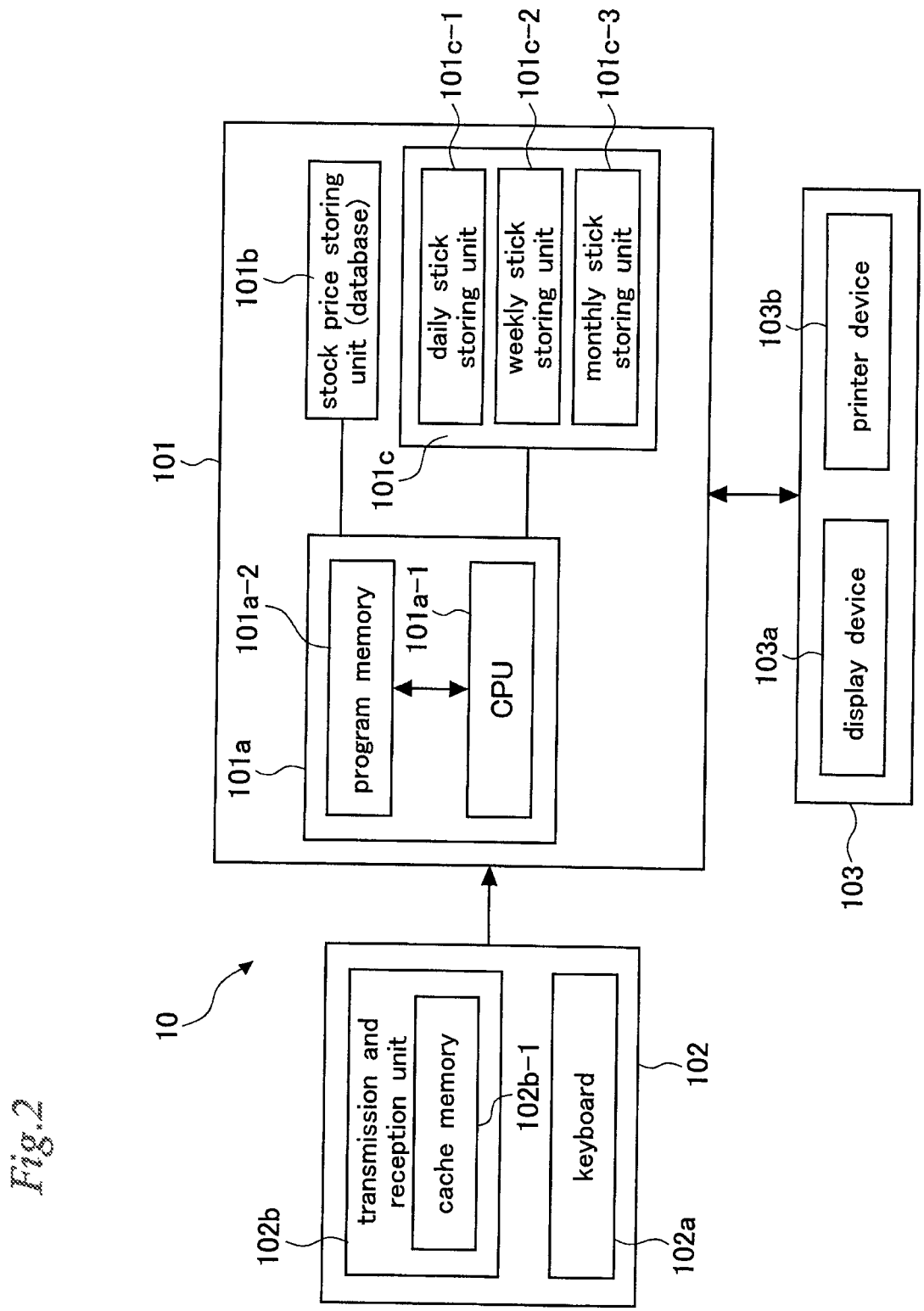
FIG. 2 is a block diagram showing a configuration of a server apparatus.

FIG. 2 is a block diagram showing a configuration of the server apparatus 10. As shown in FIG. 2, the server apparatus 10 includes a main body unit 101, input unit 102, and output unit 103.

The main body unit 101 includes a central processor 101$a$, stock price storing unit 101$b$, and stick data storing unit 101$c$.

The central processor 101$a$ includes a program memory 101$a$-2 which stores computer programs needed in order to realize functions of the server apparatus, and a CPU 101$a$-1 which realizes the various functions of the server apparatus by reading and executing, as required, the computer programs stored in the program memory 101$a$-2. Examples of the computer programs stored in the program memory 101$a$-2 include various computer programs described later with reference to flowcharts in FIG. 6 and later.

In this example, the stock price storing unit 101$b$ is realized by partial allocation a storage area of a hard disk provided in the server apparatus 10. The stock price storing unit 101$b$ stores a database which contains stock price information about each of a predetermined group of stocks for a most recent predetermined maximum period. As described in detail later, the database is constructed based on stock price information (including approximately 1,660 stocks in the first section of the Tokyo Stock Exchange) acquired by a transmission and reception unit 102$b$ of the input unit 102 from the stock price information issuing source 30 via the Internet.

An example of stock price information stored in the database of the stock price storing unit 101$b$ is shown in FIG. 4. As shown in FIG. 4, in the stock price information, "date" on which the stock price information was acquired, "opening price", "highest price", "lowest price", "closing price", and "trading volume" of each stock are stored as one day's data of the given stock by being associated with each other. The "date" is referred to in order to identify stock prices (closing prices) on the current day, the previous day, and two days ago in calculating a short-term average closing price, for example, in the case of daily sticks.

According to the present embodiment, daily stick (closing price) data for the latest 450 days is used to create daily sticks, weekly stick (closing price) data for the latest 192 are used to create weekly sticks, and monthly stick (closing price) data for the latest 176 months are used to create monthly sticks. For that, the stock price storing unit 101$b$ stores stock price information of at least a predetermined maximum number of days (N days) required to perform arithmetic operations.

The stick data storing unit 101$c$ includes a daily stick storing unit 101$c$-1 which stores stick data needed to draw short-term, medium-term, and long-term Masuda stick curves of daily sticks, a weekly stick storing unit 101$c$-2 which stores stick data needed to draw short-term, medium-term, and long-term Masuda stick curves of weekly sticks, and monthly stick storing unit 101$c$-3 which stores stick data needed to draw short-term, medium-term, and long-term Masuda stick curves of monthly sticks.

Contents of the stick data stored in the daily stick storing unit 101$c$-1, weekly stick storing unit 101$c$-2, and monthly stick storing unit 101$c$-3 of the stick data storing unit 101$c$ are shown in FIG. 5.

As shown in FIG. 5, for each stock, the short-term, medium-term, and long-term average closing prices on the third to Dth days (assuming that the Dth day is the latest day) and the closing prices (current closing prices) on the respective days are stored in the daily stick storing unit 101$c$-1 together with the dates of the respective days.

The "date" corresponds to a day which serves as a basis for calculation of daily stick data. For example, when a short-term average closing price of daily sticks is calculated, if the third day (current day) is July 10, stock prices (closing prices) of July 9 and July 8 are required for arithmetic operation, and July 10 on which the short-term average closing price is calculated is stored as the date.

The reason why the data begins with the "third day" is that average closing prices of two days before the current day are required to calculate a short-term average closing price as daily stick data. For the same reason, medium-term average closing prices are saved beginning with the 25th day and long-term average closing prices are saved beginning with the 75th day.

For each stock, the short-term, medium-term, and long-term average closing prices of the third to Wth weeks and the closing prices of the respective weeks (closing prices on the last days of the respective weeks) are stored in the weekly stick storing unit 101$c$-2 together with the dates.

The "date" corresponds to a day which serves as a basis for calculation of weekly stick data. For example, when a short-term average closing price of weekly sticks is calculated, if the last day in the third week is July 10, stock prices (closing prices) on July 2 in the last week and June 25 in the week before the last are required for arithmetic operation, and July 10 on which the average closing price is calculated is stored as the date.

The reason why the data begins with the "third week" is that average closing prices of two weeks before the current week are required to calculate a short-term average closing price as weekly stick data. For the same reason, medium-term average closing prices are saved beginning with the 13th week and long-term average closing prices are saved beginning with the 26th week.

For each stock, the short-term, medium-term, and long-term average closing prices of the third to Mth months and the closing prices of the respective months (closing prices on the last days of the respective months) are stored in the monthly stick storing unit 101$c$-3 together with the dates.

The "date" corresponds to a day which serves as a basis for calculation of monthly stick data. For example, when a short-term average closing price of monthly sticks is calculated, if the last day in the third month is July 31, stock prices (closing prices) on June 30 in the last month and May 31 in the month before the last are required for arithmetic operation, and July 31 on which the average closing price is calculated is stored as the date.

The reason why the data in the monthly stick storing unit begins with the "third month" is that average closing prices of two months before the current month are required to calculate a short-term average closing price as monthly stick data. For the same reason, medium-term average closing prices are saved beginning with the 12th month and long-term average closing prices are saved beginning with the 36th month.

Returning to FIG. 2, the input unit 102 includes a keyboard 102a, the transmission and reception unit 102b, and a pointing device such as a mouse (not shown). The keyboard 102a is used to register company information and to enter stock price information of the company as required, as well as to enter the name of the stock (or stock code, for convenience) when displaying a chart of a desired stock on a display device 103a serving as the output unit 103 (described later).

As many as approximately 4,800 stocks including OTC stocks are handled by the stock price information issuing source 30. If all stock price information about these stocks are entered manually via the keyboard 102a after three o'clock in the afternoon when closing prices are announced, a great deal of time and effort is required. Besides, input errors are unavoidable. Therefore, the transmission and reception unit 102b is provided to capture stock price information online from the stock price information issuing source 30 such as a stock exchange via the Internet. A cache memory 102b-1 is used as a temporary memory to store the stock price information captured via the transmission and reception unit 102b.

The output unit 103 includes the display device 103a and a printer device 103b connected to the main body unit 101. In accordance with programs stored in the program memory 101a-2 of the processor 101a, the display device 103a and printer device 103b respectively display and print out an input screen used to enter stock prices and information about the stock prices via the input unit 102 as well as display and print out short-term, medium-term, and long-term Masuda stick curves of daily sticks, weekly sticks, and monthly sticks based on the daily stick data, weekly stick data, and monthly stick data stored in the stick data storing unit 101c.

Operations for displaying and printing out the Masuda stick curves on the server apparatus are basically the same as on the client machine, and thus operations on the client machine will be described.

Next, the client machine (e.g., a personal computer, PDA, or cell phone) 20 will be described. A block diagram illustrating a configuration of the client machine is shown in FIG. 3.

Figure 3:
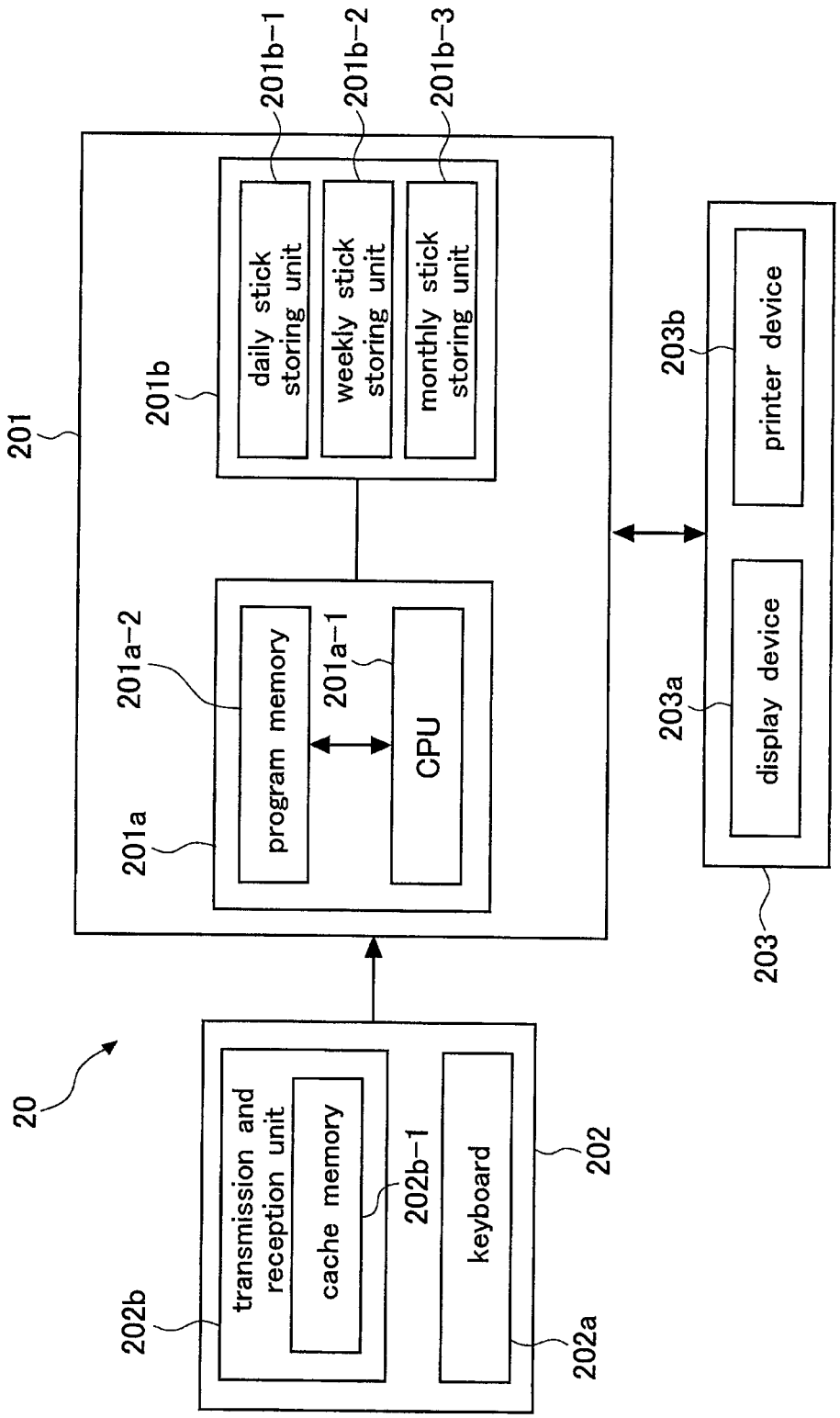
FIG. 3 is a block diagram showing a configuration of a client machine.

As shown in FIG. 3, the client machine 20 also includes a main body unit 201, input unit 202, and output unit 203.

The main body unit 201 includes central processor 201a and stick data storing unit 201b. The central processor 201a includes a program memory 201a-2 which stores computer programs needed in order to realize functions of the client apparatus, and a CPU 201a-1 which realizes the various functions of the client machine by reading and executing, as required, the computer programs stored in the program memory 201a-2. Examples of the computer programs stored in the program memory 201a-2 include various computer programs described later with reference to flowcharts.

The stick data storing unit 201b includes a daily stick storing unit 201b-1 which stores stick data needed to draw short-term, medium-term, and long-term Masuda stick curves of daily sticks, a weekly stick storing unit 201b-2 which stores stick data needed to draw short-term, medium-term, and long-term Masuda stick curves of weekly sticks for the stocks, and monthly stick storing unit 201b-3 which stores stick data needed to draw short-term, medium-term, and long-term Masuda stick curves of monthly sticks, where the stick data concerns one or more stocks transmitted from the server apparatus 10 in response to a transmission request from the client machine 20.

Contents of the stick data stored in the daily stick storing unit 201b-1, weekly stick storing unit 201b-2, and monthly stick storing unit 201b-3 of the stick data storing unit 201b are basically the same as the contents of the stick data stored in the daily stick storing unit 101c-1, weekly stick storing unit 101c-2, and monthly stick storing unit 101c-3 of the server apparatus 10 described earlier with reference to FIG. 5, and thus description thereof will be omitted.

Returning to FIG. 3, the input unit 202 includes a keyboard 202a, transmission and reception unit 202b, and pointing device such as a mouse (not shown). The keyboard 202a is used to send various user commands from the client machine 20 to the server apparatus 10. The user commands include specification of a stock in response to a transmission request, specification of a stick type such as daily, weekly, or monthly, specification of an averaging period such as short-term, medium-term, and long-term, a transmission request for data on the number of appearances of each pattern, and the like. The transmission and reception unit 202b is used for communications between the client machine 20 and server apparatus 10 via the Internet.

The output unit 203 includes a display device 203a and printer device 203b connected to the main body unit 201. The display device 203a and printer device 203b are used, respectively, to display and print out short-term, medium-term, long-term Masuda stick curves, and the like of daily sticks, weekly sticks, and monthly sticks based on the daily stick data, weekly stick data, and monthly stick data stored in the stick data storing unit 201b.

Figure 6:
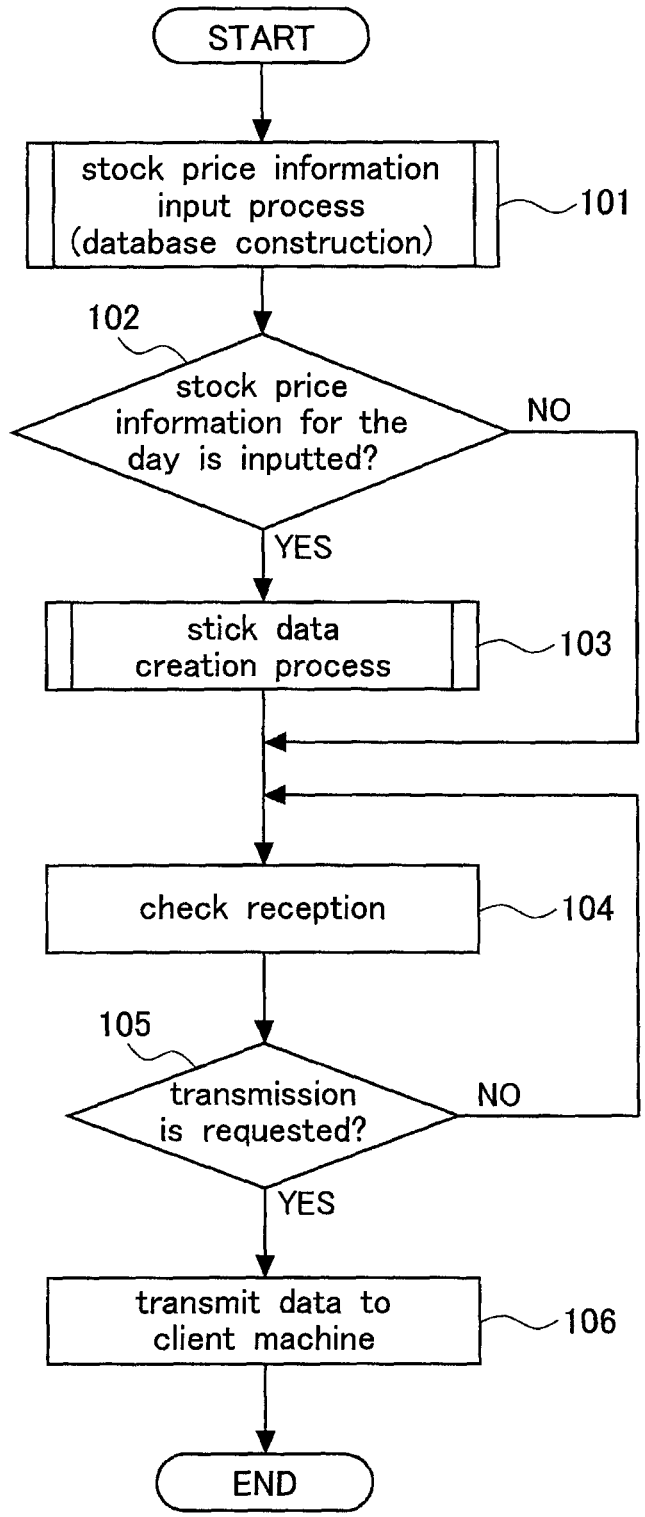
FIG. 6 is a schematic flowchart showing operation details of the server apparatus.

Next, a software configuration of the server apparatus 10 will be described. FIG. 6 is a schematic flowchart showing operation details of the server apparatus.

In FIG. 6, when processing is started, first the server apparatus 10 performs a stock price information input process (Step 101) to construct a database. Details of the stock price information input process (Step 101) are shown in a flowchart in FIG. 7.

Figure 7:
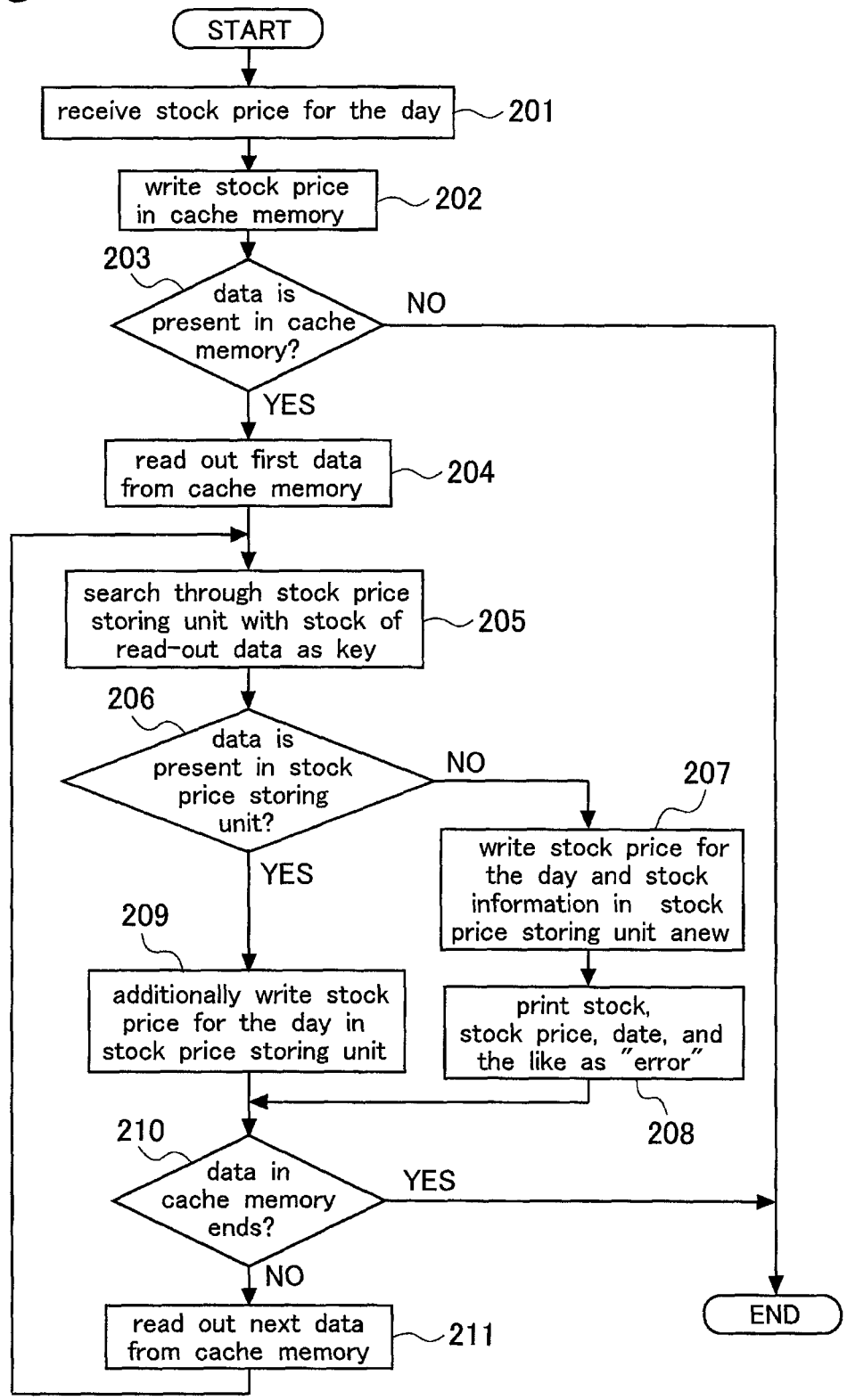
FIG. 7 is a flowchart showing details of a stock price information input process.

As shown in FIG. 7, in the stock price information input process, first the server apparatus 10 receives the stock price of the day via the Internet (Step 201), writes the stock price in the cache memory 102b-1 (Step 202), and checks whether data is present in the cache memory 102b-1 (Step 203).

If data is present in the cache memory 102b-1 (YES in Step 203), the server apparatus 10 reads the first item of data out of the cache memory 102b-1 (Step 204) and searches the stock price storing unit 101b using the stock name of the read data as a key (Step 205).

If relevant data is present in the stock price storing unit 101b (YES in Step 206), the server apparatus 10 adds the stock price of the day to the stock price storing unit 101b (Step 209). On the other hand, if no relevant data is present in the stock price storing unit 101b (NO in Step 206), the server apparatus 10 newly writes the stock price of the day and stock information in the stock price storing unit 101b (Step 207) and prints out the stock name, stock price, date, and the like, indicating an error (Step 208).

The server apparatus 10 repeats the above operations (Steps 205 to 209) each time data is read out of the cache memory 102b-1 (Step 211) until there is no data in the cache memory 102b-1 (NO in Step 210).

Consequently, a database containing stock price information about each of a predetermined group of stocks for a most recent predetermined maximum period is constructed in the stock price storing unit 101b based on the stock price information acquired from the stock price information issuing source via the Internet (see FIG. 4).

Figure 8:
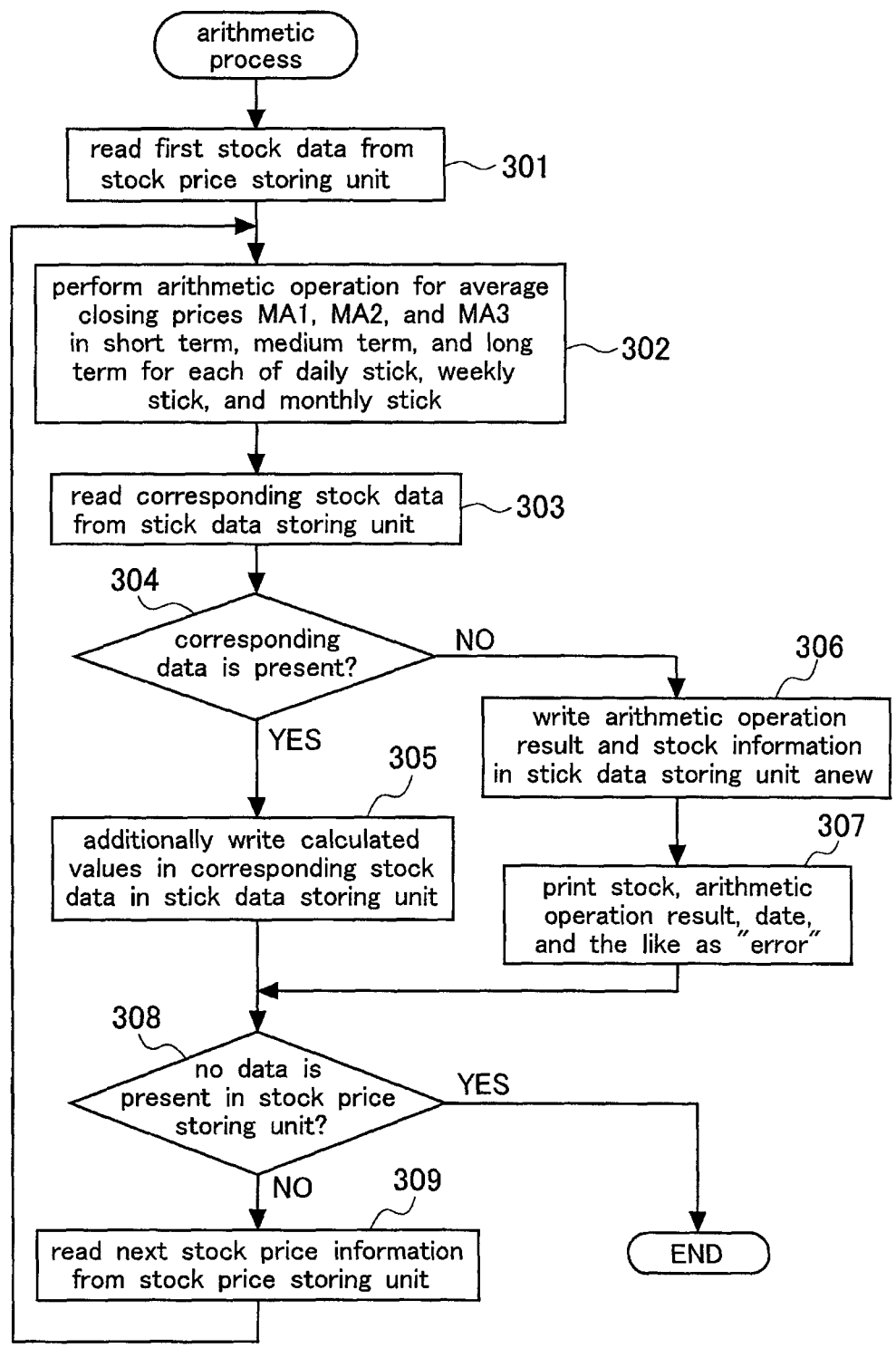
FIG. 8 is a flowchart showing details of a stick data creation process.

Returning to FIG. 6, when the stock price information input process (Step 101) is finished, the server apparatus 10 subsequently performs a stick data creation process (Step 103) on condition that there is an input for the day (YES in Step 102). Details of the stick data creation process (Step 103) are shown in a flowchart in FIG. 8. As shown in FIG. 8, in the stick data creation process, first the server apparatus 10 reads data on the first stock out of the stock price storing unit (Step 301), and then computes short-term, medium-term, and long-term moving average closing prices (MA1, MA2, MA3) of daily sticks, weekly sticks, and monthly sticks (Step 302) based on the stock data.

Subsequently, the server apparatus 10 reads relevant stock data out of the stick data storing unit 101c (Step 303) and determines whether or not there is relevant data (Step 304). If it is determined that there is relevant data (YES in Step 304), the server apparatus 10 adds the computed values (MA1, MA2, MA3) to the relevant stock data in the stick data storing unit (Step 305). On the other hand, if it is determined that no relevant data is present (NO in Step 304), the server apparatus 10 newly writes the computed values (MA1, MA2, MA3) and stock information in the stick data storing unit (Step 306) and prints out the stock name, results of the arithmetic operations, date, and the like, indicating an error (Step 307).

The server apparatus 10 repeats the above operations (Steps 302 to 307) until there is no data in the stock price storing unit 101b (Step 308).

Consequently, short-term, medium-term, and long-term moving average price strings of stock prices are stored on a stock by stock basis in the stick data storing unit 101c as a result of arithmetic operations performed based on stock price information about each of predetermined stocks on the database to determine moving average prices of stock prices in a short term, medium term, and long term closest to a reference time in at least a single time unit selected from days, weeks, or months (see FIG. 5).

Returning to FIG. 6, when the stick data creation process (Step 103) is finished, the server apparatus 10 subsequently makes a reception check (Step 104) and at the same time enters a state of waiting for a transmission request from a client machine 20 (Step 105). In this state, when a transmission request arrives from a client machine 20 (YES in Step 105), the server apparatus 10 transmits stick data stored in the stick data storing unit 101c to the client machine 20 in response to the transmission request (Step 106).

The transmission request from the client machine 20 contains stock specification data, stick type (daily, weekly, or monthly) specification data, averaging-period (short-term, medium-term, or long-term) specification data, and the like. The server apparatus 10 sends the response to the client machine 20 according to the specification data.

Figure 9:
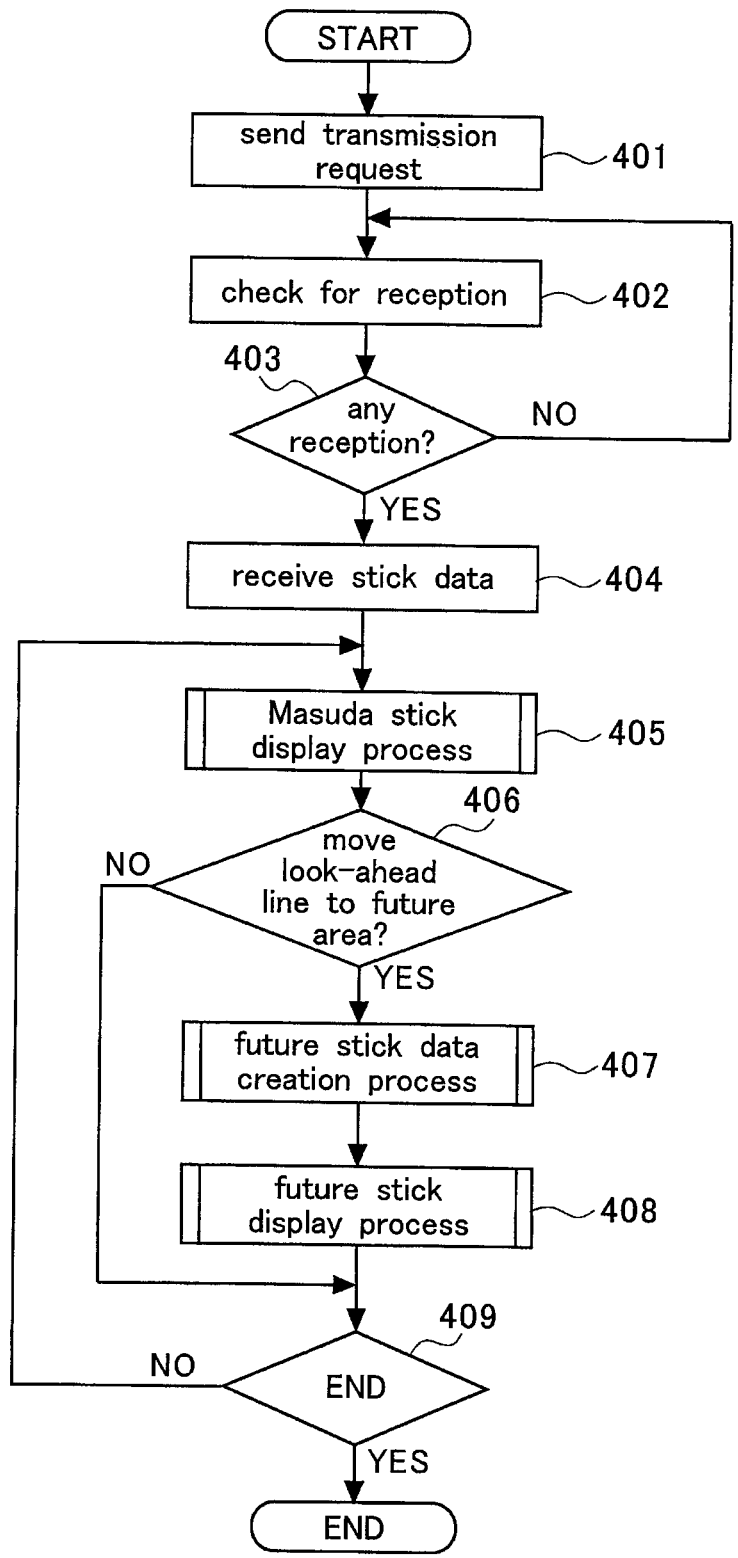
FIG. 9 is a flowchart schematically showing operation of the client machine.

Next, a software configuration of the client machine 20 will be described. FIG. 9 is a schematic flowchart showing operation details of the client machine.

As shown in FIG. 9, after sending a transmission request to the server apparatus 10 (Step 401), the client machine 20 enters a state of waiting for a response from the server apparatus 10 (Steps 402 and 403). The transmission request contains at least stock specification data.

In this state, when the stick data arrives in response to the transmission request by the client machine 20 (YES in Step 403), the client machine 20 receives and stores the stick data in the stick data storing unit 201b (Step 404).

Subsequently, the client machine 20 performs a Masuda stick display process (Step 405). Details of the Masuda stick display process are shown in a flowchart in FIG. 10.

Figure 10:
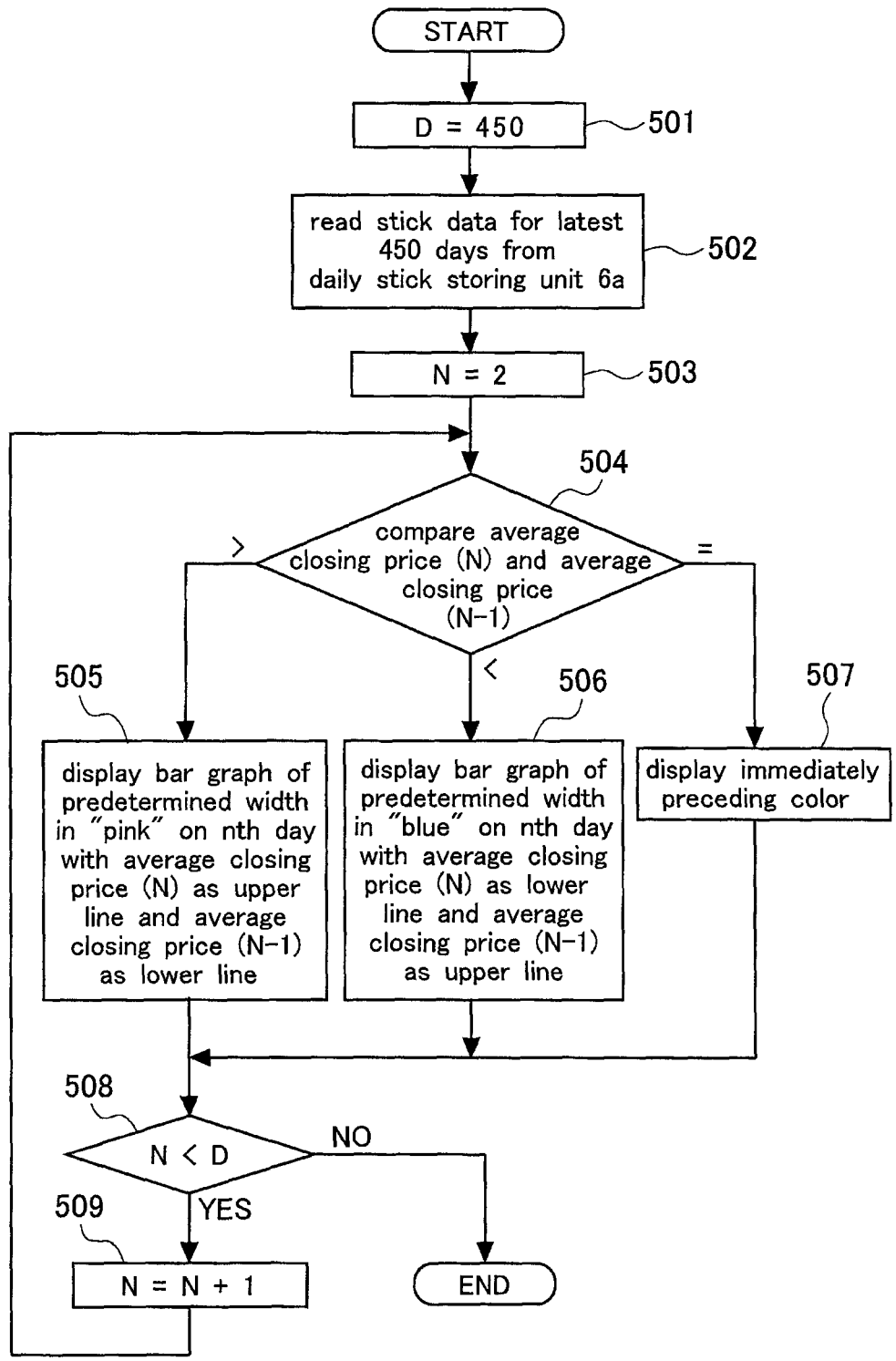
FIG. 10 is a flowchart showing details of a Masuda stick display process.

Referring to FIG. 10, when processing is started, first the client machine 20 sets a maximum data value D to "450" (Step 501), reads stick data of the latest 450 days from the daily stick storing unit 201b-1 (step 502), and sets a pointer N to an initial value of "2". Then, the client machine 20 performs a magnitude comparison between a pair of successive data items specified by the pointer (N) and "N−1" (Step 504) and performs one of three processes (Steps 505, 506, and 507) based on a result of the magnitude comparison. The client machine 20 repeats these steps by incrementing the value of the pointer N by 1 (Step 509) until the value of the pointer N reaches the maximum value D (NO in Step 508), and thereby finishes processing.

The first process (Step 505) is performed when an average closing price (N) is larger than an average closing price (N−1). In this case, a bar graph of a predetermined width is displayed in "pink" on the Nth day using the average closing price (N) as an upper line and the average closing price (N−1) as a lower line.

The second process (Step 506) is performed when the average closing price (N) is smaller than the average closing price (N−1). In this case, a bar graph of a predetermined width is displayed in "blue" on the Nth day using the average closing price (N) as a lower line and the average closing price (N−1) as an upper line.

On the other hand, the third process (Step 507) is performed when the average closing price (N) and average closing price (N−1) are equal. In this case, a straight horizontal line is drawn in the same color as the previous bar.

Figure 12:
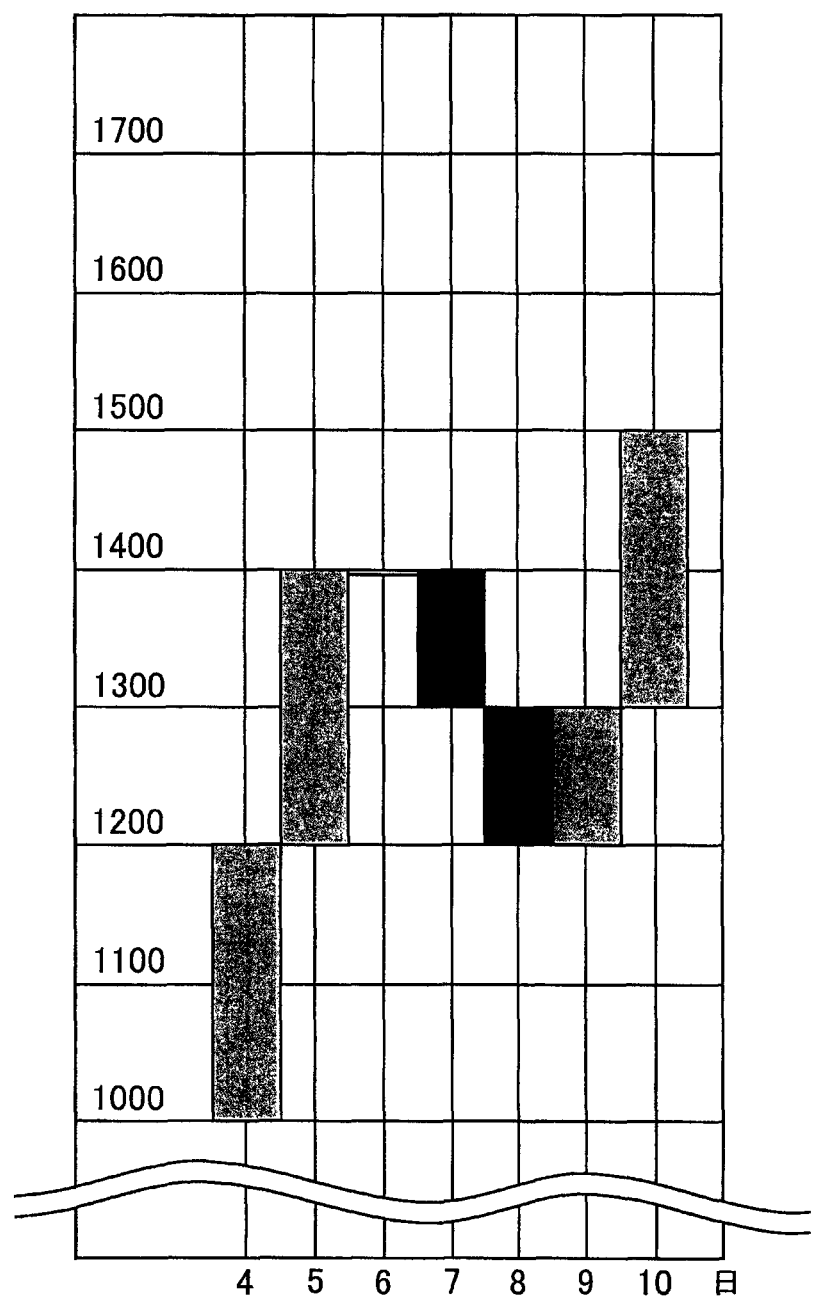
FIG. 12 is a diagram showing an example of short-term Masuda daily stick lines.

FIG. 11 is a diagram showing an example of how average closing prices are calculated and FIG. 12 is a diagram showing an example of short-term Masuda daily stick lines.

As shown in FIG. 11, the value of a three-day average closing price is calculated by dividing the total sum of the closing prices of three successive days by "3". For example, in FIG. 11, the closing price of the first day is "800", the closing price of the second day is "1000", and the closing price of the third day is "1200", and thus the value of the three-day average closing price on the third day is given by (800+1000+1200)/3=1000.

Using the three-day average closing prices determined in this way, short-term Masuda daily stick lines are drawn as shown in FIG. 12. As can be seen from FIG. 12, each Masuda daily stick is drawn as a bar using the average of three successive days as an upper or lower line.

The color of the bar is designated as a first color (e.g., pink color (P)) in the case of a light bar (when a later three-day moving average closing price is higher than an earlier moving average closing price), and as a second color (e.g., blue color (B)) in the case of a dark stick (when a later three-day average closing price is higher than an earlier three-day average closing price). Incidentally, a method for drawing the Masuda sticks has already been disclosed by the present inventor in various publications, and thus further description thereof will be omitted.

Next, a future stick generating and drawing process which is a principal part of the present invention will be described. With a conventional Masuda stick chart generation and display apparatus, on a display screen, short-term, medium-term, and long-term Masuda sticks are drawn on two-dimensional coordinate axes where the abscissa represents a time axis and the ordinate represents a stock price axis as disclosed by the present inventor in various publications.

In some cases, the display screen is split horizontally into two areas, a Masuda stick chart is drawn in the upper area, a candlestick chart is drawn in the lower area, and the time axes of the two charts are aligned to thereby display four prices (opening price, high price, low price, and closing price) in the lower area and draw short-term, medium-term, and long-term Masuda stick charts in the upper area using one or more of daily stick, weekly stick, and monthly stick strings.

Generally, daily closing prices are used to calculate daily sticks, weekly closing prices are used to calculate weekly sticks, and monthly closing prices are used to calculate monthly sticks. However, in the case of weekly sticks, daily closing prices are used as a provisional closing price on each day. Regarding monthly sticks, again daily closing prices are used as a provisional closing price on each day.

Regarding moving average prices, 3-day moving average prices, 25-day moving average prices, and 75-day moving average prices are used to determine short-term, medium-term, and long-term daily sticks, respectively. Similarly, 3-week moving average prices, 13-week moving average prices, and 26-week moving average prices are used to determine short-term, medium-term, and long-term weekly sticks, respectively. Similarly, 3-month moving average prices, 12-month moving average prices, and 36-month moving average prices are used to determine short-term, medium-term, and long-term monthly sticks, respectively.

The data needed to draw daily, weekly, and monthly Masuda sticks on a short-term, medium-term, and long-term basis are downloaded from the server machine 10 via the Internet as described above. The downloading is designed to be performed automatically when the client machine 20 is connected to the server machine 10. Subsequently, the client machine 20 is connected to the server, as required, to acquire then current closing price.

According to the present invention, a future stick area (specifically, an area to the right of today on the time axis or a specific window area) is newly provided above the conventional Masuda stick chart to enable drawing short-term, medium-term, and long-term Masuda future daily sticks and weekly sticks as in the case of conventional Masuda sticks.

According to the present embodiment, as shown in the flowchart in FIG. 9, to display Masuda future stick curves (symbols C1', C2', and C3' in FIGS. 40 to 51) in the future stick display area (see symbol W in FIGS. 40 to 51), it is necessary to move a look-ahead line (see symbol L1 in FIGS. 40 to 51) described later to the future area (see Steps 406 to 408 in FIG. 9).

More specifically, Masuda future sticks are drawn as 3-day sticks, 25-day sticks, and 75-day sticks in the case of daily sticks, and as 3-week sticks, 13-week sticks, and 26-week sticks in the case of weekly sticks. Newly developed various software (processes) is used to draw such future sticks. The software will be described in detail below with reference to respective flowcharts.

Figure 13:
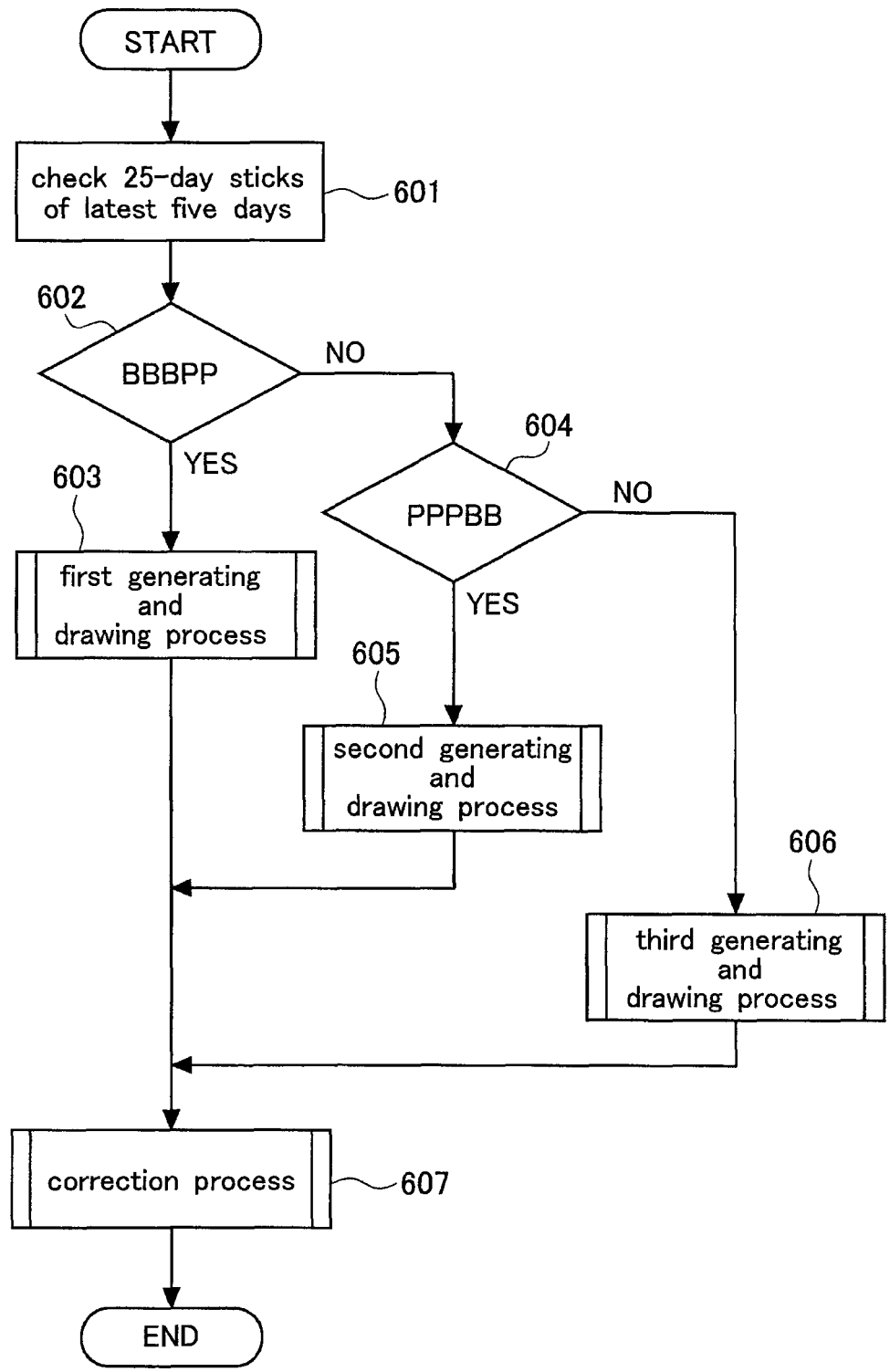
FIG. 13 is a general flowchart of a 25-day future stick creating and drawing process.

A general flowchart of a 25-day future stick creating and drawing process is shown in FIG. 13. As shown in FIG. 13, when processing is started, first the client machine 20 checks 25-day sticks of the latest five days (four days ago, three days ago, two days ago, one day ago, and today) (Step 601).

The process in relation to 25-day sticks is performed by reading stick color data (pink "P" or blue "B") from the daily stick storing unit 201b-1 in sequence beginning with the first item in the block diagram of FIG. 3 which shows the configuration of the client machine.

Returning to FIG. 13, the client machine 20 checks the 25-day sticks of the most recent five days to see whether their color data is arranged in a "BBBPP" (Step 602) pattern or a "PPPBB" pattern (Step 604). If the 25-day sticks of the latest five days are arranged in a "BBBPP" pattern (YES in Step 602), the client machine 20 performs a first generating and drawing process (Step 603). If the arrangement is "PPPBB" (YES in Step 604), the client machine 20 performs a second generating and drawing process (Step 605). If the sticks are arranged in neither a "BBBPP" nor "PPPBB" pattern (NO in Steps 602 and 604), the client machine 20 performs a third generating and drawing process (Step 606), and then a correction process described later (Step 607).

It is said that the 25-day sticks of the most recent five days have a color data arrangement of "BBBPP" when a stick color value change from "B" to "P" has been detected with "B" continuing for three or more sticks and "P" continuing for two or more sticks up to today in the medium-term Masuda daily sticks of the most recent five days. On the other hand, it is said that the 25-day sticks of the most recent five days have a color data arrangement of "PPPBB" when a stick color value change from "P" to "B" has been detected with "P" continuing for three or more sticks and "B" continuing for two or more sticks up to today in the medium-term Masuda daily sticks of the most recent five days.

Figure 14:
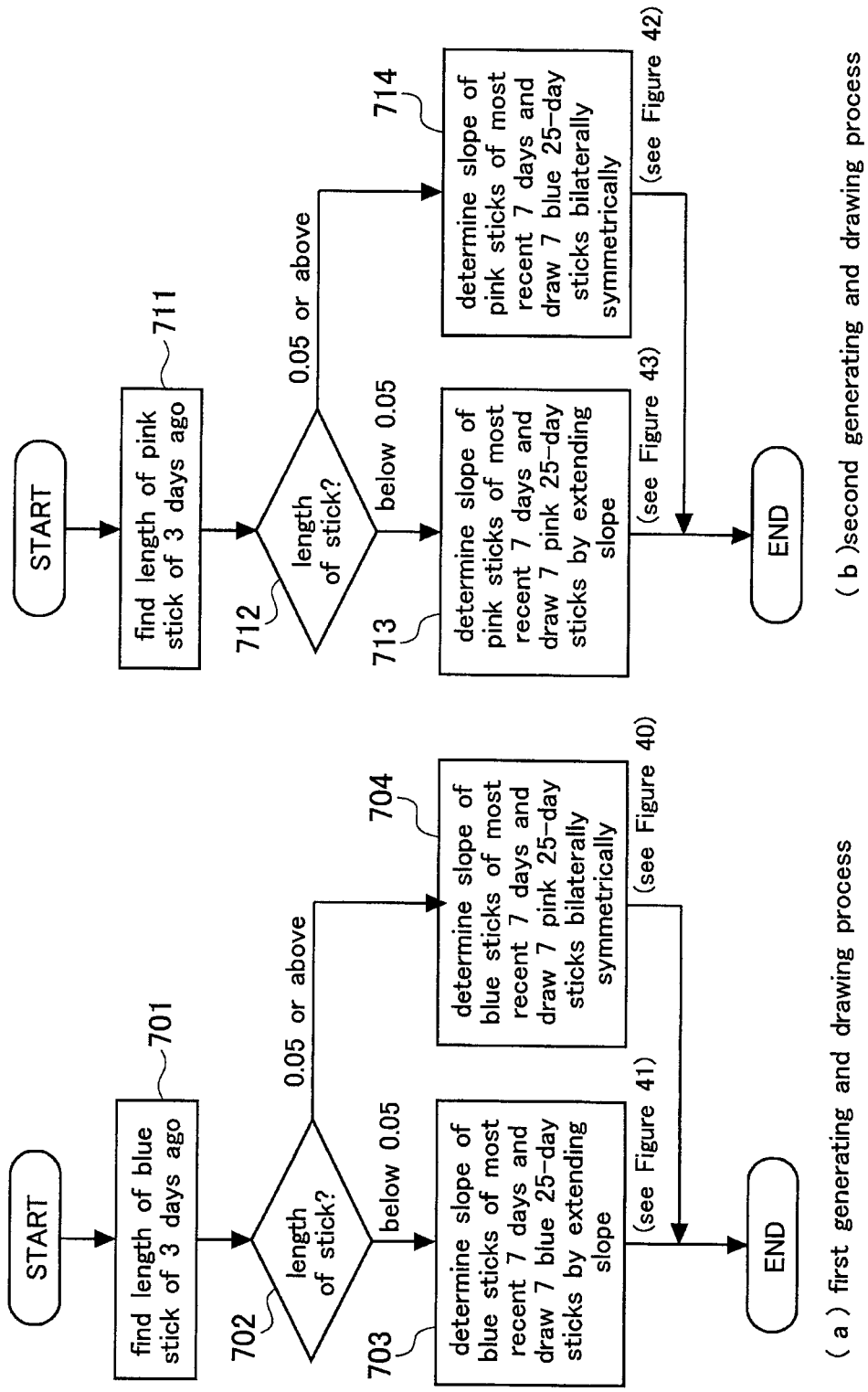
FIGS. 14(a) and 14(b) are detailed flowcharts of first and second drawing processes.

Detailed flowcharts of the first and second generating and drawing processes are shown in FIGS. 14(a) and 14(b). As shown in FIG. 14(a), in the first generating and drawing process, first the client machine 20 finds length of the blue (B) stick of three days ago (Step 701) and determines whether the length is less than 0.05, or equal to or larger than 0.05 (Step 702).

Figure 40:
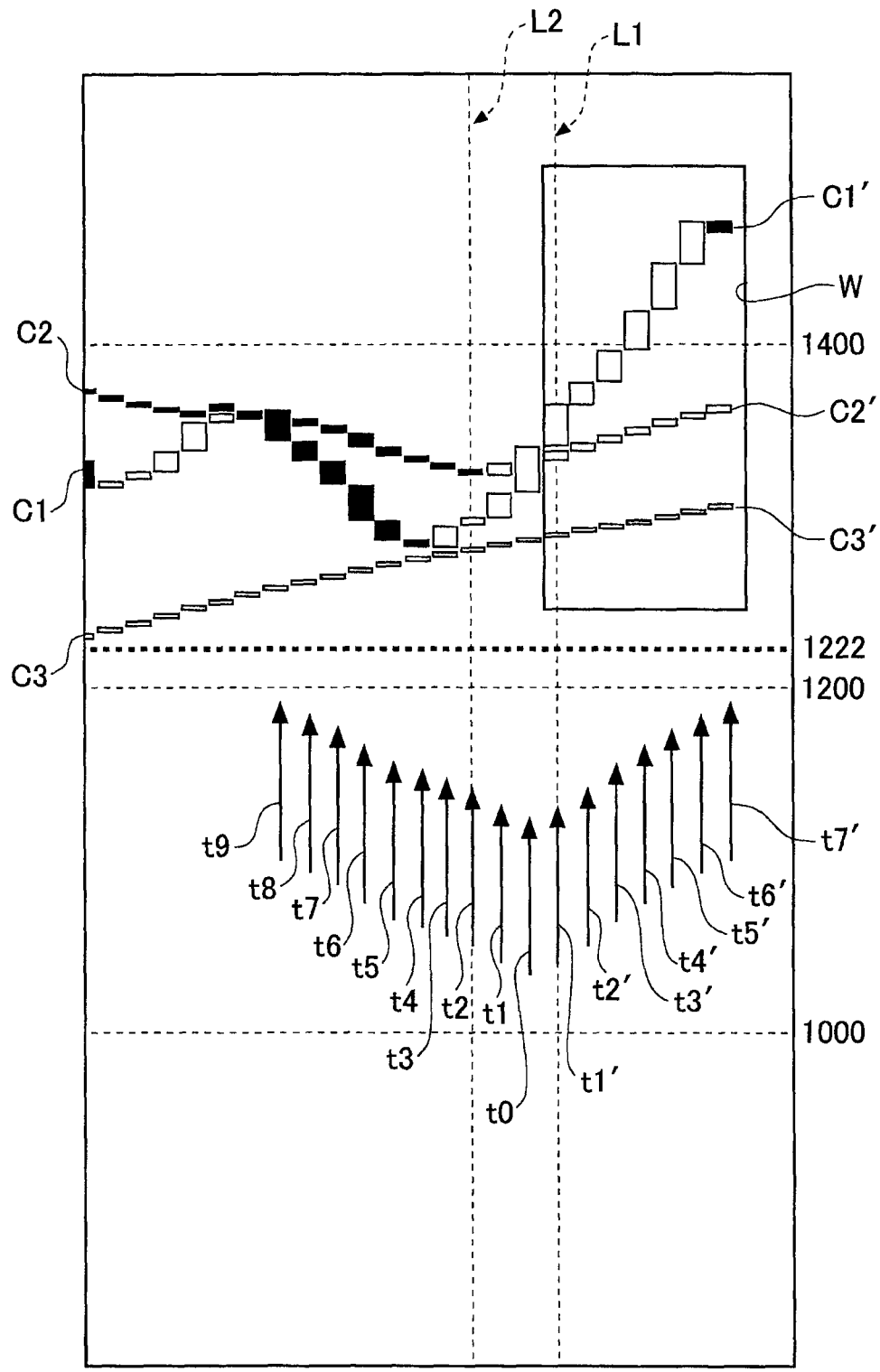
FIG. 40 is a diagram showing a display example of future sticks when sticks of the latest five days are arranged in a "BBBPP" pattern and length of the blue (B) stick of three days ago is 0.05 or above.
Figure 41:
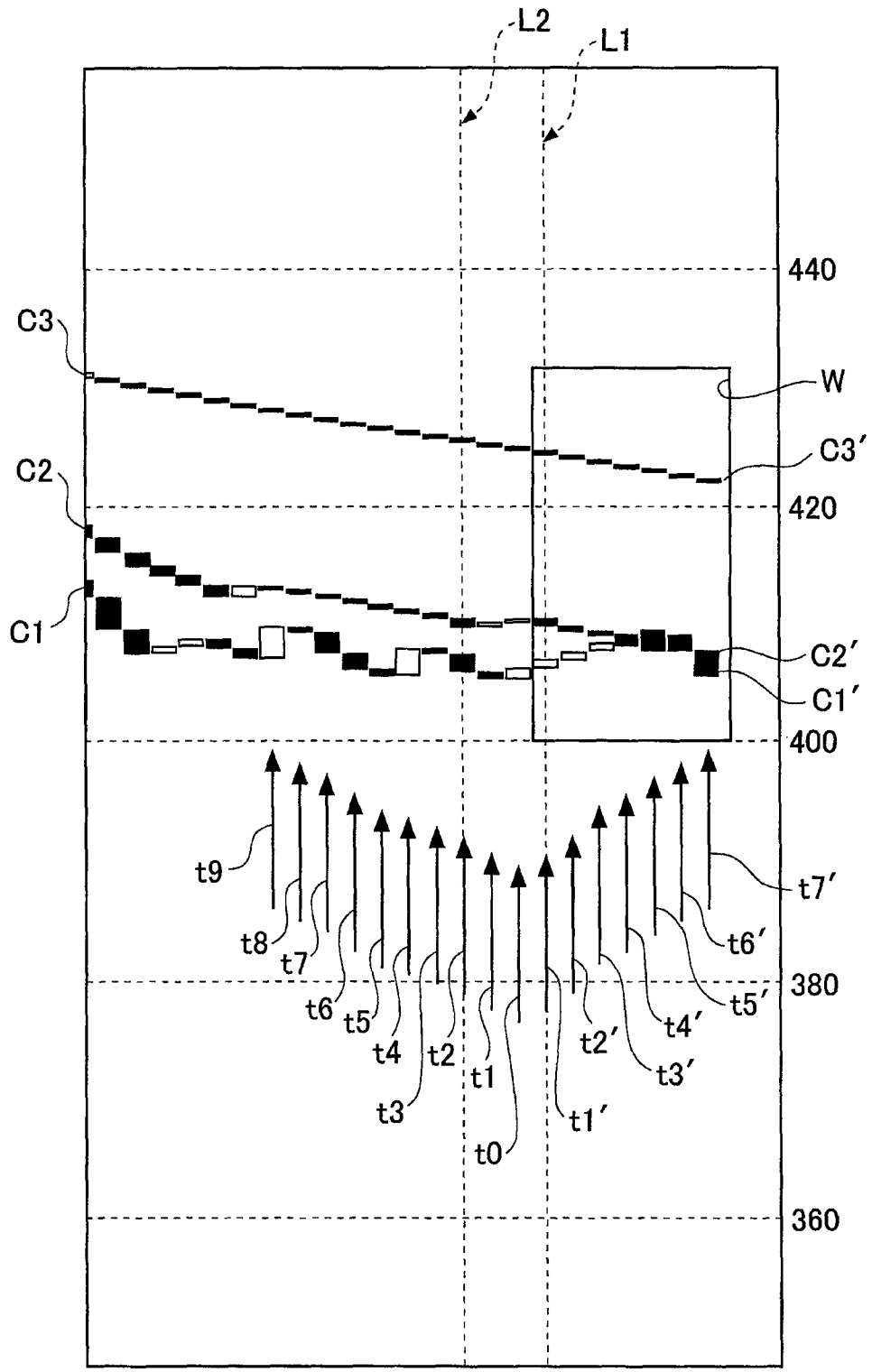
FIG. 41 is a diagram showing a display example of future sticks when sticks of the latest five days are arranged in a "BBBPP" pattern and length of the blue (B) stick of three days ago is less than 0.05.

If it is determined that the length is less than 0.05, the client machine 20 determines the slope of the blue (B) sticks of the most recent seven days and draws seven blue (B) 25-day sticks by extending the slope as shown in FIG. 41 (Step 703). On the other hand, if it is determined that the length is equal to or larger than 0.05, the client machine 20 determines the slope of the blue (B) sticks of the most recent seven days and draws seven pink (P) 25-day sticks bilaterally symmetrically as shown in FIG. 40 (Step 704).

In the case of the second generating and drawing process, as shown in FIG. 14(b), first the client machine 20 similarly finds length of the pink (P) stick of three days ago (Step 711) and determines whether the length is less than 0.05, or equal to or larger than 0.05 (Step 712).

Figure 42:
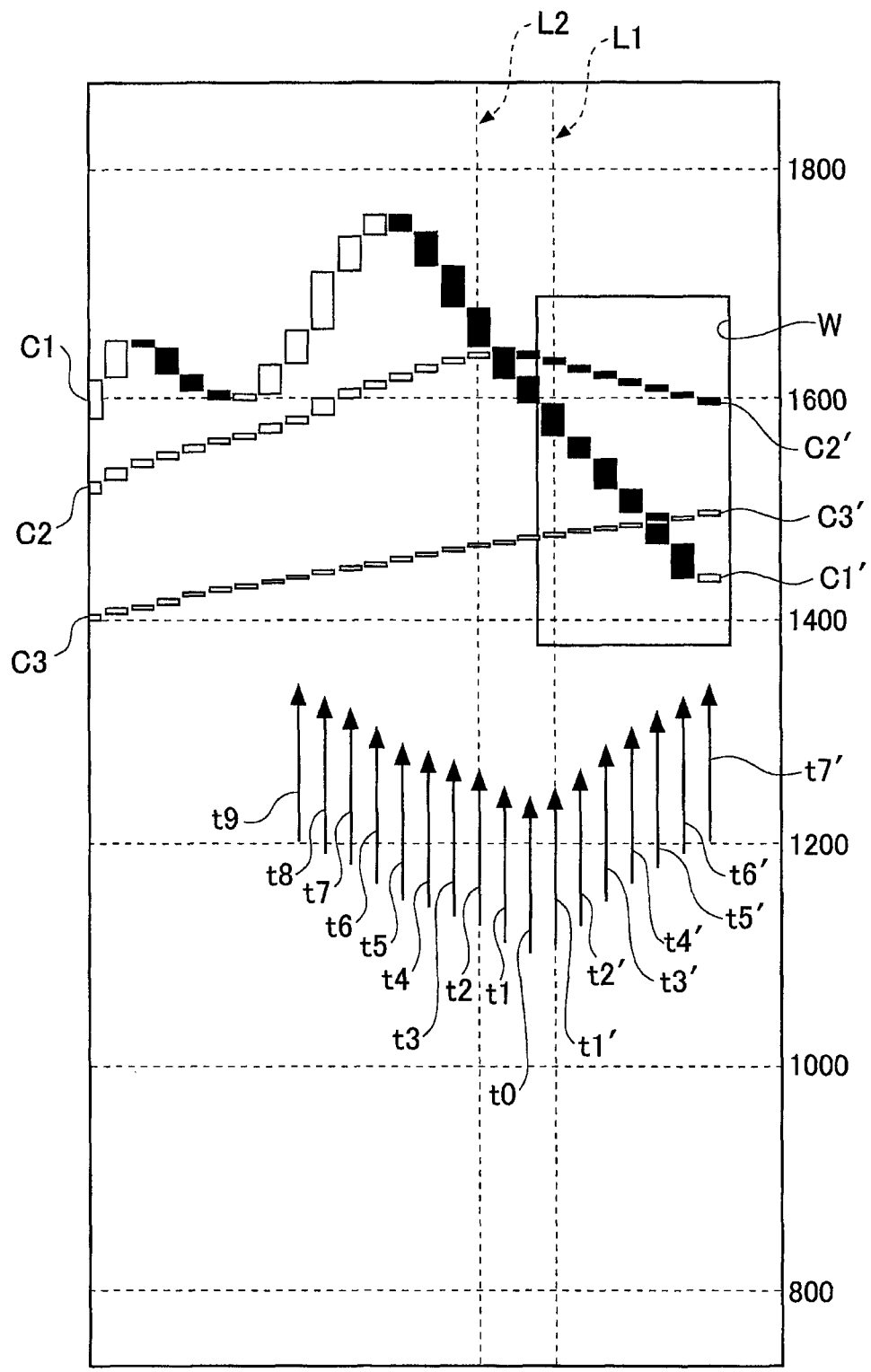
FIG. 42 is a diagram showing a display example of future sticks when sticks of the latest five days are arranged in a "PPPBB" pattern and length of the blue (B) stick of three days ago is 0.05 or above.
Figure 43:
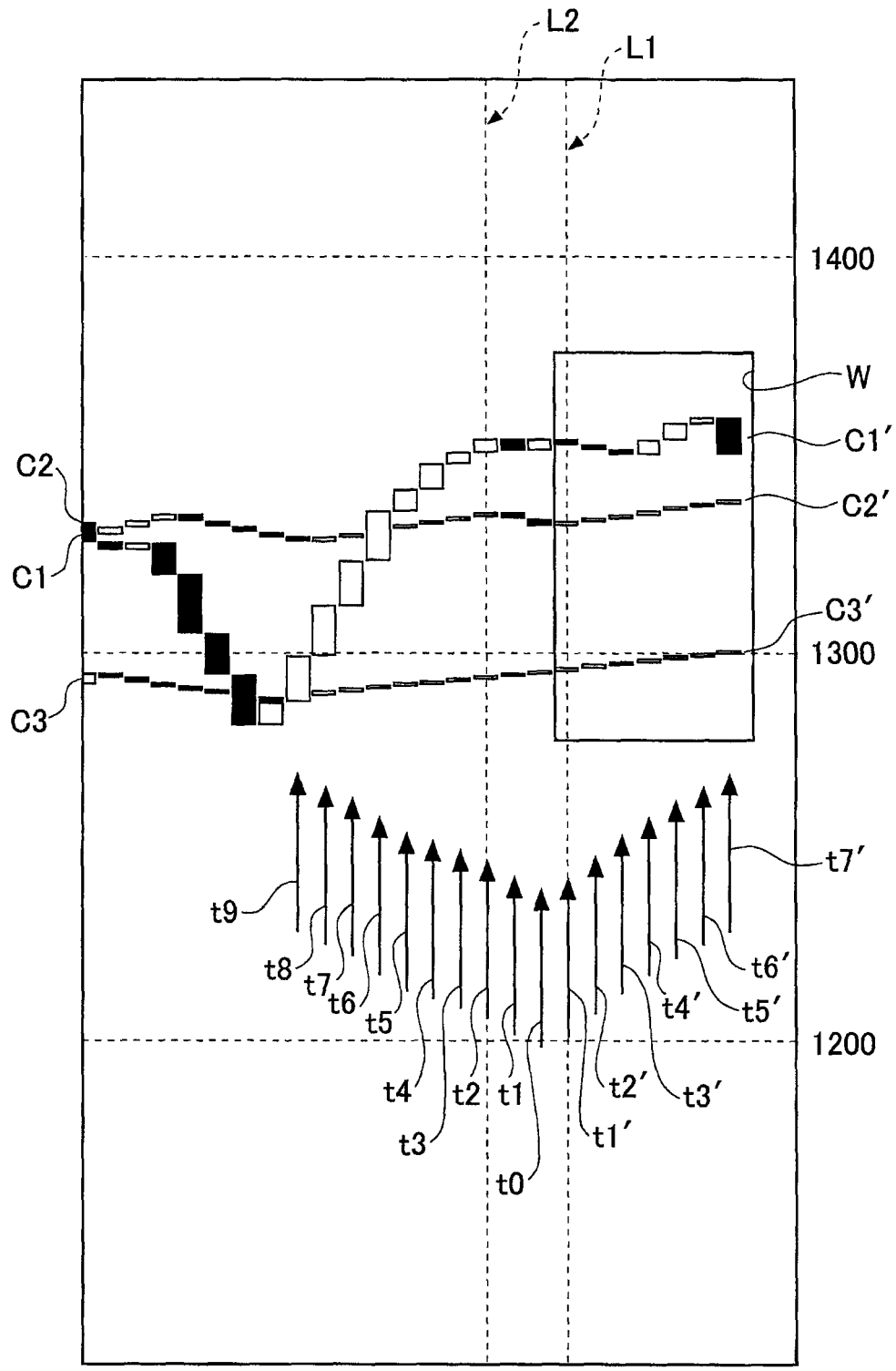
FIG. 43 is a diagram showing a display example of future sticks when sticks of the latest five days are arranged in a "PPPBB" pattern and length of the pink (P) stick of three days ago is less than 0.05.
Figure 44:
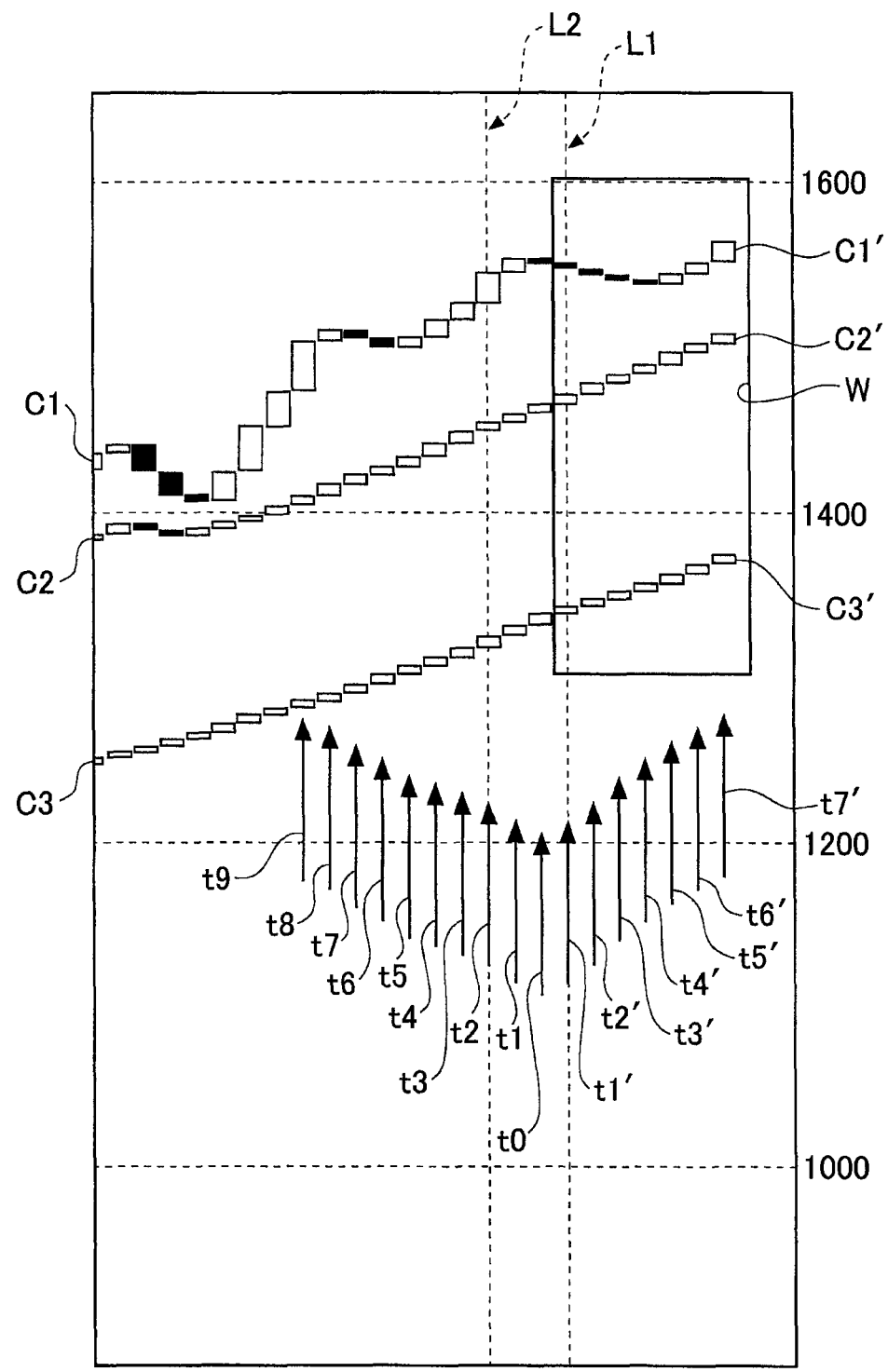
FIG. 44 is a diagram showing a display example of future sticks when five or more divergences out of A(1) to A(7) are positive and determination of condition in Step 1001 is affirmative.

If it is determined that the length is less than 0.05, the client machine 20 determines the slope of the pink (P) sticks of the most recent seven days and draws seven pink (P) 25-day sticks by extending the slope as shown in FIG. 43 (Step 713). On the other hand, if it is determined that the length is equal to or larger than 0.05, the client machine 20 determines the slope of the pink (P) sticks of the most recent seven days and draws seven blue (B) 25-day sticks bilaterally symmetrically as shown in FIG. 42 (Step 714).

In this way, when the 25-day sticks of the latest five days are arranged in a "BBBPP" or "PPPBB" pattern, the client machine 20 determines medium-term Masuda future daily sticks of seven days according to a predetermined rule as shown in FIGS. 14(a) and 14(b), and displays the resulting sticks as a medium-term Masuda future daily stick curve C2' in a future stick display window W of the display screen (see FIGS. 40 to 43).

In FIGS. 40 to 51, reference character W denotes a future stick display window; L1 denotes a look-ahead line; L2 denotes a 3-day line; C1 denotes a short-term Masuda daily stick curve; C2 denotes a medium-term Masuda daily stick curve; C3 denotes a long-term Masuda daily stick curve; C1' denotes a short-term Masuda future daily stick curve; C2' denotes a medium-term Masuda future daily stick curve; C3' denotes a long-term Masuda future daily stick curve; t0 denotes the current day; t1, and t2 to tn denote one day ago, and two days to n days ago, respectively; and t1', and t2' to tn' denote one day ahead, and two days to n days ahead, respectively.

Figure 15:
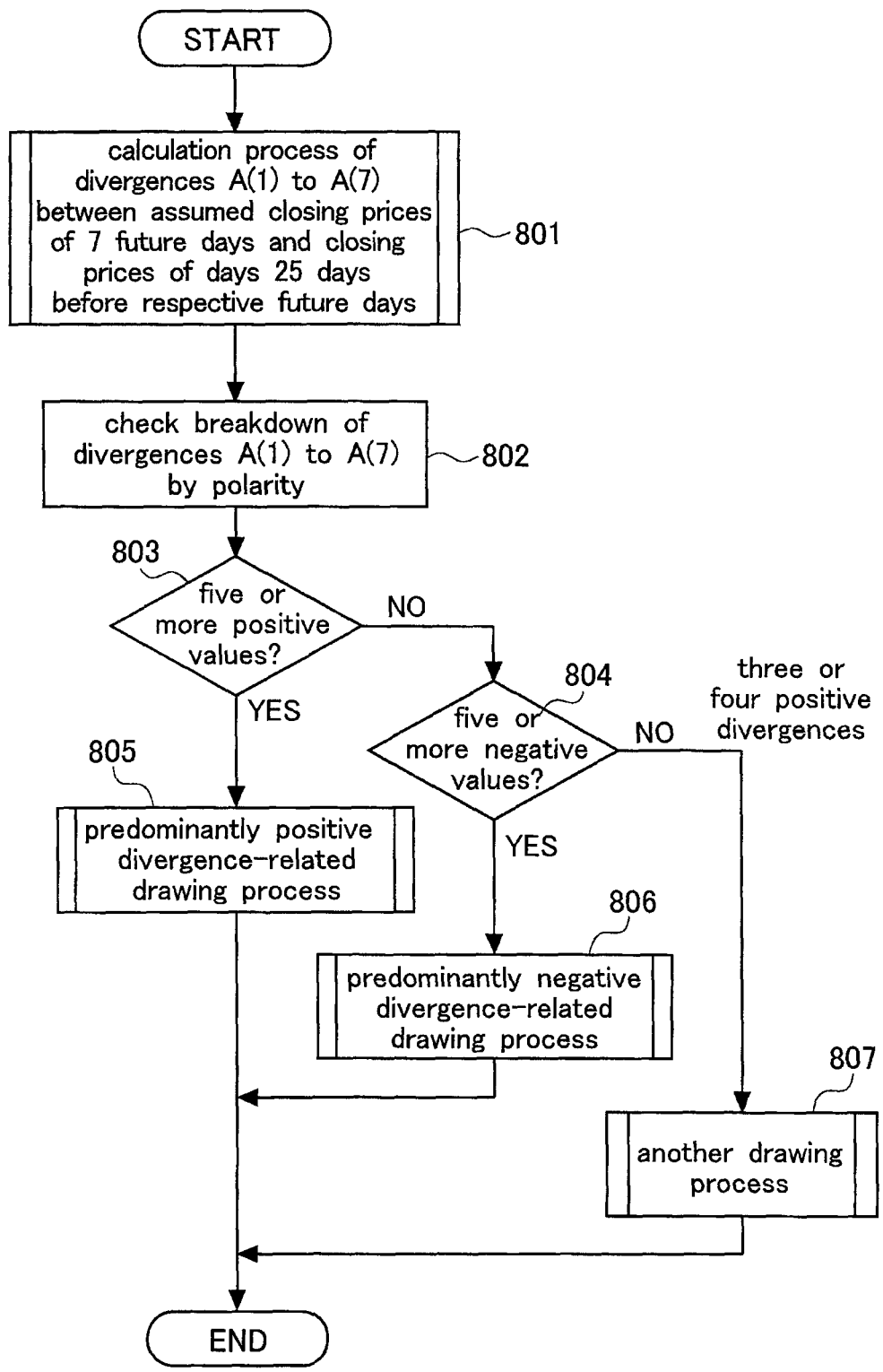
FIG. 15 is a detailed flowchart of a third generating and drawing process.

On the other hand, a detailed flowchart of the third generating and drawing process is shown in FIG. 15. As shown in FIG. 15, when processing is started, first the client machine 20 performs a calculation process of divergences A(1) to A(7) between assumed closing prices (today's closing price) of seven future days and the closing prices of the days 25 days before the respective future days (Step 801).

Figure 16:
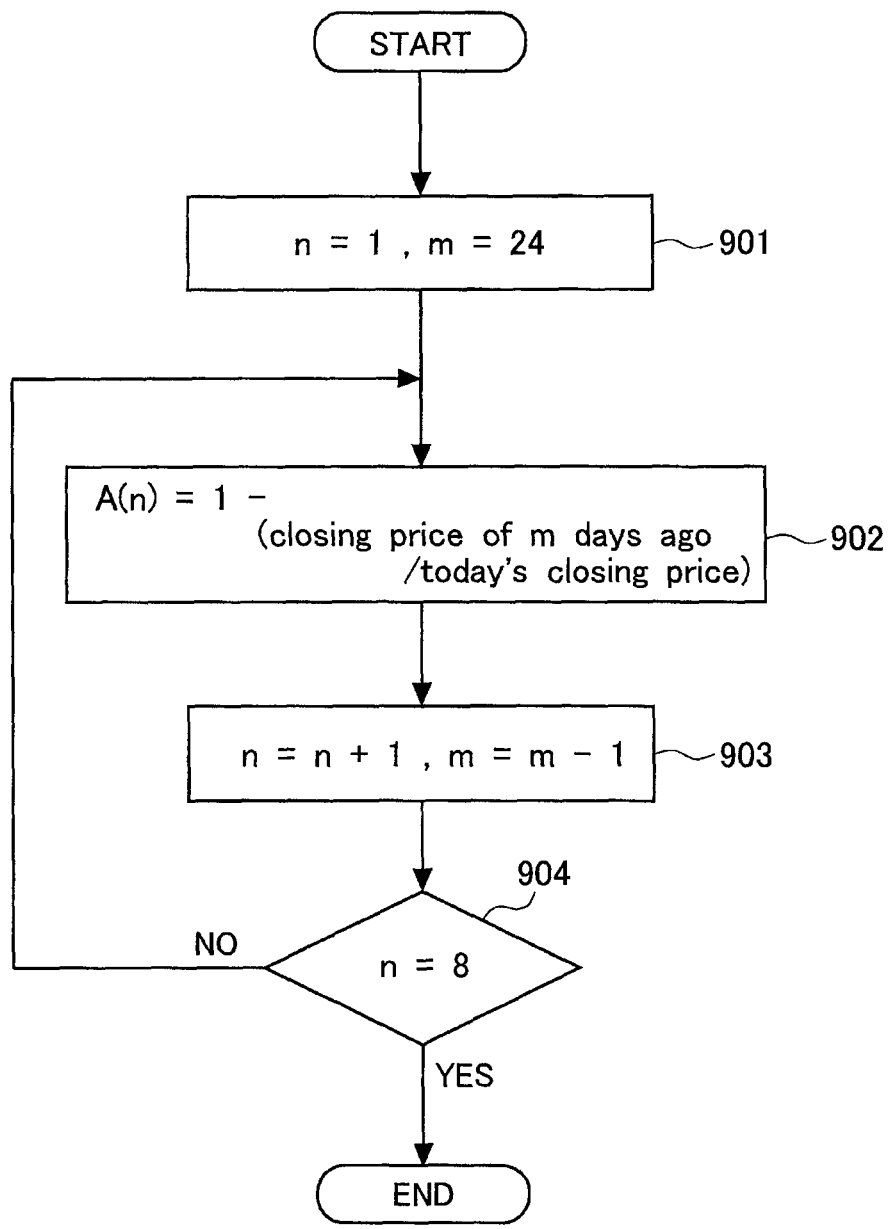
FIG. 16 is a detailed flowchart of a calculation process of divergences A(1) to A(7)

A detailed flowchart of a calculation process of the divergences A(1) to A(7) is shown in FIG. 16. As shown in FIG. 16, first the client machine 20 initializes a count pointer to n=1, and an averaging day pointer to m=24 (Step 901), and then determines the polarity A(n) of the divergence between the today's closing price and the closing price of m days ago (Step 902) in sequence by incrementing the value of the pointer n by 1 and decrementing the value of the pointer m by 1 until the value of the pointer n reaches "8" (NO in Step 904). Consequently, the polarity A(1) to A(7) of each of the divergences is determined.

Returning to FIG. 15, when the calculation process of the divergences A(1) to A(7) (Step 801) is completed, the client machine 20 subsequently checks a breakdown of divergences A(1) to A(7) by polarity (Step 802). That is, as can be seen from the formula below, the polarity of the divergence A(n) is positive when today's closing price is higher than the closing price of m days ago, and conversely the polarity of the divergence A(n) is negative when today's closing price is lower than the closing price of m days ago.

$$A(n)=1-(\text{closing price of m days ago}/\text{today's closing price})$$

If it is determined that five or more of the divergences A(1) to A(7) are positive (YES in Step 803), a predominantly positive divergence-related drawing process is performed accordingly (Step 805). On the other hand, if it is determined that five or more of the divergences A(1) to A(7) are negative (YES in Step 804), a predominantly negative divergence-related drawing process is performed accordingly (Step 806). In neither case (NO in Steps 803 and 804), i.e., if three or four of the divergences A(1) to A(7) are positive, another type of drawing process is performed (Step 807).

Figure 17:
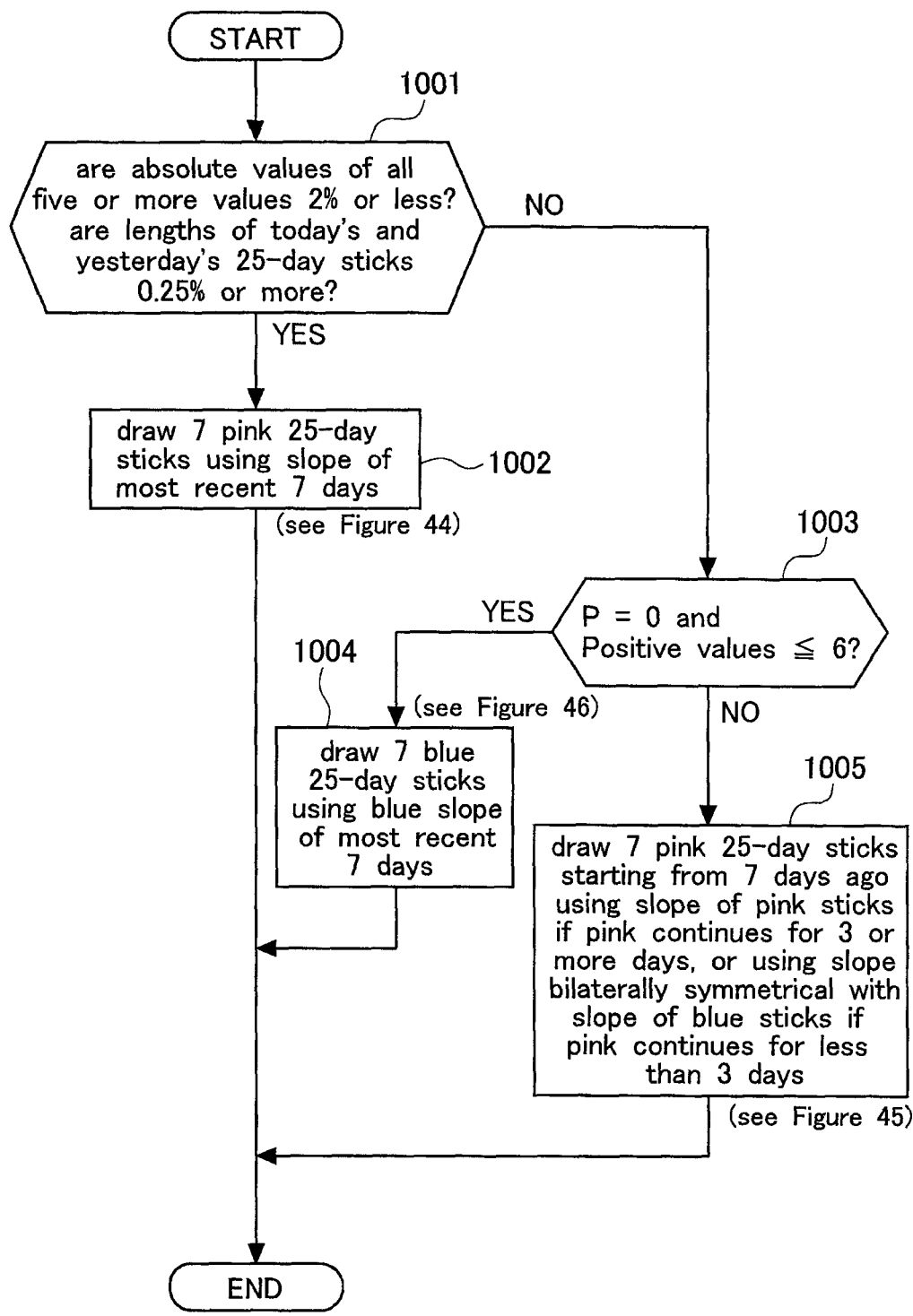
FIG. 17 is a detailed flowchart of a predominantly positive divergence-related drawing process.

A detailed flowchart of the predominantly positive divergence-related drawing process is shown in FIG. 17. In FIG. 17, when processing is started, first the client machine 20 determines whether the absolute values of all the five or more divergence values are 2% or less and whether the lengths of today's and yesterday's 25-day sticks are 0.25% or more (Step 1001). If a result of the determination is affirmative (YES in Step 1001), the client machine 20 draws seven pink (P) 25-day sticks using the slope of the most recent seven days (see a method of slope calculation in FIG. 39(b)) (Step 1002) (see FIG. 44).

On the other hand, if the result of the determination is negative (NO in Step 1001), the client machine 20 further determines whether P is 0 and whether the number of positive divergences is 6 or less (Step 1003). If a result of the determination is affirmative (YES in Step 1003), the client machine 20 draws seven blue (B) 25-day sticks using the B slope of the most recent seven days (Step 1004) (see FIG. 46).

Figure 45:
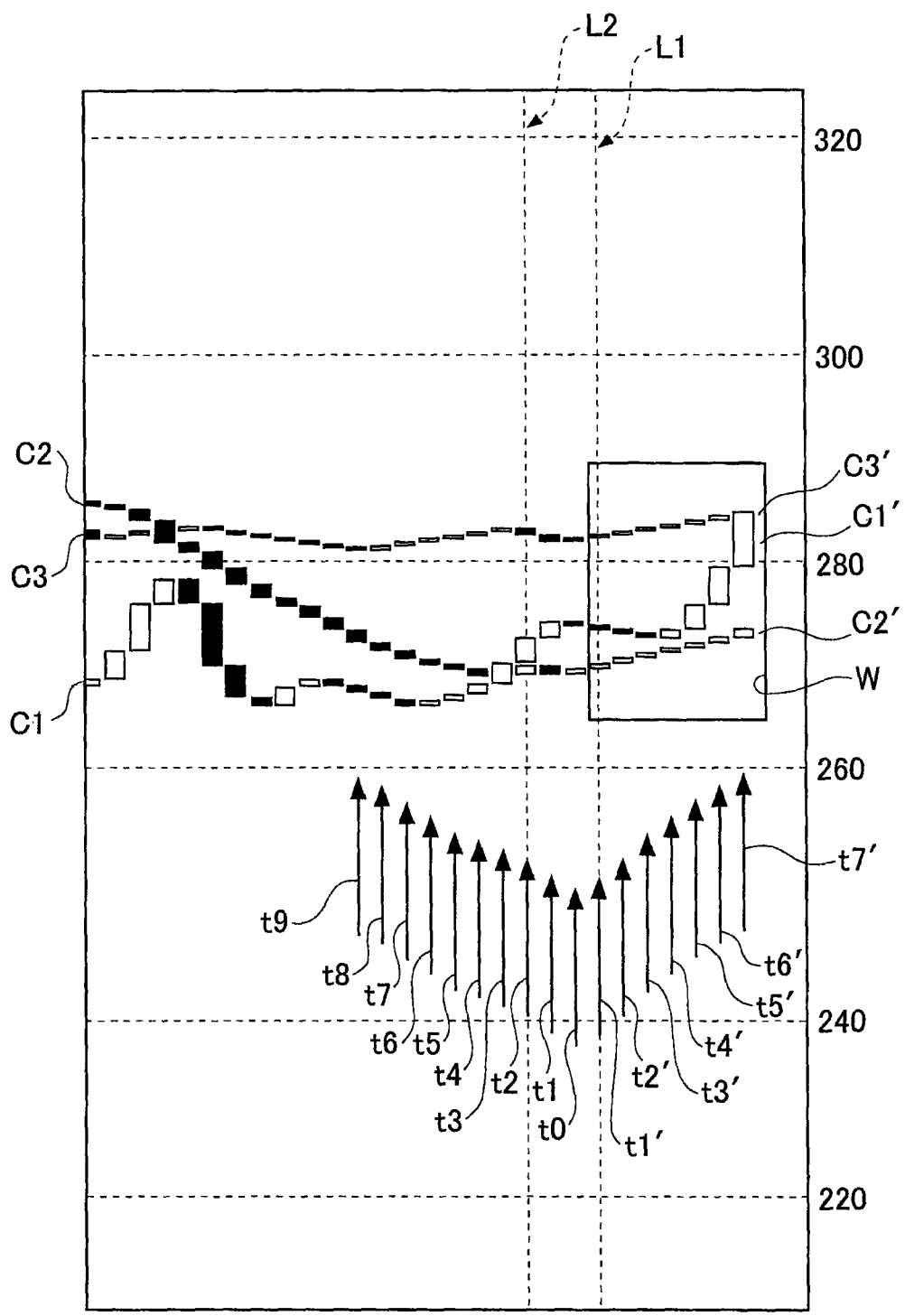
FIG. 45 is a diagram showing a display example of future sticks when five or more divergences out of A(1) to A(7) are positive, determination of condition in Step 1001 is negative, and determination of condition in Step 1003 is negative.
Figure 46:
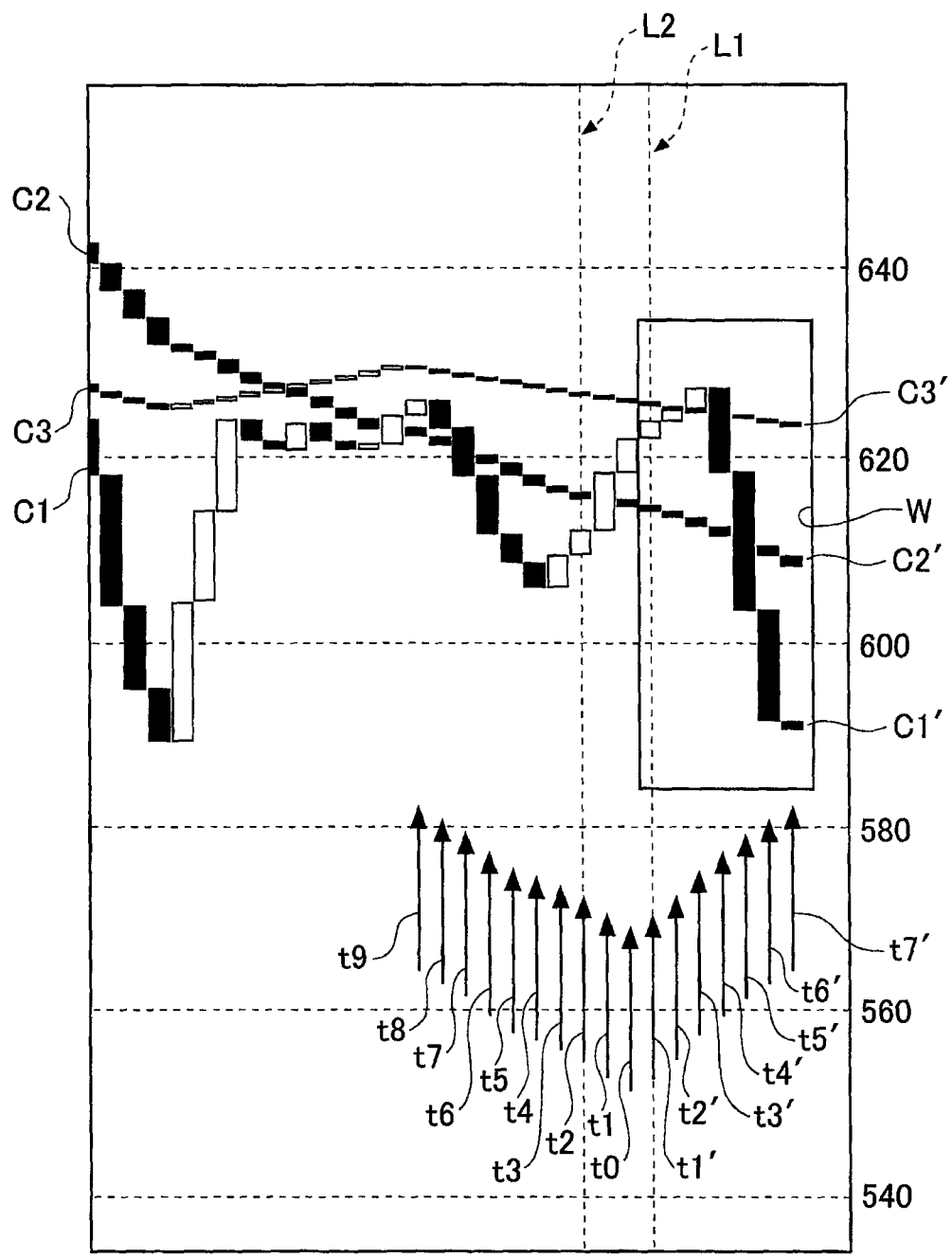
FIG. 46 is a diagram showing a display example of future sticks when five or more divergences out of A(1) to A(7) are positive, determination of condition in Step 1001 is negative, and determination of condition in Step 1003 is affirmative.
Figure 47:
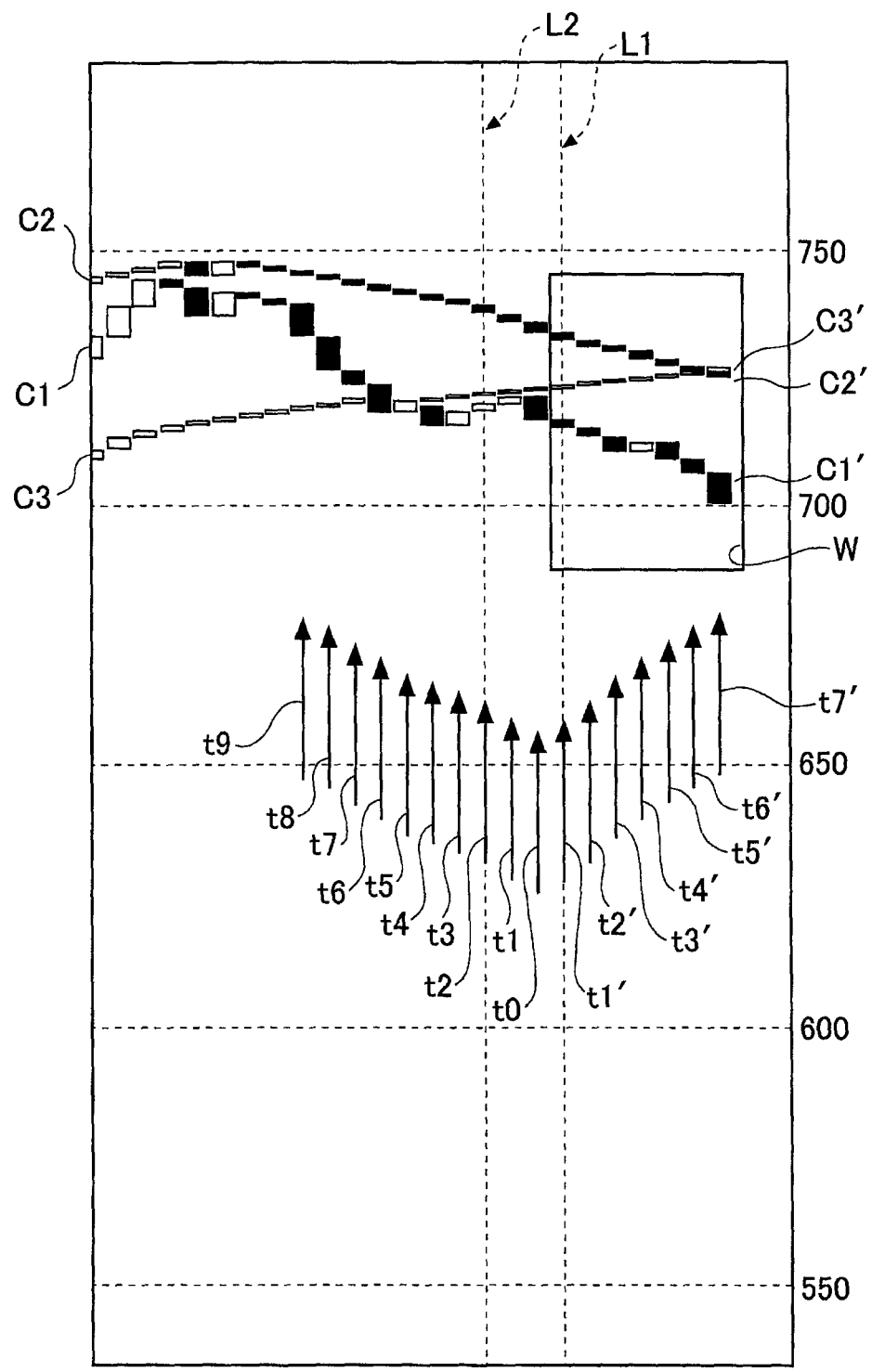
FIG. 47 is a diagram showing a display example of future sticks when five or more divergences out of A(1) to A(7) are negative and determination of condition in Step 1101 is affirmative.

On the other hand, if the result of the determination is negative (NO in Step 1003), the client machine 20 draws seven pink (P) 25-day sticks starting from seven days ago using the slope of pink (P) 25-day sticks if the pink (P) 25-day sticks continue for three or more days, or using a slope bilaterally symmetrical with the slope of blue (B) sticks if pink (P) 25-day sticks continue for less than three days (Step 1005) (see FIG. 45).

Figure 18:
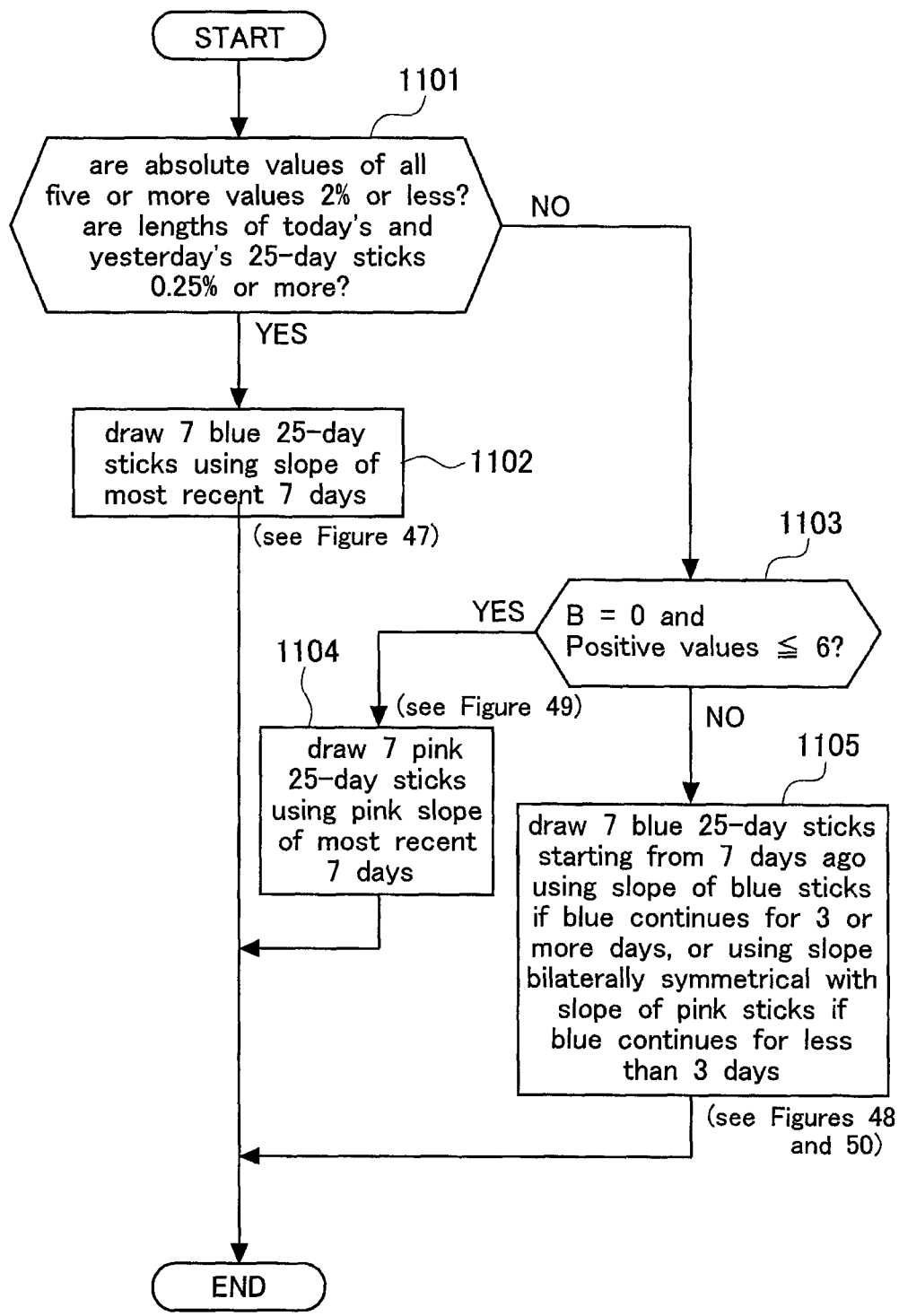
FIG. 18 is a detailed flowchart of a predominantly negative divergence-related drawing process.

A detailed flowchart of the predominantly negative divergence-related drawing process is shown in FIG. 18. In FIG. 18, when processing is started, first the client machine 20 determines whether the absolute values of all the five or more divergence values are 2% or less and whether the lengths of today's and yesterday's 25-day sticks are 0.25% or more (Step 1101). If a result of the determination is affirmative (YES in Step 1101), the client machine 20 draws seven blue (B) 25-day sticks using the slope of the most recent seven days (Step 1102) (see FIG. 47).

On the other hand, if the result of the determination is negative (NO in Step 1101), the client machine 20 determines whether B is 0 and whether the number of positive divergences is 6 or less (Step 1103). If a result of the determination is affirmative (YES in Step 1103), the client machine 20 draws seven pink (P) 25-day sticks using the slope of the pink (P) 25-day sticks of the most recent seven days (Step 1104) (see FIG. 49).

Figure 48:
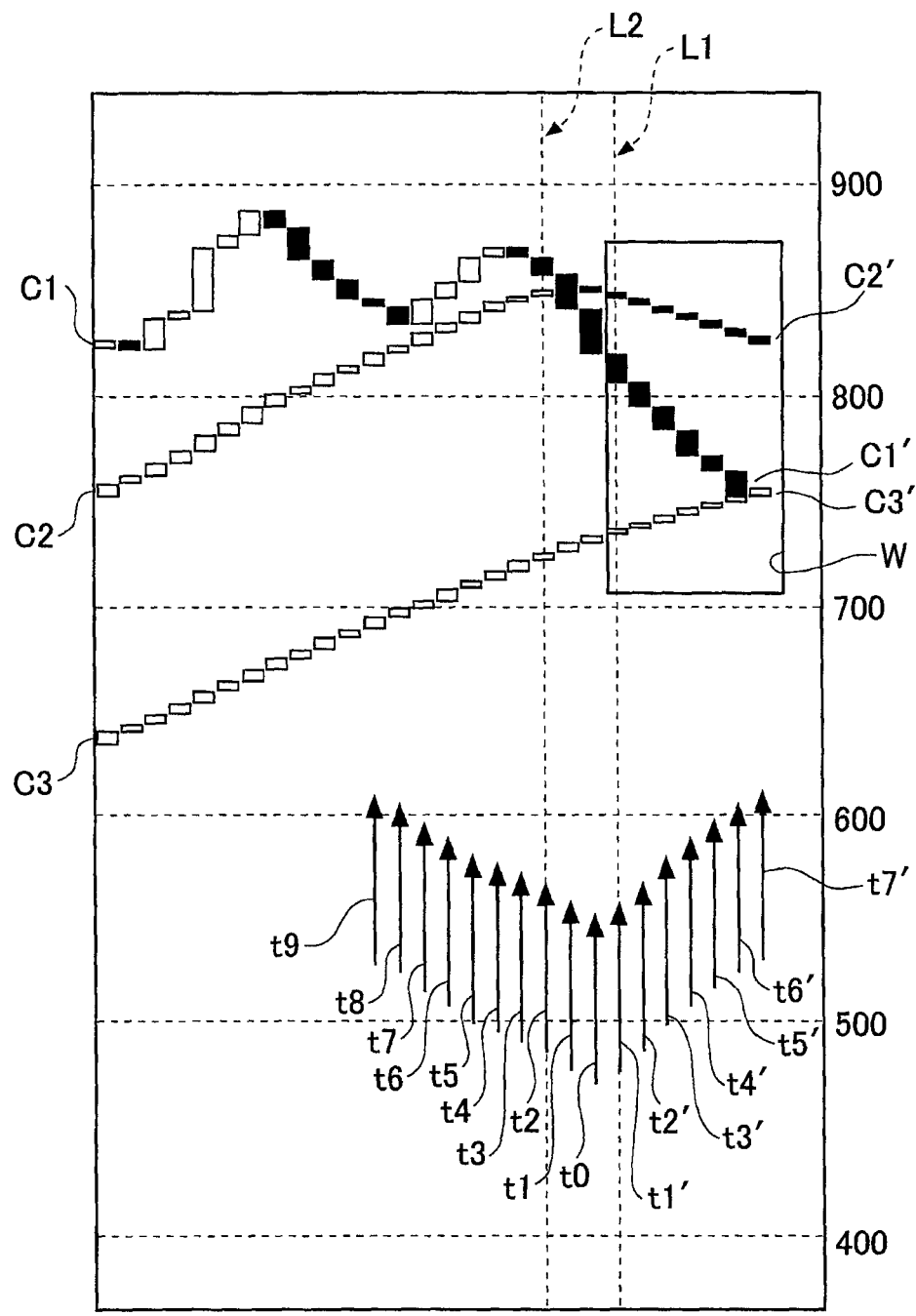
FIG. 48 is a diagram showing a display example of future sticks when five or more divergences out of A(1) to A(7) are negative, determination of condition in Step 1101 is negative, and determination of condition in Step 1103 is negative.
Figure 49:
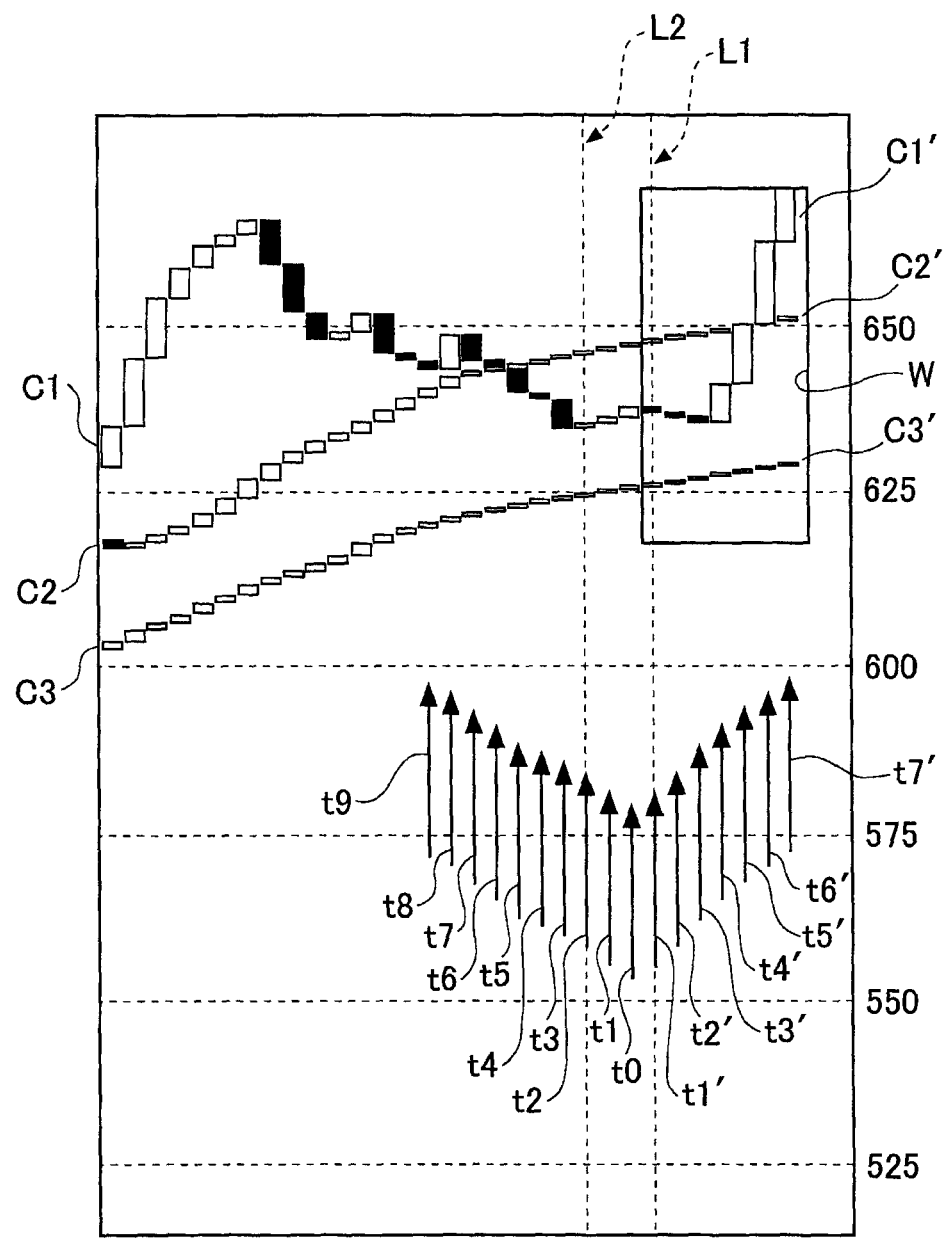
FIG. 49 is a diagram showing a display example of future sticks when five or more divergences out of A(1) to A(7) are negative, determination of condition in Step 1101 is negative, and determination of condition in Step 1103 is affirmative.
Figure 50:
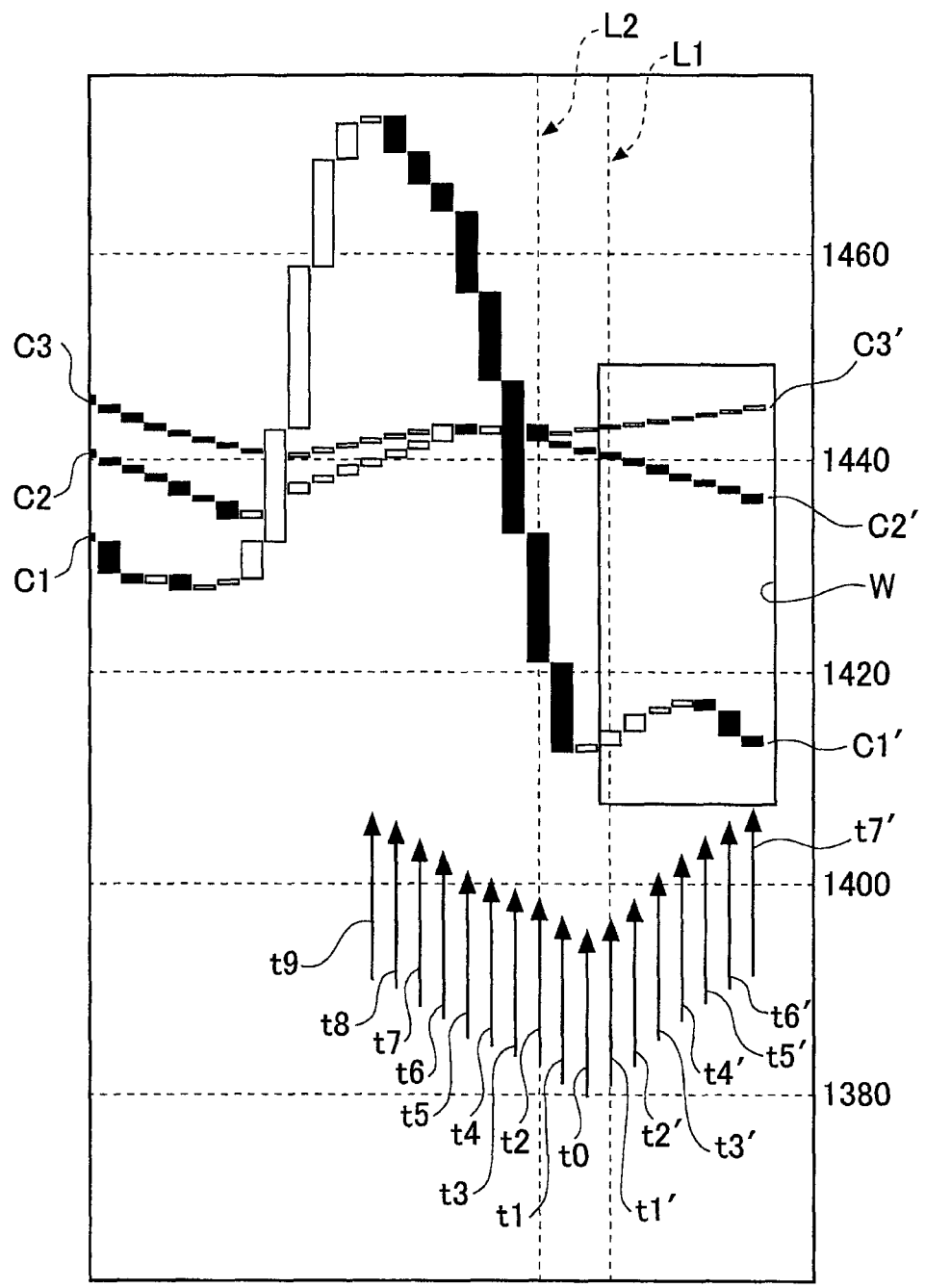
FIG. 50 is a diagram showing a display example of future sticks when five or more divergences out of A(1) to A(7) are negative, determination of condition in Step 1101 is negative, and determination of condition in Step 1103 is negative.
Figure 51:
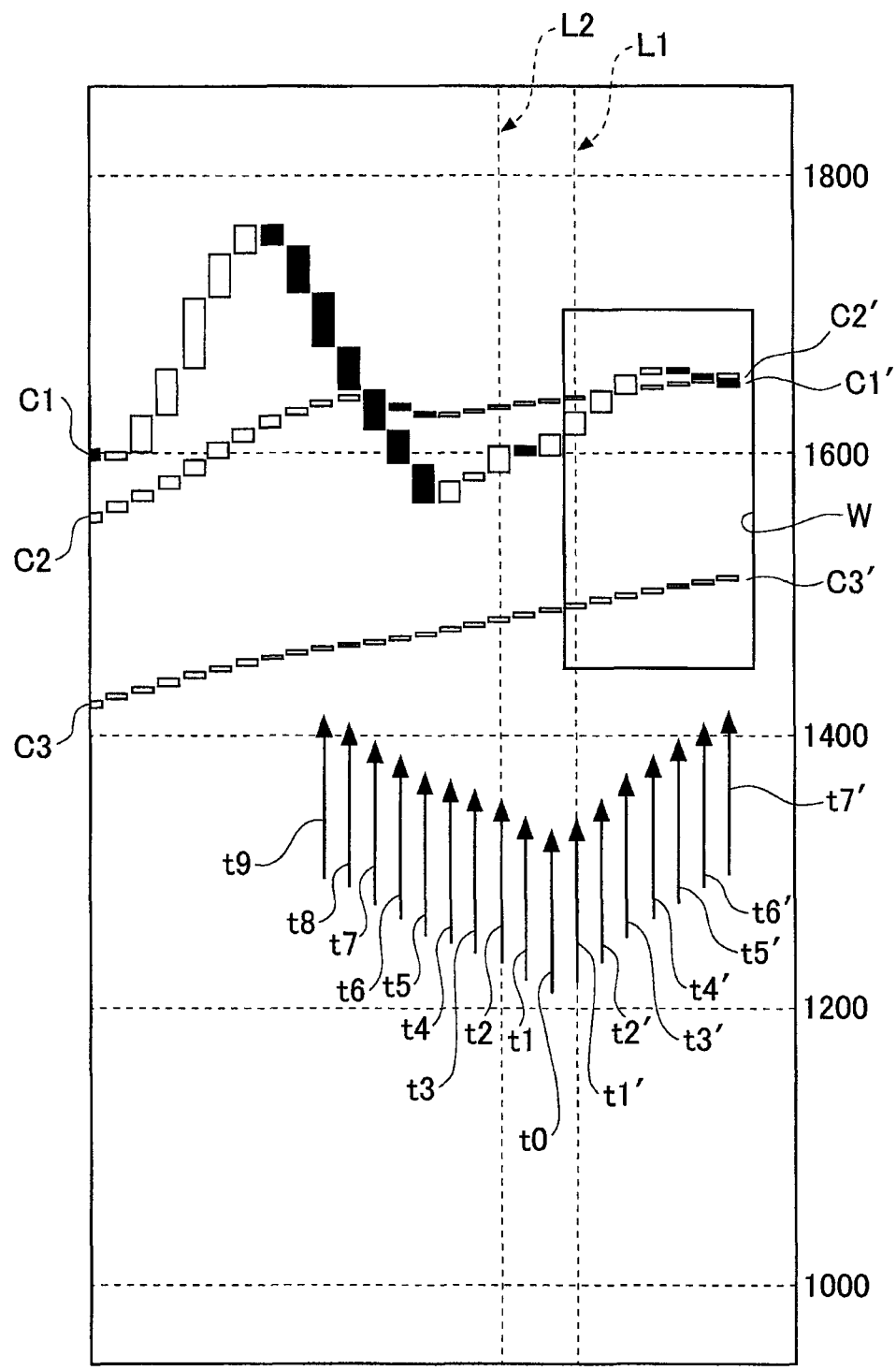
FIG. 51 is a diagram showing a display example of future sticks when three or four divergences out of A(1) to A(7) are positive.

On the other hand, if the result of the determination is negative (NO in Step 1103), the client machine 20 draws seven blue (B) 25-day candlesticks starting from seven days ago using the slope of blue (B) 25-day sticks if the blue (B) 25-day sticks continue for three or more days, or using a slope bilaterally symmetrical with the slope of pink (P) sticks if blue (B) 25-day sticks continue for less than three days (Step 1105) (see FIG. 48).

Figure 19:
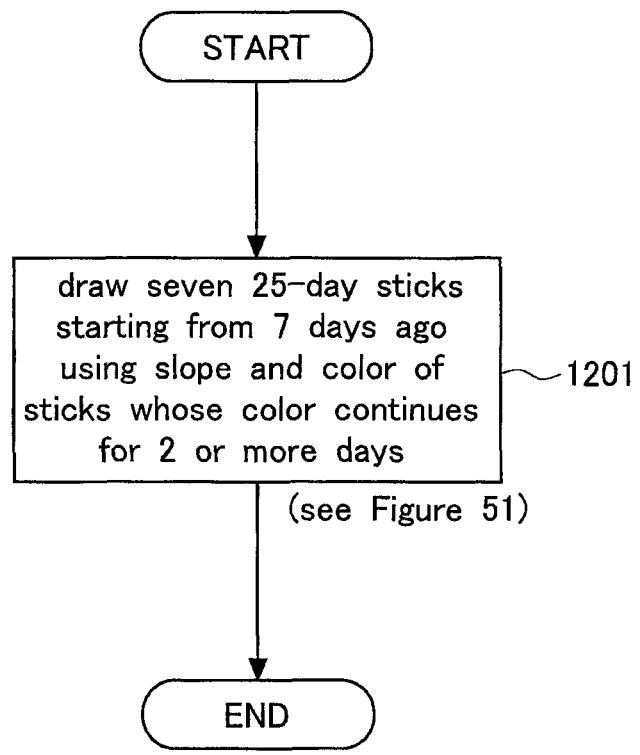
FIG. 19 is a detailed flowchart of another type of drawing process.

Details of the other type of drawing process are shown in FIG. 19. In FIG. 19, when processing is started, first the client machine 20 draws seven 25-day sticks starting from seven days ago using the slope and color of sticks whose color continues for two days (Step 1201) (see FIG. 51). For a method of slope calculation, see FIG. 39(b).

In this way, in the 25-day future stick generating and drawing process, first the client machine 20 checks the 25-day sticks of the latest five days (Step 601). If the 25-day sticks of the latest five days are arranged in a "BBBPP" pattern (Step 602), the client machine 20 performs a generating and drawing process (Step 603) according to a predetermined rule, regarding that it is highly likely that the arrangement indicates a turn from a downward trend to an upward trend. Similarly, if the 25-day sticks of the latest five days are arranged in a "PPPBB" pattern, the client machine 20 performs a generating and drawing process (Step 605) according to a predetermined rule, regarding that it is highly likely that the arrangement indicates a turn from an upward trend to a downward trend. On the other hand, if the sticks are arranged in neither a "BBBPP" nor "PPPBB" pattern, the client machine 20 performs another type of drawing process (Step 606) to perform a drawing process on a case by case basis.

When the three types of drawing process are finished (Steps 603, 605, and 606), the client machine 20 performs a correction process (Step 607).

Figure 20:
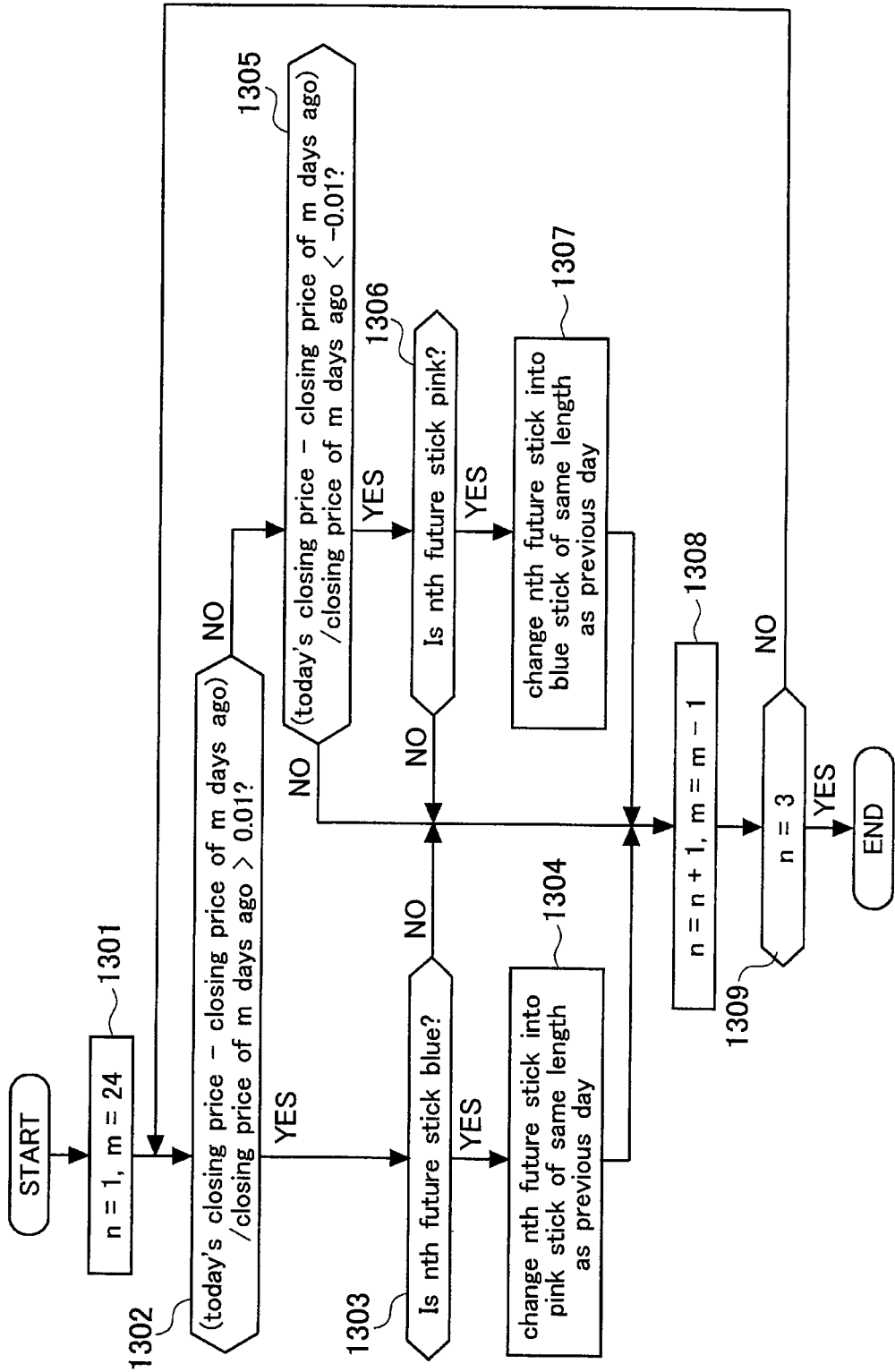
FIG. 20 is a detailed flowchart of a correction process.

A detailed flowchart of the correction process is shown in FIG. 20. In FIG. 20, when processing is started, first the client machine 20 initializes the count pointer to n=1, and the averaging day pointer to m=24 (Step 1301) and then pays attention to the absolute value of the divergence between the today's closing price and the closing price of m days ago (Step 1302 or 1305).

Specifically, if the value of divergence thus obtained [(today's closing price−closing price of m days ago)/closing price of m days ago] exceeds 0.01 (YES in Step 1302), the client machine 20 changes the nth future stick into a pink stick of the same length as the stick of the previous day (Step 1304), provided that the nth future stick is blue (YES in Step 1303).

On the other hand, if the divergence [(today's closing price−closing price of m days ago)/closing price of m days ago] is smaller than −0.01 (YES in Step 1305), the client machine 20 changes the nth future stick into a blue stick of the same length as the stick of the previous day (Step 1307), provided that the nth future stick is pink (YES in Step 1306).

The client machine 20 repeats the above process by incrementing the pointer n by 1 and decrementing the pointer m by 1 until the value of the count pointer n reaches "3". Consequently, the nearest two of the seven 25-day future sticks determined on a provisional basis are corrected based on a result of comparison between the divergence and a reference value (0.01 or −0.01).

Figure 21:
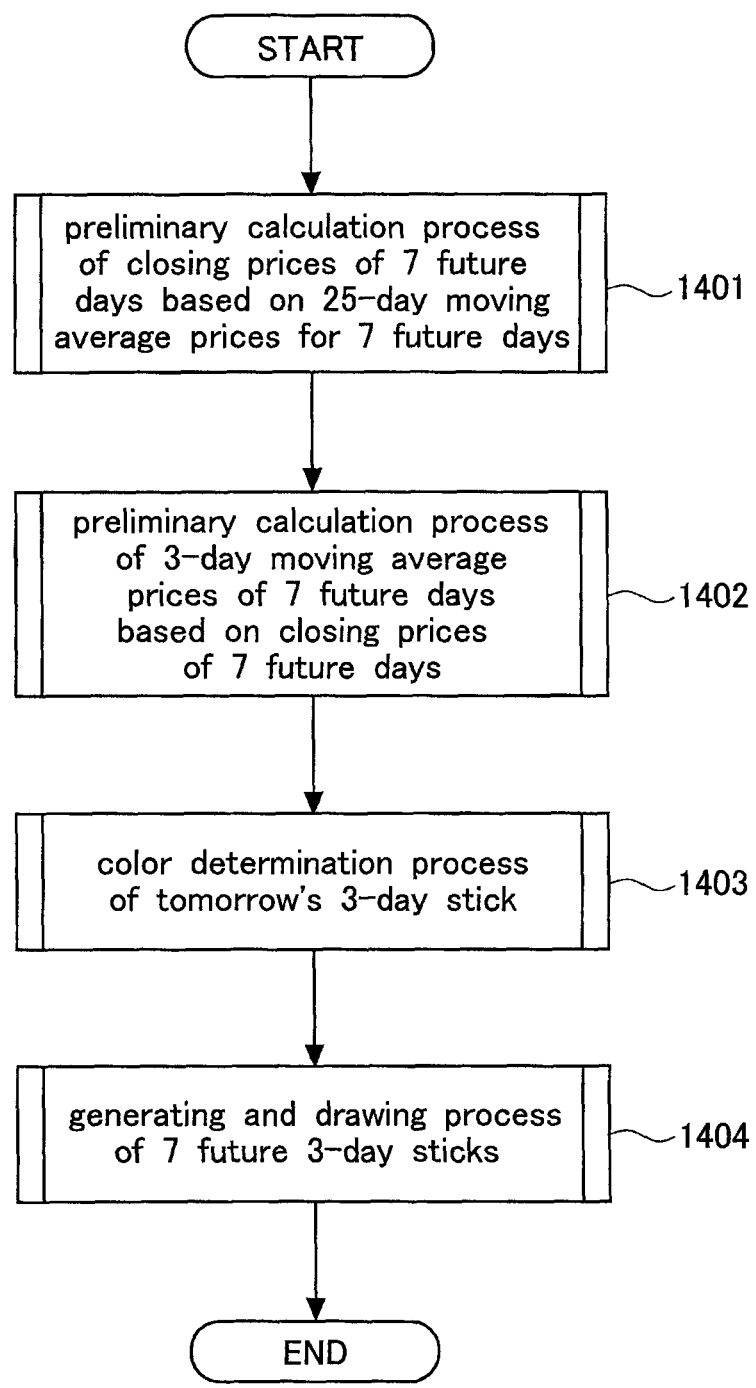
FIG. 21 is a general flowchart of a 3-day future stick drawing process.

A general flowchart of a 3-day future stick drawing process is shown in FIG. 21. As described above, the Masuda stick chart generation and display apparatus according the present invention draws 25-day Masuda future daily sticks as the most reliable future sticks. In addition, the Masuda stick chart generation and display apparatus can draw 3-day Masuda future sticks as required or automatically.

In FIG. 21, when processing is started, first the client machine 20 performs a preliminary calculation process of the closing prices of seven future days (Step 1401) based on the 25-day moving average prices for the seven future days determined in advance. A detailed flowchart of the process of provisionally calculating the closing prices of seven future days based on 25-day moving average prices of the seven future days is shown in FIG. 22.

Figure 22:
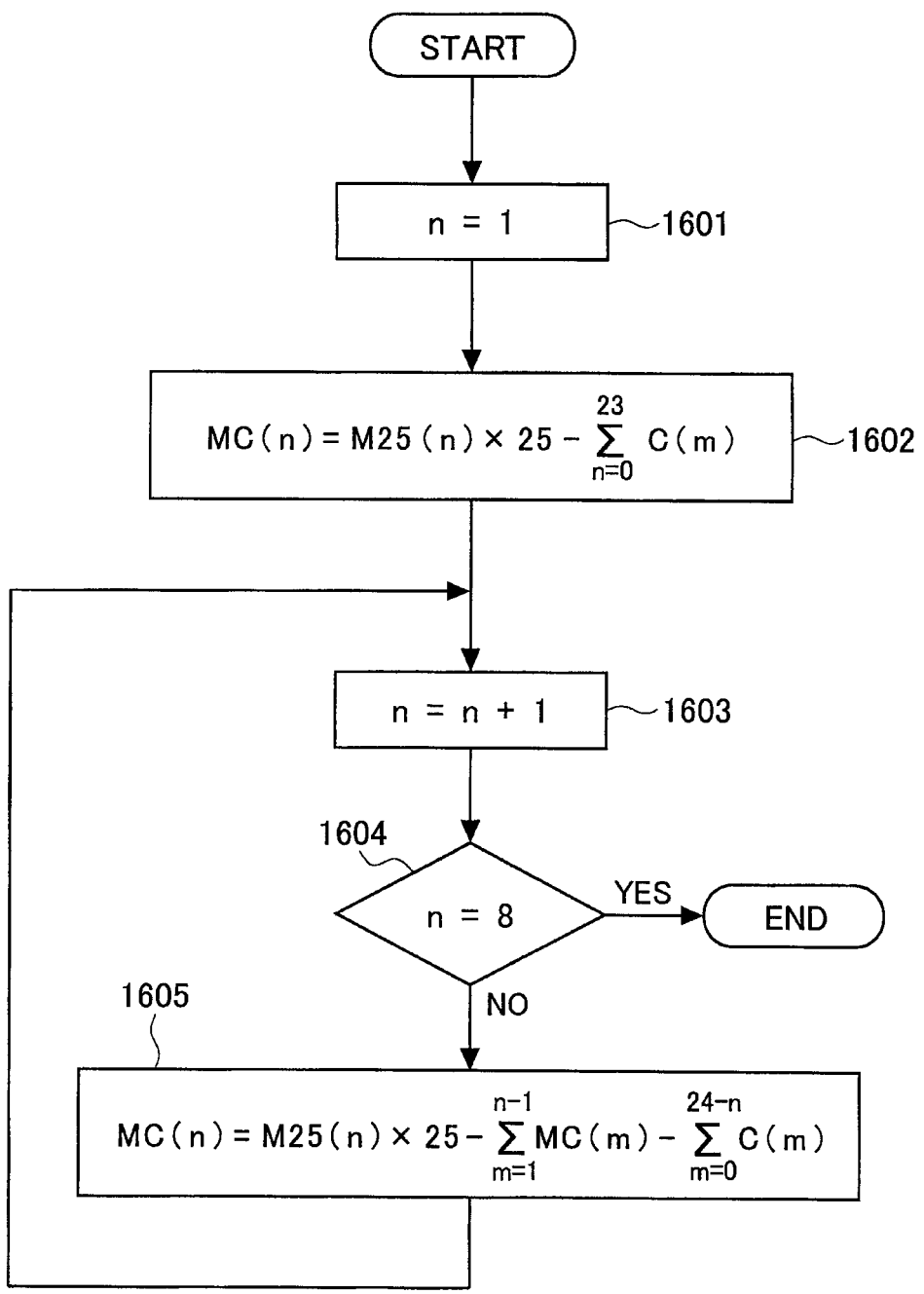
FIG. 22 is a detailed flowchart of the process of provisionally calculating closing prices of seven future days based on 25-day moving average prices of the seven future days.

In FIG. 22, when processing is started, first the client machine 20 initializes the count pointer to n=1 (Step 1601), and then determines the first future closing price MC(1) using the value of the pointer n based on a predetermined arithmetic expression (Step 1602).

Subsequently, the client machine 20 determines the second, third, . . . , and seventh future closing prices MC(2), MC(3), . . . , and MC(7) in sequence by incrementing the value of the count pointer n by 1 until the value of the count pointer n reaches "8" (Step 1605).

Returning to FIG. 21, when the preliminary calculation process of the closing prices of seven future days (Step 1401) is finished, the client machine 20 subsequently performs a preliminary calculation process of 3-day moving average prices of the seven future days (Step 1402) based on the closing prices of the seven future days thus determined.

Figure 23:
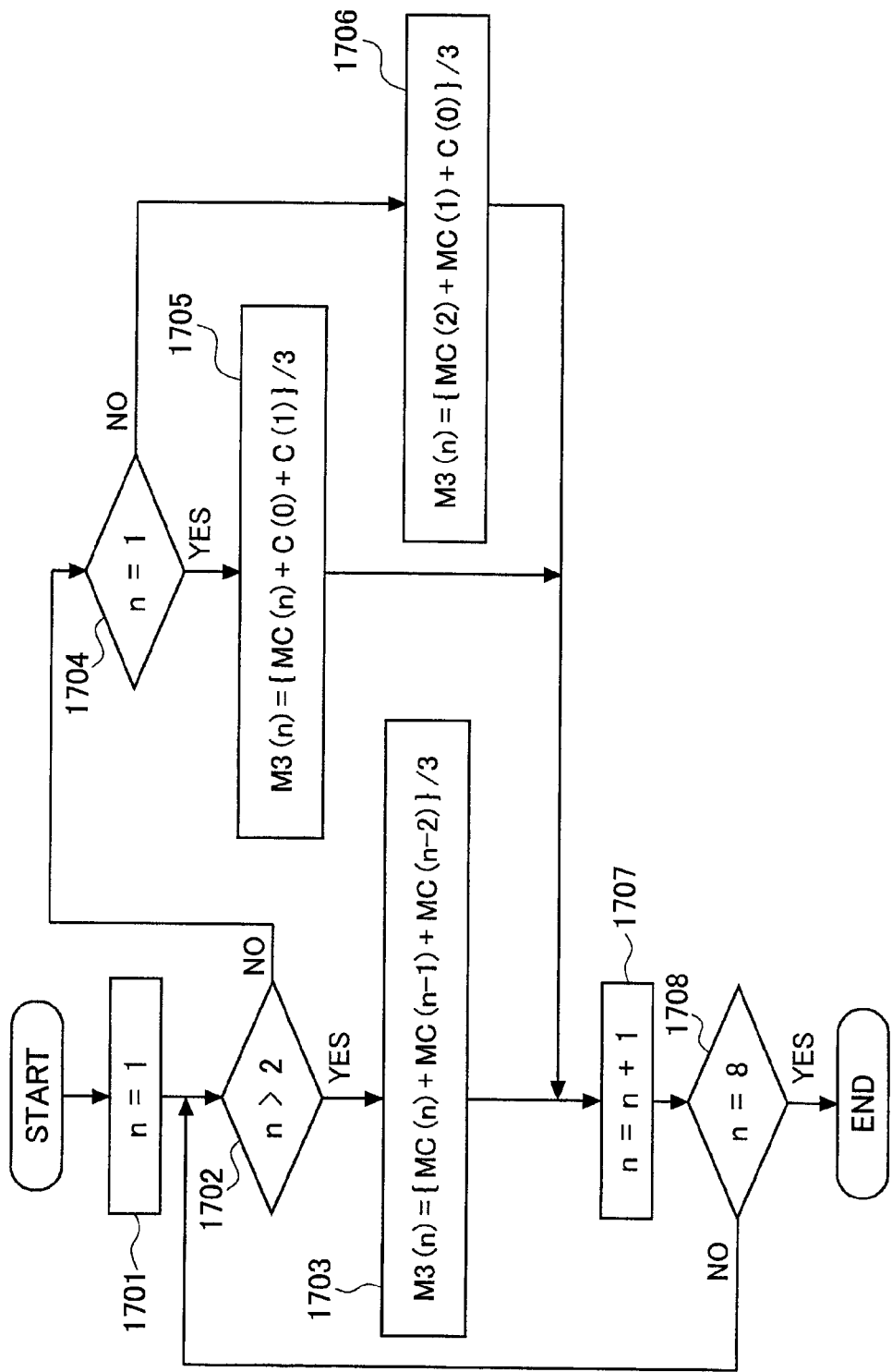
FIG. 23 is a detailed flowchart of a preliminary calculation process of 3-day moving average prices of seven future days.

A detailed flowchart of the preliminary calculation process of 3-day moving average prices of seven future days is shown in FIG. 23. In FIG. 23, when processing is started, first the client machine 20 initializes the count pointer to n=1 (Step 1701), and then selectively performs one of three types of arithmetic process (Steps 1703, 1705, 1706) according to the value of the pointer n by incrementing the value of the pointer n by 1 (Step 1707).

Specifically, when the value of the pointer n is "1" (YES in Step 1704), the client machine 20 divides the sum of the closing price MC(1) of the first future stick, closing price C(0) of today, and closing price C(1) of yesterday by "3" and thereby determines the first future 3-day moving average price M3(1) (Step 1705).

When the value of the pointer n is "2" (NO in Step 1704), the client machine 20 divides the sum of the closing price MC(2) of the second future stick, closing price MC(1) of the first future stick, and closing price C(0) of today by "3" and thereby determines the second future 3-day moving average price M3(2) (Step 1706).

Furthermore, when the value of the pointer n is "3" to "7" (YES in Step 1702), the client machine 20 divides the sum of the closing price MC(n) of the nth future stick, closing price MC(n−1) of the (n−1)th future stick, and closing price MC(n−2) of the (n−2)th future stick by "3" and thereby determines the nth future 3-day moving average price M3(n) (Step 1703).

Returning to FIG. 21, the client machine 20 subsequently performs a color determination process of tomorrow's 3-day stick (Step 1403). A detailed flowchart of a color determination process of tomorrow's 3-day stick is shown in FIG. 24.

Figure 24:
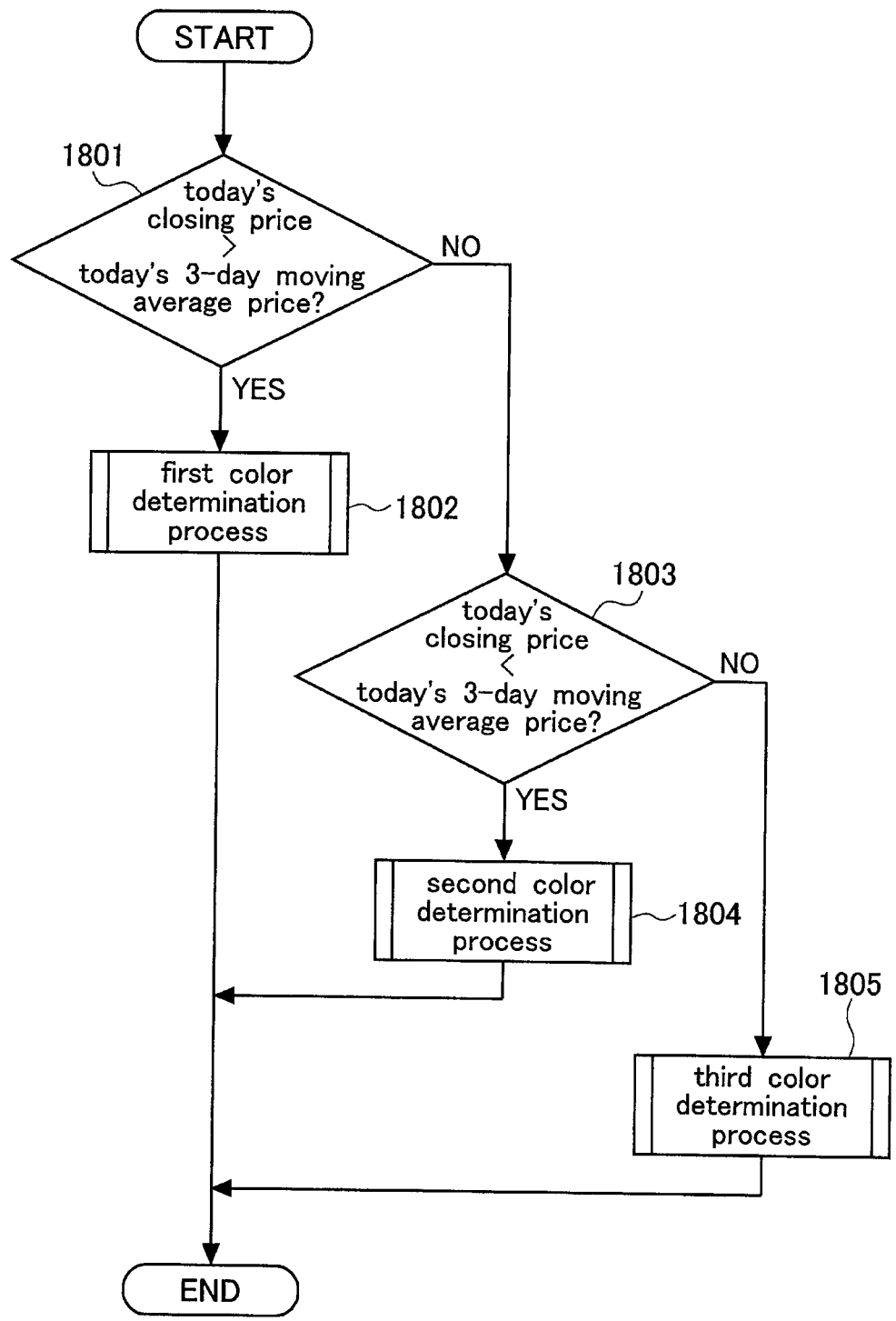
FIG. 24 is a detailed flowchart of a color determination process of tomorrow's 3-day stick.

In FIG. 24, when processing is started, first the client machine 20 performs a magnitude comparison between today's closing price and today's 3-day moving average price (Steps 1801 and 1803). If it is determined that today's closing price is higher than today's 3-day moving average price (YES in Step 1801), the client machine 20 performs a first color determination process (Step 1802). On the other hand, if it is determined that today's 3-day moving average price is higher than today's closing price (NO in Step 1801 and YES in Step 1803), the client machine 20 performs a second color determination process (Step 1804). Furthermore, if it is determined that today's closing price and today's 3-day moving average price are equal (NO in Steps 1801 and 1803), the client machine 20 performs a third color determination process (Step 1805).

Figure 25:
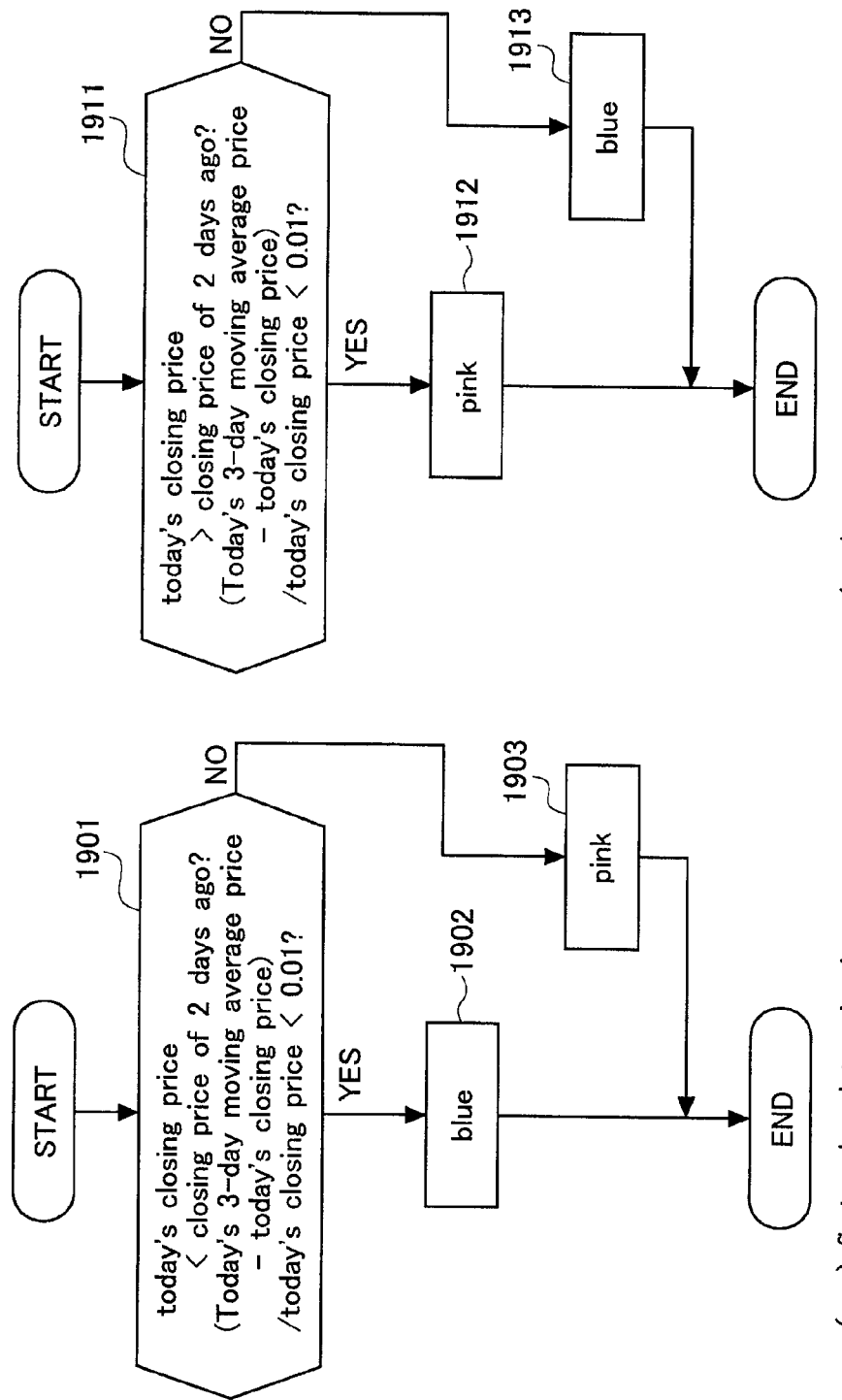
FIGS. 25(a) and 25(b) are detailed flowcharts of first and second color determination processes.

Detailed flowcharts of the first and second color determination processes are shown in FIGS. 25(*a*) and 25(*b*). As shown in FIG. 25(*a*), in the first color determination process, first the client machine 20 determines whether the closing price of two days ago is higher than today's closing price and whether the divergence between today's 3-day moving average price and today's closing price is smaller than 0.01 (Step 1901). If a result of the determination is affirmative (YES in Step 1901), the color of tomorrow's 3-day stick is determined to be blue (Step 1902). On the other hand, if the result of the determination is negative (NO in Step 1901), the color of tomorrow's 3-day stick is determined to be pink (Step 1903).

As shown in FIG. 25(*b*), in the second color determination process, first the client machine 20 determines whether today's closing price is higher than the closing price of two days ago and whether the divergence between today's 3-day moving average price and today's closing price is smaller than 0.01 (Step 1911). If a result of the determination is affirmative (YES in Step 1911), the color of tomorrow's 3-day stick is determined to be pink (Step 1912). On the other hand, if the result of the determination is negative (NO in Step 1911), the color of tomorrow's 3-day stick is determined to be blue (Step 1913).

Figure 26:
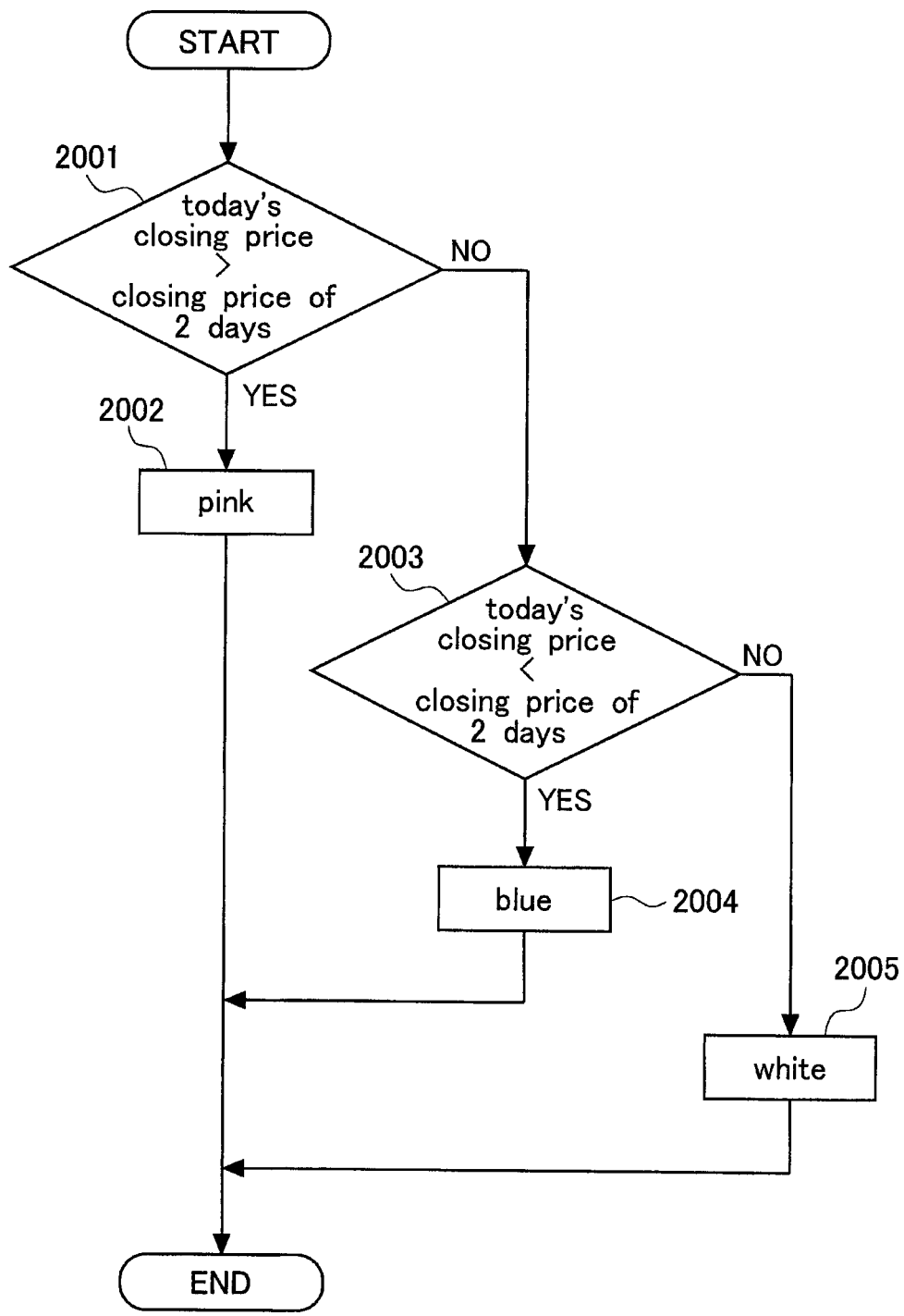
FIG. 26 is a detailed flowchart of a third color determination process.

A detailed flowchart of the third color determination process is shown in FIG. 26. In FIG. 26, when processing is started, first the client machine 20 performs a magnitude comparison between today's closing price and the closing price of two days ago (Steps 2001 and 2003). If it is determined that today's closing price is higher than the closing price of two days ago (YES in Step 2001), the color of tomorrow's 3-day stick is determined to be pink (Step 2002).

On the other hand, if it is determined that today's closing price is lower than the closing price of two days ago (NO in Step 2001 and YES in Step 2003), the color of tomorrow's 3-day stick is determined to be blue (Step 2004). Furthermore, if it is determined that the closing price of two days ago and today's closing price are equal (NO in Steps 2001 and 2003), the color of tomorrow's 3-day stick is determined to be white (Step 2005).

Returning to FIG. 21, the client machine 20 subsequently performs a generating and drawing process of seven future 3-day sticks (Step 1404). Details of the generating and drawing process of seven future 3-day sticks is shown in FIG. 27.

Figure 27:
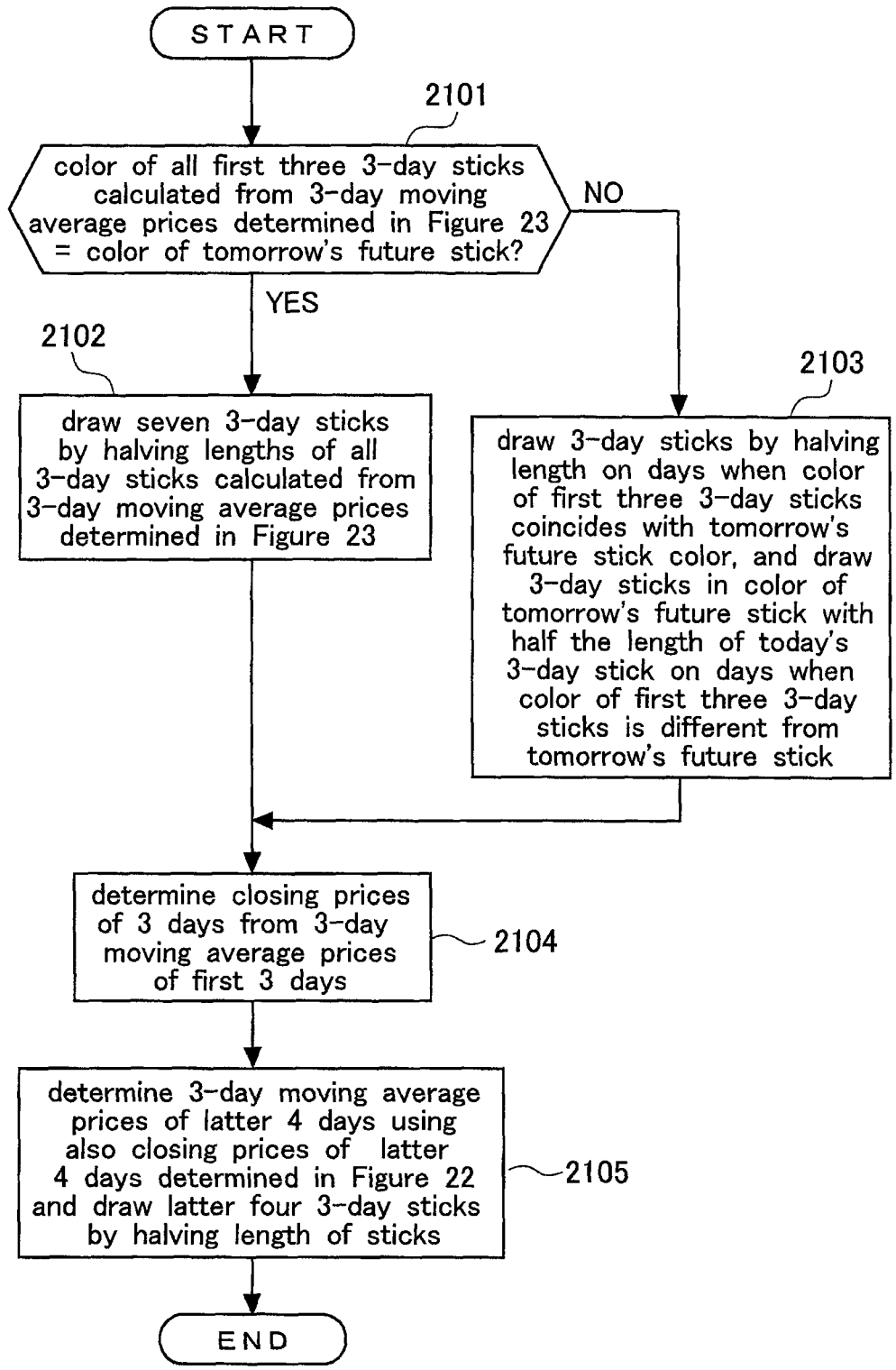
FIG. 27 is a flowchart showing a drawing process of seven future 3-day sticks.

In FIG. 27, when processing is started, the client machine 20 determines whether all the first three 3-day sticks calculated from the 3-day moving average prices determined in FIG. 23 coincide in color with tomorrow's future stick (Step 2101).

If a result of the determination is affirmative (YES in Step 2101), the client machine 20 halves the lengths of all the 3-day sticks calculated from the 3-day moving average prices determined in FIG. 23 and draws seven 3-day sticks using the halved lengths (Step 2102).

On the other hand, if the result of the determination is negative (NO in Step 2101), the client machine 20 draws the 3-day sticks by halving the length on days when the color of the first three 3-day sticks coincides with tomorrow's look-ahead color, and draws the 3-day sticks in half the length of today's 3-day stick using the color of tomorrow's future stick on days when the color of the first three 3-day sticks is different from tomorrow's look-ahead color (Step 2103).

Subsequently, the client machine 20 determines the closing prices of three days from the 3-day moving average prices of the first three days (Step 2104). Then, the client machine 20 determines the 3-day moving average prices of the latter four days using also the closing prices of the latter four days determined in FIG. 22 and draws the latter four 3-day sticks by halving the length of the sticks (Step 2105). Consequently, the drawing process of 3-day future sticks is completed.

Figure 28:
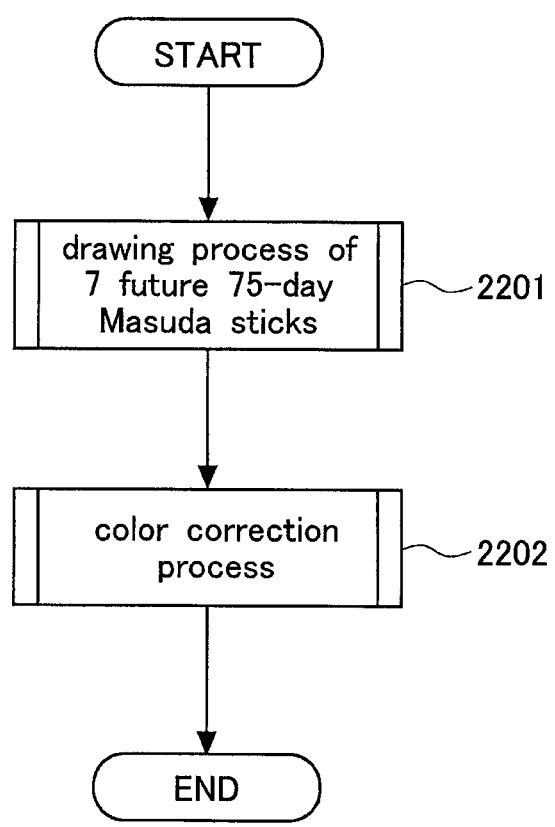
FIG. 28 is a flowchart showing a drawing process of 75-day future sticks.

A drawing process of 75-day future sticks is outlined in FIG. 28. As shown in FIG. 28, the drawing process of 75-day future sticks includes a drawing process of seven future 75-day Masuda sticks (Step 2201) and a color correction process (Step 2202).

Figure 29:
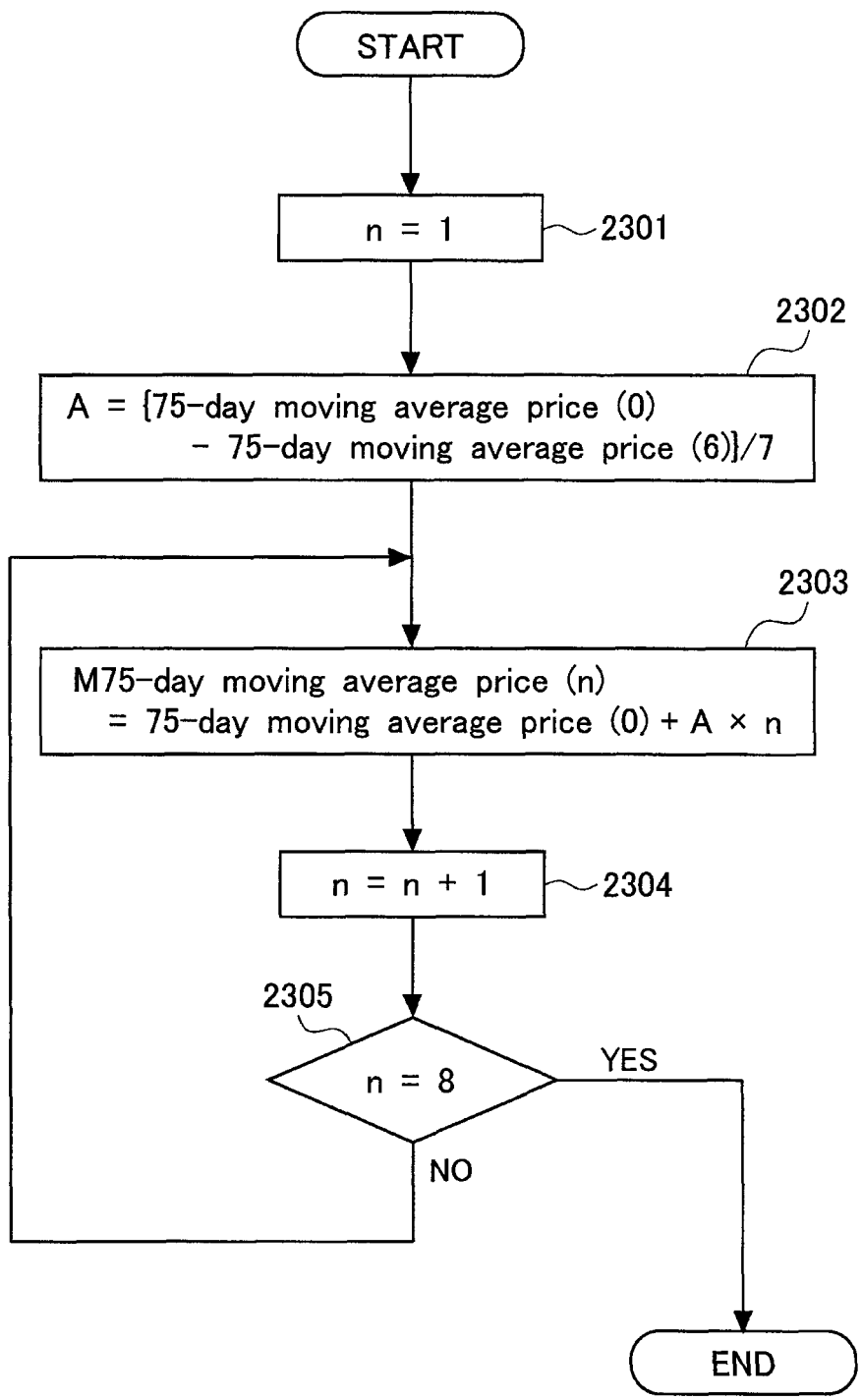
FIG. 29 is a detailed flowchart of a drawing process of seven future 75-day sticks.

A detailed flowchart of the drawing process of seven future 75-day Masuda sticks is shown in FIG. 29. In FIG. 29, when processing is started, first the client machine 20 initializes the value of the count pointer n to "1", subtracts the 75-day moving average price of six days ago from today's 75-day moving average price, divide the difference by "7" which is the number of days therebetween and thereby determines a change A per day therebetween (Step 2302).

Subsequently, the client machine 20 adds changes of n sticks to today's 75-day moving average price in sequence, to determine 75-day future moving average prices M75 moving average prices (n), by incrementing the value of the pointer n by "1" until the value of the pointer n reaches "8" (Step 2303). Consequently, the first to seventh 75-day future sticks are drawn.

Figure 30:
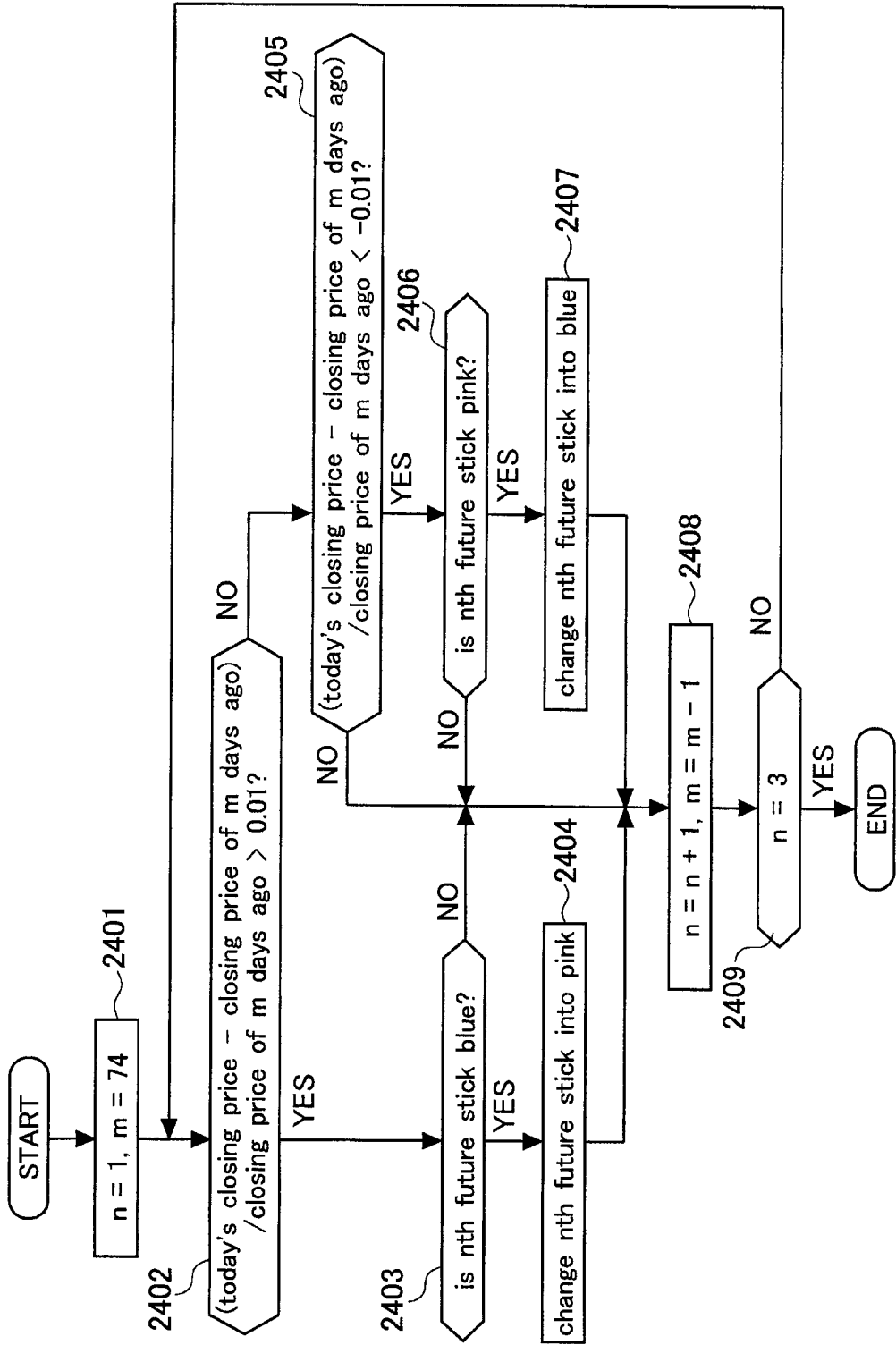
FIG. 30 is a detailed flowchart a color correction process.

A detailed flowchart of the color correction process is shown in FIG. 30. In FIG. 30, when processing is started, the client machine 20 initializes the value of the count pointer n to "1", and the averaging day pointer m to "74" (Step 2401) and then determines whether the absolute value of the divergence between today's closing price and the closing price of m days ago is larger than 0.01 (Step 2402 or 2405).

If the divergence is larger than 0.01 (YES in Step 2402), the client machine 20 changes the color of the nth future stick to pink, provided that the nth future stick is blue (YES in Step 2403). On the other hand, if the divergence between today's closing price and the closing price of m days ago is smaller than −0.01 (YES in Step 2405), the client machine 20 changes the color of the nth future stick into blue (Step 2407), provided that the nth future stick is pink (YES in Step 2406).

The client machine 20 repeats the above process by incrementing the pointer n by "1" and decrementing the pointer m by "1" until the value of the pointer n reaches "3". Consequently, only the nearest two future sticks are corrected, as required, based on the divergence between today's closing price and the closing price of m days ago.

Figure 31:
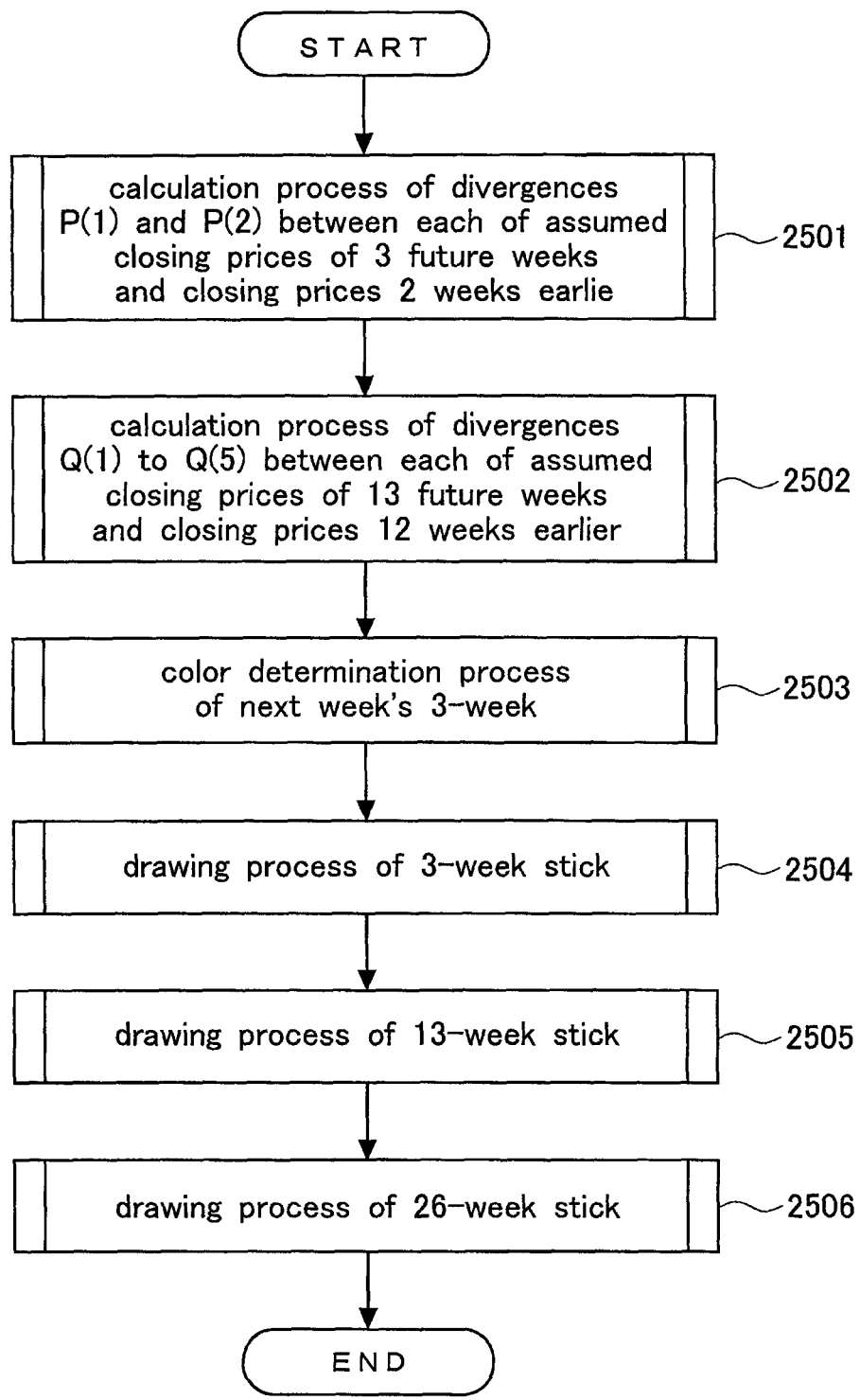
FIG. 31 is a general flowchart of a future weekly stick creation process.

A general flowchart of a future weekly stick creation process is shown in FIG. 31. As shown in FIG. 31, the future weekly stick creation process includes a calculation process of divergences P(1) and P(2) between assumed closing prices of three future weeks and closing prices two weeks earlier (Step 2501), a calculation process of divergences Q(1) to Q(12) between assumed closing prices of thirteen future weeks and closing prices twelve weeks earlier (Step 2502), a color determination process of next week's 3-week stick (Step 2503), a drawing process of the 3-week stick (Step 2504), a drawing process of a 13-week stick (Step 2505), and a drawing process of a 26-week stick (Step 2506).

Figure 32:
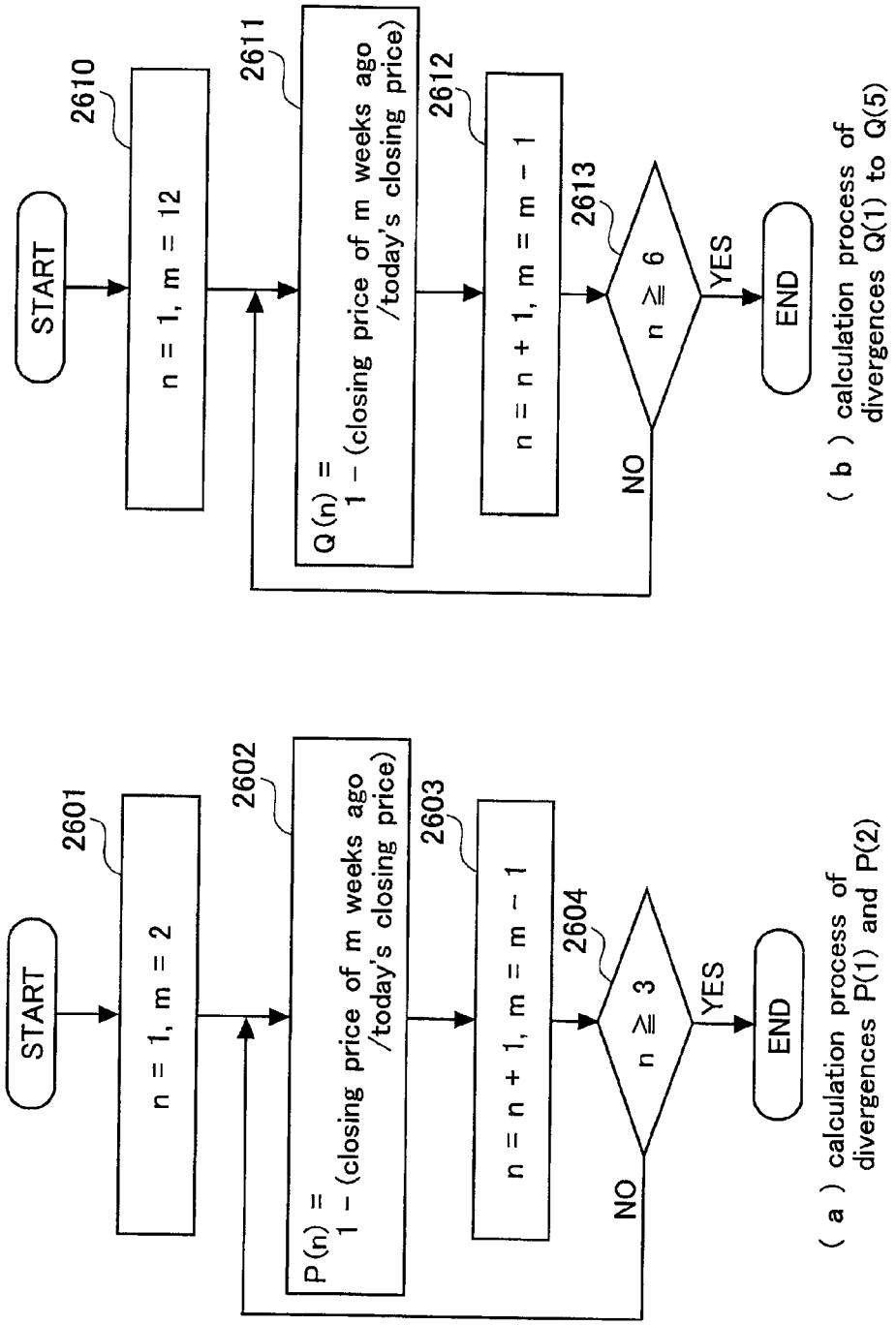
FIGS. 32(a) and 32(b) are detailed flowcharts of divergence calculation processes.

The calculation process of the divergences P(1) and P(2) between assumed closing prices of three future weeks and closing prices two weeks earlier is shown in FIG. 32(*a*).

Specifically, when processing is started, the client machine 20 initializes the value of the count pointer n to "1", and the averaging day pointer m to "2" (Step 2601) and then repeats calculating the divergence P(n) between the closing price of the mth week and today's closing price by incrementing the value of the pointer n by "1" and decrementing the value of the pointer m by "1" until the value of the pointer n reaches or exceeds "3" (Step 2604). Consequently, two divergences P(1) and P(2) are determined.

Figure 33:
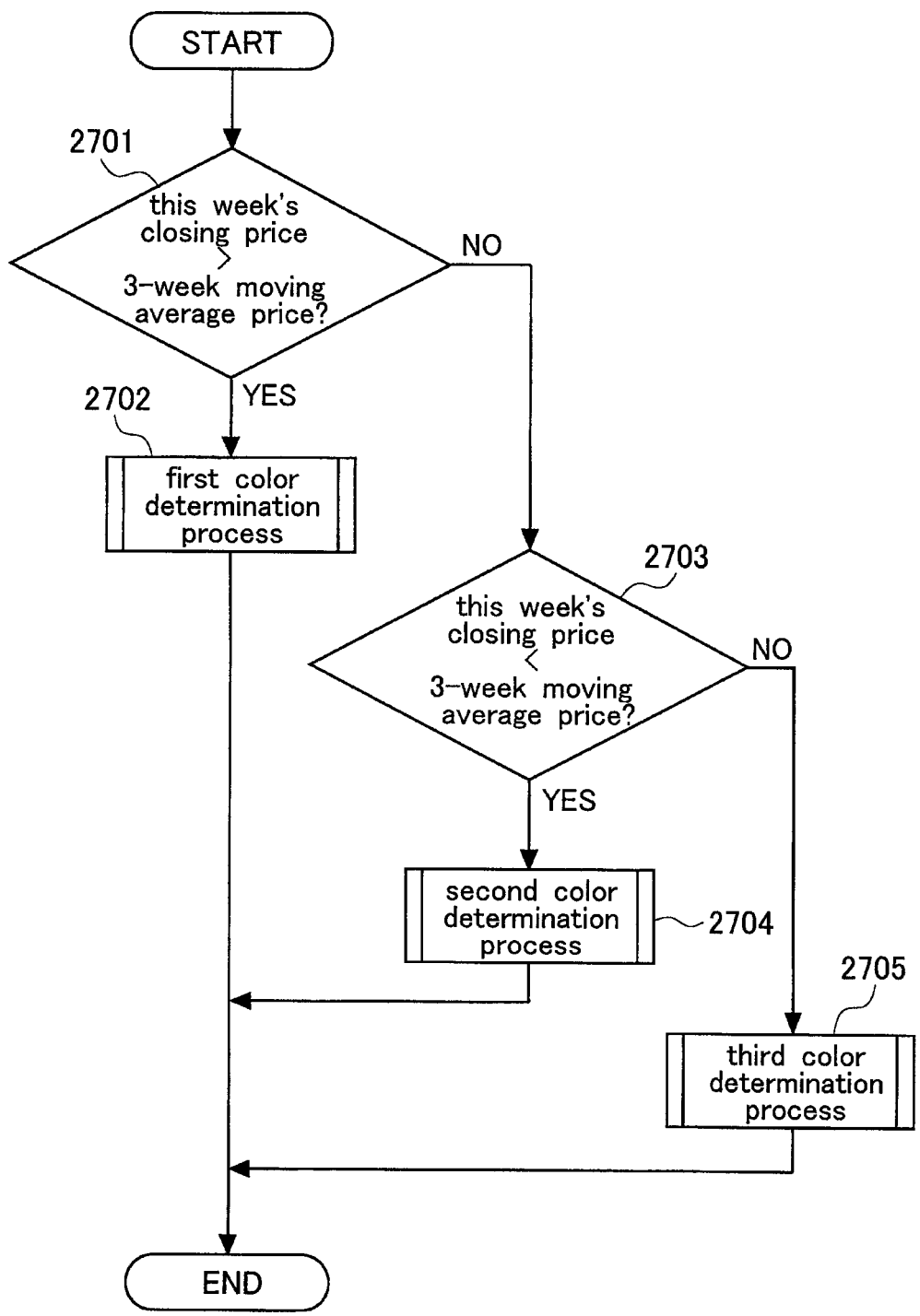
FIG. 33 is a detailed flowchart of a color determination process of next week's 3-week stick.

The calculation process of the divergences Q(1) to Q(12) between assumed closing prices of thirteen future weeks and closing prices twelve weeks earlier is shown in FIG. 33(*b*). In the figure, when processing is started, first the client machine 20 initializes the value of the count pointer n to "1", and the averaging count pointer m to "12", and then repeats calculating the divergence Q(n) between the closing price m weeks earlier and today's closing price by incrementing the value of the count pointer n by "1" and decrementing the value of the averaging count pointer m by "1" until the value of the pointer n reaches "6" (Step 2611). Consequently, divergences Q(1) to Q(5) are determined.

A detailed flowchart of the color determination process of next week's 3-week stick is shown in FIG. 33. In FIG. 33, when processing is started, first the client machine 20 performs a magnitude comparison between this week's closing price and a 3-week moving average price (Step 2701 or 2703).

If it is determined that this week's closing price is higher than the 3-week moving average price (YES in Step 2701), the client machine 20 performs a first color determination process (Step 2702). On the other hand, if it is determined that the 3-week moving average price is higher than this week's closing price (YES in Step 2703), the client machine 20 performs a second color determination process (Step 2704). Furthermore, if it is determined that this week's closing price and the 3-week moving average price are equal (NO in Steps 2701 and 2703), the client machine 20 subsequently performs a third color determination process (Step 2705).

Figure 34:
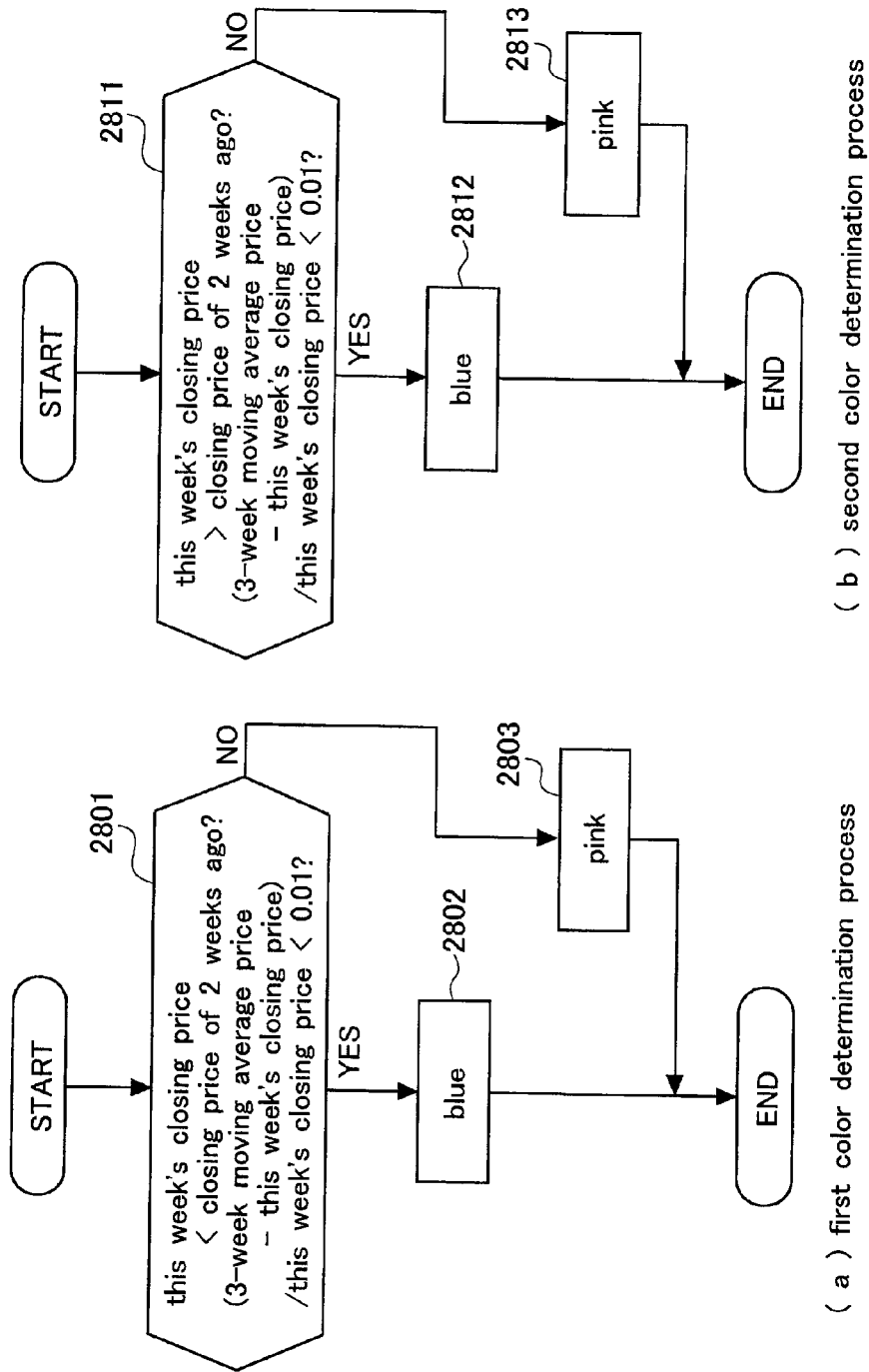
FIGS. 34(a) and 34(b) are detailed flowcharts of first and second color determination processes.

Detailed flowcharts of the first and second color determination processes are shown in FIGS. 34(*a*) and 34(*b*). As shown in FIG. 34(*a*), in the first color determination process, first the client machine 20 determines whether the closing price two weeks earlier is higher than this week's closing price and whether the divergence between the 3-week moving average price and this week's closing price is smaller than 0.01 (Step 2801).

If a result of the determination is affirmative (YES in Step 2801), the color of next week's 3-week stick is determined to be blue (Step 2802). On the other hand, if the result of the determination is negative (NO in Step 2801), the color of next week's 3-week stick is determined to be pink (Step 2803).

As shown in FIG. 34(*b*), in the second color determination process, first the client machine 20 determines whether this week's closing price is higher than the closing price two weeks earlier and whether the divergence between the 3-week moving average price and this week's closing price is smaller than 0.01 (Step 2811). If a result of the determination is affirmative (YES in Step 2811), the color of next week's 3-week stick is determined to be blue (Step 2812). On the other hand, if the result of the determination is negative (NO in Step 2811), the color of next week's 3-week stick is determined to be pink (Step 2813).

Figure 35:
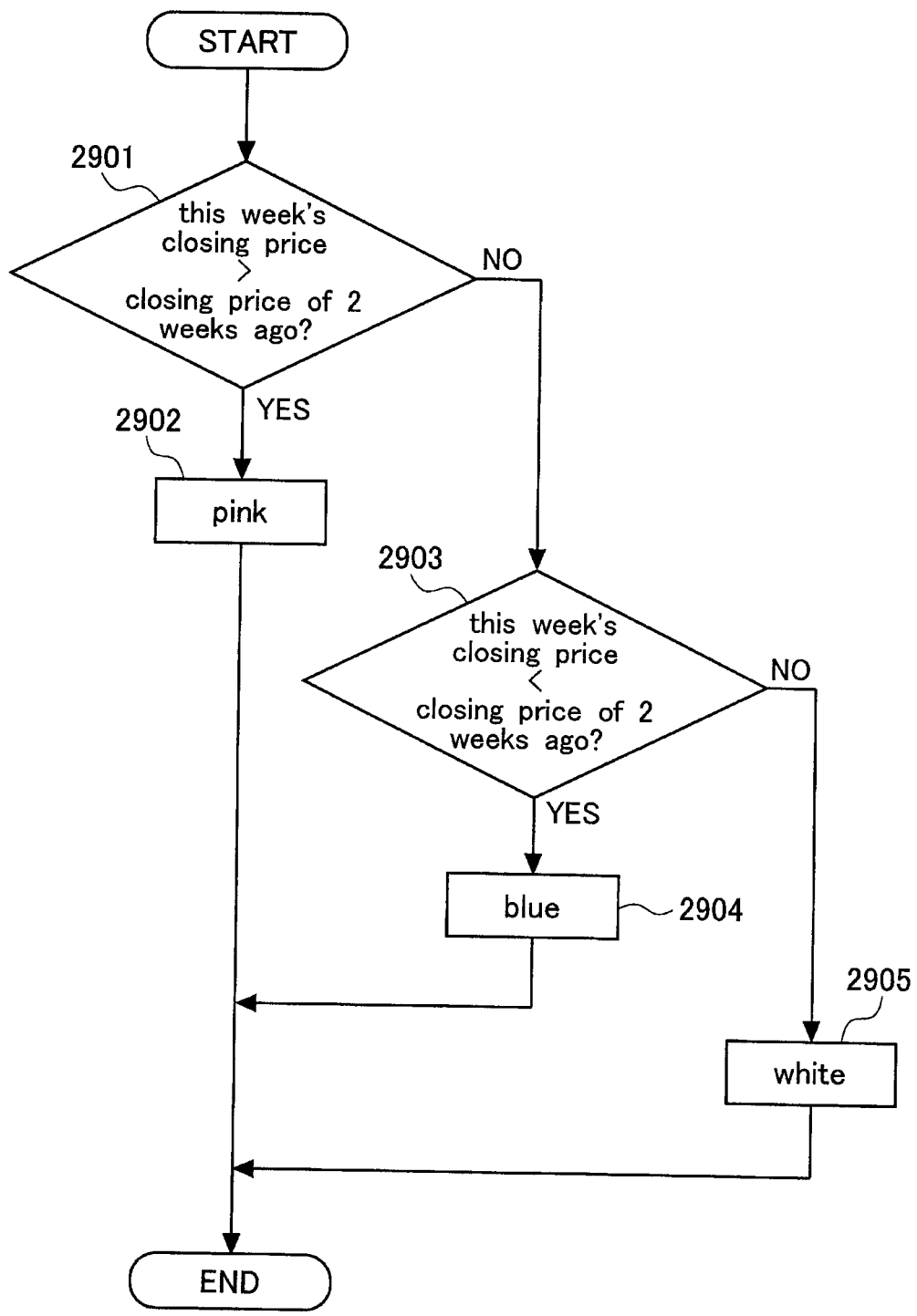
FIG. 35 is a detailed flowchart of a third color determination process.

A detailed flowchart of the third color determination process is shown in FIG. 35. In FIG. 35, when processing is started, first the client machine 20 performs a magnitude comparison between this week's closing price and the closing price two weeks earlier (Steps 2901 and 2903).

If it is determined that this week's closing price is higher than the closing price two weeks earlier (YES in Step 2901), the color of next week's 3-week stick is determined to be pink (Step 2902). On the other hand, if the closing price two weeks earlier is higher than this week's closing price (NO in Step 2901 and YES in Step 2903), the color of next week's 3-week stick is determined to be blue (Step 2904).

Furthermore, if it is determined that this week's closing price and the closing price two weeks earlier are equal (NO in Steps 2901 and 2903), the color of next week's 3-week stick is determined to be white, meaning that the two closing prices are equal (Step 2905).

Returning to FIG. 31, the client machine 20 subsequently performs the drawing process of a 3-week stick (Step 2504), drawing process of a 13-week stick (Step 2505), and drawing process of a 26-week stick (Step 2506) in sequence.

Figure 36:
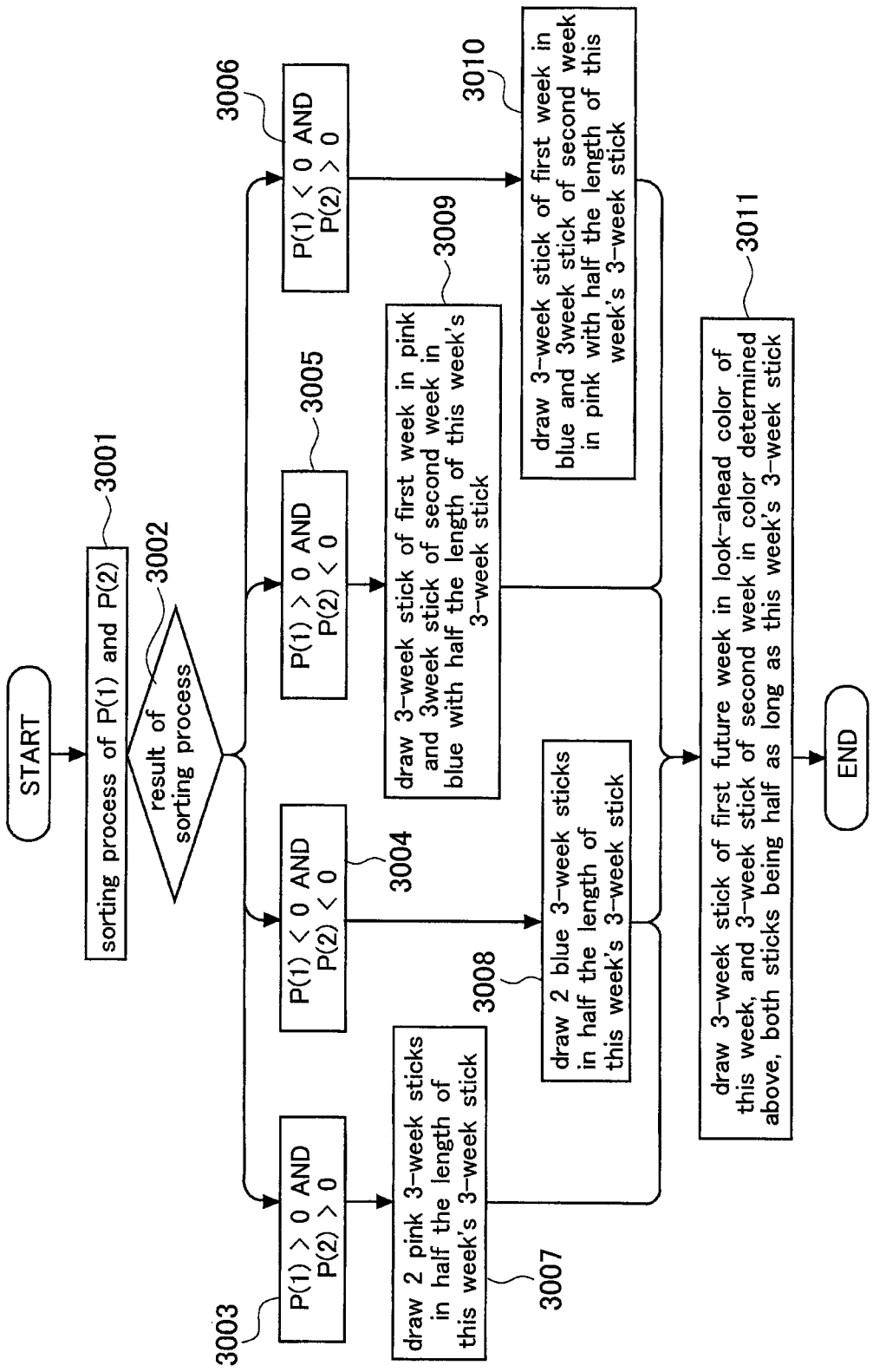
FIG. 36 is a flowchart of a drawing process of 3-week sticks.

A detailed flowchart of the drawing process of 3-week sticks is shown in FIG. 36. As shown in FIG. 36, when processing is started, first the client machine 20 performs a sorting process of P(1) and P(2) determined above (Step 3001). According to a result of the sorting process (Step 3002), first the client machine 20 goes to one of four processes (Steps 3003, 3004, 3005, and 3006).

Specifically, when both P(1) and P(2) are positive (Step 3003), the client machine 20 draws two pink 3-week sticks in half the length of this week's 3-week stick (Step 3007).

When both P(1) and P(2) are negative (Step 3004), the client machine 20 draws two blue 3-week sticks in half the length of this week's 3-week stick (Step 3008).

When P(1) is positive and P(2) is negative (Step 3005), the client machine 20 draws the 3-week stick of the first week in pink and 3-week stick of the second week in blue with half the length of this week's 3-week stick (Step 3009).

Furthermore, when P(1) is negative and P(2) is positive (Step 3006), the client machine 20 draws the 3-week stick of the first week in blue and 3-week stick of the second week in pink with half the length of this week's 3-week stick (Step 3010).

After any of the above processes (Steps 3007 to 3010), the 3-week stick of the first future week is drawn in the look-ahead color of this week and the 3-week stick of the second week is in the color determined above, both sticks being half as long as this week's 3-week stick (Step 3011).

Figure 37:
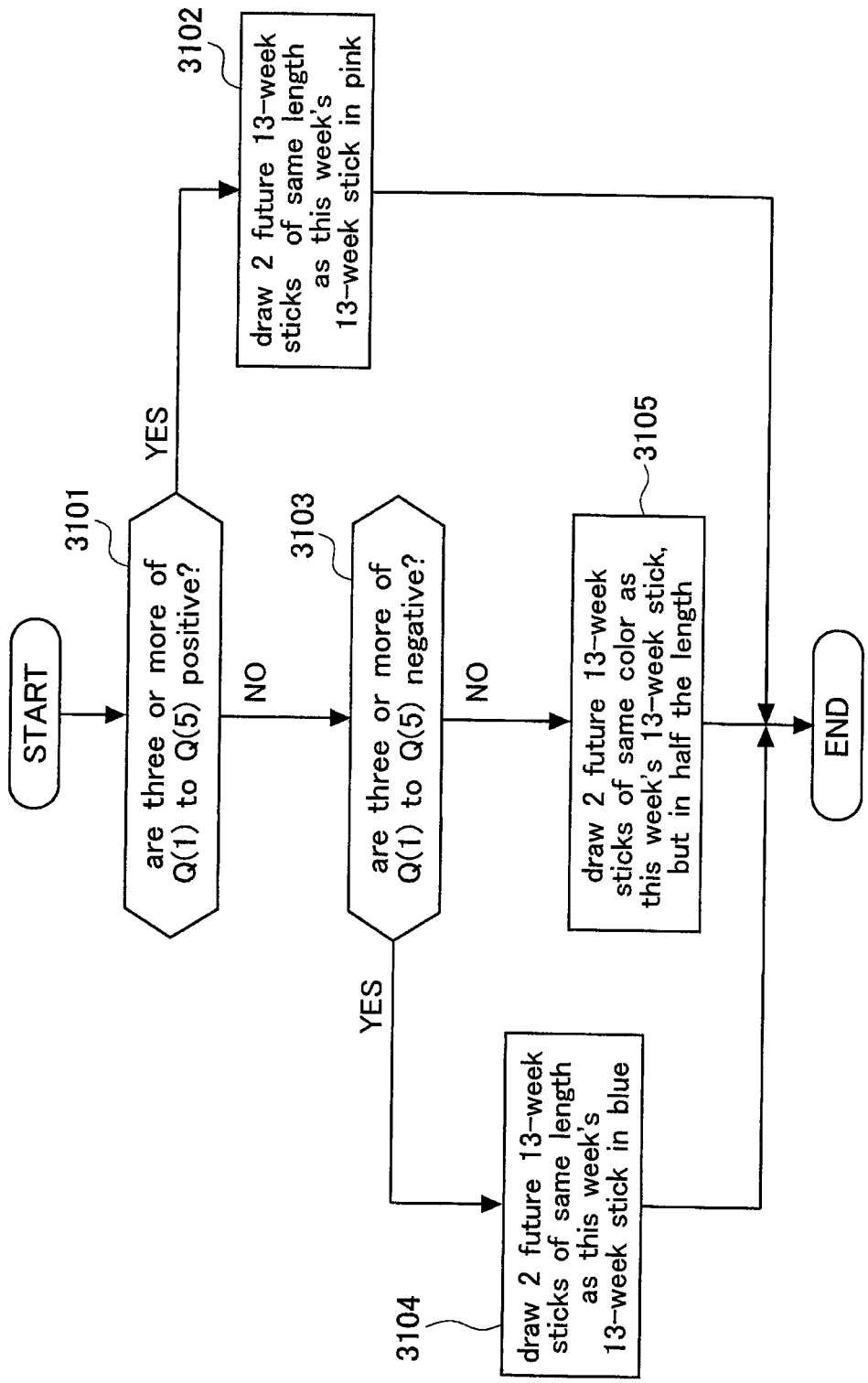
FIG. 37 is a detailed flowchart of a drawing process of 13-week sticks.

A detailed flowchart of the drawing process of 13-week sticks is shown in FIG. 37. In FIG. 35, when processing is started, first the client machine 20 determines whether three or more of Q(1) to Q(5) are positive (Step 3101).

If a result of the determination is affirmative (YES in Step 3101), the client machine 20 draws two future 13-week sticks of the same length as this week's 13-week stick in pink (Step 3102). If the result of the determination is negative (NO in Step 3101), the client machine 20 further determines whether three or more of Q(1) to Q(5) are negative (Step 3103).

If a result of the determination is affirmative (YES in Step 3103), the client machine 20 draws two future 13-week sticks of the same length as this week's 13-week stick in blue (Step 3104). On the other hand, if the result of the determination is negative (NO in Step 3103), the client machine 20 draws two future 13-week sticks of the same color as this week's 13-week stick, but in half the length of this week's 13-week stick (Step 3105).

Figure 38:
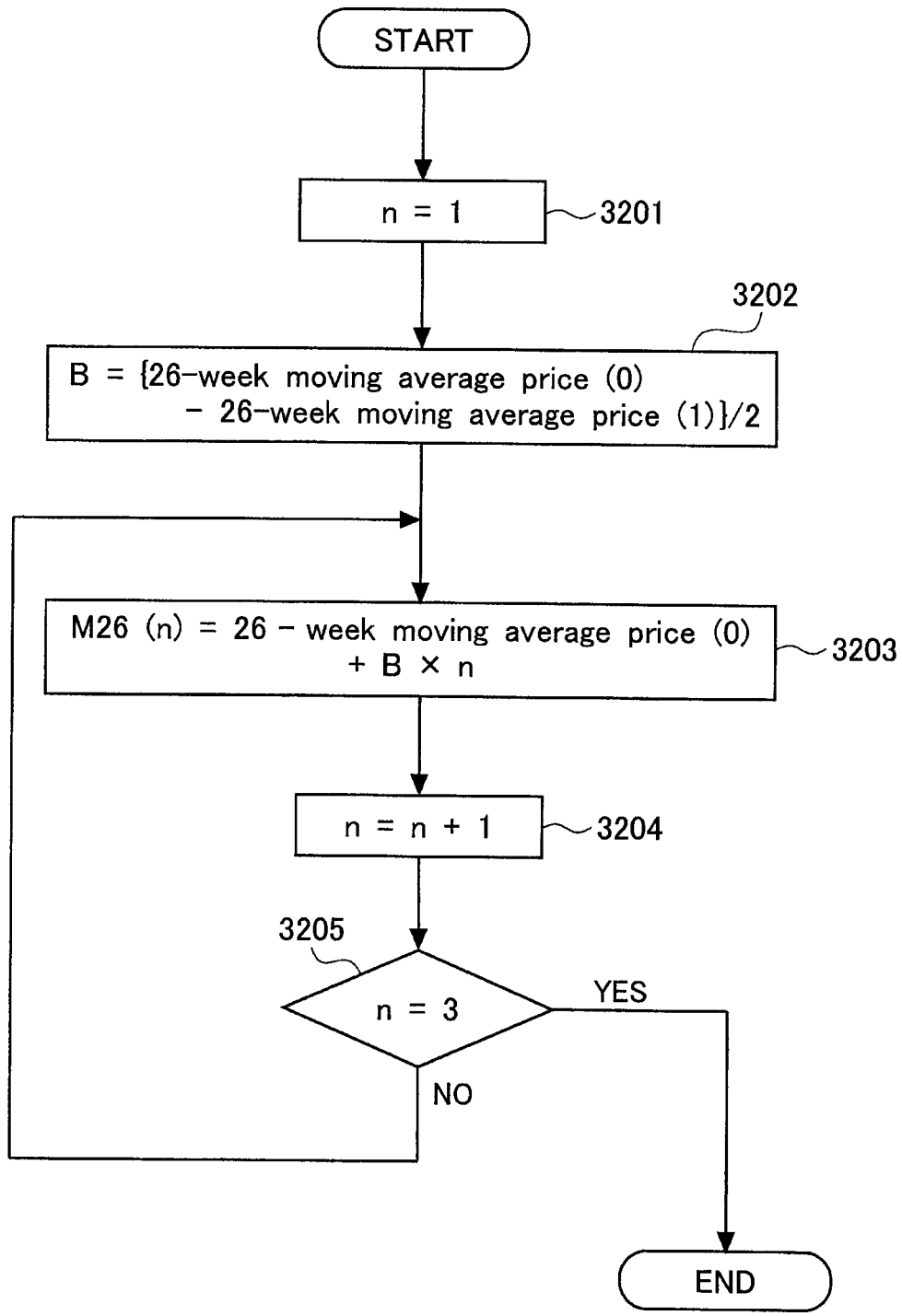
FIG. 38 is a detailed flowchart of a drawing process of 26-week sticks.

Finally, a detailed flowchart of the drawing process of 26-week sticks is shown in FIG. 38. In FIG. 38, when processing is started, first the client machine 20 initializes the value of the count pointer n to 1 (Step 3201), and then subtracts last week's 26-week moving average price from this week's 26-week moving average price, divide the difference by "2", and thereby determines a change per day of the 26-week moving average price (Step 3202).

Subsequently, the client machine 20 adds as many changes B as there are sticks to the value of today's 26-week moving average price in sequence and thereby determines n 26-week sticks M26(n) by incrementing the value of the pointer n by 1 until the value of the pointer n reaches "3". Consequently, M26(1) and M26(2) are determined.

In this way, the Masuda stick chart generation and display apparatus according to the present invention can selectively draw short-term, medium-term, and long-term Masuda future daily sticks and short-term, medium-term, and long-term Masuda future weekly sticks, as required, together with a conventional Masuda stick curve in the future area of the Masuda chart, allowing users to visually recognize how the conventional Masuda stick curve will change in future. Consequently, the users can judge sell timing and buy timing to their advantage.

The present invention makes it possible to draw Masuda future stick lines successively in addition to a Masuda stick curve on the Masuda stick chart, allowing users to see price trends of objects traded on the market, such as stocks, bonds, currencies, and commodities, for the near future and thereby improving the usability of such charts.

The invention claimed is:

1. A Masuda stick chart generation and display apparatus which expresses price trends of objects traded on the market, such as stocks, bonds, currencies, and commodities, using three Masuda stick curves, namely, a short-term Masuda stick curve, a medium-term Masuda stick curve, and a long-term Masuda stick curve corresponding to daily sticks, weekly sticks, and monthly sticks, respectively, comprising:
   a programmable computer processor;
   basic data storing unit which stores basic data including a series of daily price strings, weekly price strings, and monthly price strings going back a predetermined period from the present point in time, and a series of short-term moving average price strings, medium-term moving average price strings, and long-term moving average price strings related, respectively, to the series of daily price strings, weekly price strings, and monthly price strings, as well as a pair of neighboring average price strings which define upper and lower ends of daily sticks, weekly sticks, and monthly sticks, and stick color value strings which represent distinctions between dark and light colors for the daily sticks, weekly sticks, and monthly sticks;
   Masuda stick curve generating and drawing unit which generates and draws short-term, medium-term, and long-term Masuda stick curves related to daily sticks, weekly sticks, or monthly sticks based on the basic data stored in the basic data storing unit; and
   Masuda future stick curve generating and drawing unit which generates and draws short-term, medium-term, and long-term Masuda future stick curves related to the daily sticks or weekly sticks based on the basic data stored in the basic data storing unit means wherein the Masuda future stick curve generating and drawing unit comprises medium-term Masuda future daily stick curve generating and drawing unit which generates and draws a medium-term Masuda future daily stick string of a predetermined number of days after today:

wherein the medium-term Masuda future daily stick curve generating and drawing unit comprises a first medium-term Masuda future daily stick string generating and drawing unit which, if a trend change in stick color value is detected with a first stick color value continuing for a predetermined number of times or more and then a second stick color value continuing for a predetermined number of times or more up to today in a medium-term Masuda daily stick curve for a predetermined number of most recent days, generates a medium-term Masuda future daily stick string for a predetermined number of days after today according to a predetermined rule corresponding to the detected trend;

wherein the medium-term Masuda future daily stick curve generating and drawing unit comprises a second medium-term Masuda future daily stick string generating and drawing unit which determines a divergence value string of divergences between a daily price of today and daily prices of days earlier, by the number of days in a medium-term interval, than a predetermined number of future days, determines a breakdown of the divergence value string by polarity, and generates and draws a medium-term Masuda future daily stick string for a predetermined number of days after today based on determination as to which polarity a majority belongs and according to a predetermined rule.

2. The Masuda stick chart generation and display apparatus according to claim 1, further comprising a correction unit means-which determines a divergence value string of divergences between a daily price of today and daily prices of days earlier, by the number of days in a medium-term interval, than a predetermined number of near days, and corrects a medium-term Masuda future daily stick string for the predetermined number of near days after today based on determination as to whether absolute values of the divergences in the divergence value string exceed a predetermined value and according to a predetermined rule.

3. The Masuda stick chart generation and display apparatus according to claim 1, wherein the Masuda future stick curve generating and drawing unit further comprises short-term Masuda future daily stick curve generating and drawing unit which generates and draws a short-term Masuda future daily stick string for a predetermined number of days after today based on the medium-term Masuda future daily stick string generated by the medium-term Masuda future daily stick curve generating and drawing unit for a predetermined number of days after today.

4. The Masuda stick chart generation and display apparatus according to claim 3, wherein the short-term Masuda future daily stick curve generating and drawing unit comprises:

daily price string preliminary-calculation unit which preliminarily calculates a daily price string for the predetermined number of days after today based on the medium-term moving average price string for the predetermined number of days after today calculated backward from the medium-term Masuda future daily stick string generated by the medium-term Masuda future daily stick curve generating and drawing unit for the predetermined number of days after today;

short-term moving average price string preliminary-calculation unit which preliminarily calculates a short-term moving average price string for the predetermined number of days after today based on the daily price string calculated by the daily price string preliminary-calculation unit for the predetermined number of days after today;

stick color determination unit which determines a stick color of tomorrow's short-term Masuda future daily stick based on a result of a magnitude comparison between today's daily price and today's short-term moving average price and according to a predetermined rule; and short-term Masuda future daily stick string generating and drawing unit which draws a short-term Masuda future daily stick string for the predetermined number of days after today according to a predetermined rule and based on a result of determination as to whether or not stick colors of all of a predetermined number of sticks in the nearest days after today in the short-term Masuda future daily stick string calculated based on the short-term moving average price string obtained by the short-term moving average price string preliminary-calculation unit coincide with the stick color of tomorrow's short-term Masuda future daily stick determined by the stick color determination unit.

5. The Masuda stick chart generation and display apparatus according to claim 1, wherein the Masuda future stick curve generating and drawing unit further comprises long-term Masuda future daily stick string generating and drawing unit which generates and draws a long-term Masuda future daily stick string for a predetermined number of days after today on an extension line of a long-term Masuda daily stick curve for a predetermined number of days before today.

6. The Masuda stick chart generation and display apparatus according to claim 5, wherein the long-term Masuda future daily stick string generating and drawing unit further comprises:

change calculation unit which calculates a change per day on a straight line joining the today's long-term moving average price and the long-term moving average price a predetermined number of days earlier than today;

long-term moving average price string calculation unit which calculates a long-term moving average price string of daily sticks for a predetermined number of days after today based on the change per day calculated by the change calculation unit and on the today's long-term moving average price;

long-term Masuda future daily stick string drawing unit which generates and draws a long-term Masuda future daily stick string for a predetermined number of future days based on the long-term moving average price string for the predetermined number of future days calculated by the long-term moving average price string calculation unit; and correction unit which determines a divergence value string of divergences between a daily price of today and daily prices of days earlier, by the number of days in a long-term interval, than a predetermined number of near days, and corrects a long-term Masuda future daily stick string for the predetermined number of nearest days after today based on determination as to whether absolute values of the divergences exceed a predetermined value and according to a predetermined rule.

7. The Masuda stick chart generation and display apparatus according to claim 1, wherein the Masuda future stick curve generating and drawing unit further comprises Masuda future weekly stick string generating and drawing unit which generates and draws a short-term Masuda future weekly stick string, a medium-term Masuda future weekly stick string, and a long-term Masuda future weekly stick string for a predetermined number of future weeks.

8. The Masuda stick chart generation and display apparatus according to claim 7, wherein the Masuda future weekly stick string generating and drawing unit comprises:
   first polarity-of-divergence calculation unit which determines polarity of divergences between a weekly price of this week and weekly prices of weeks earlier, by the number of weeks in a short-term interval, than a predetermined number of weeks after this week;
   second polarity-of-divergence calculation unit which determines polarity of divergences between the weekly price of this week and weekly prices of weeks earlier, by the number of weeks in a medium-term interval, than a predetermined number of weeks after this week;
   stick color determination unit which determines stick color of a short-term future weekly stick of the next week according to a predetermined rule and based on a determination result of magnitude relationship between the weekly price of this week and the weekly price of a week earlier, by the number of weeks in the short-term interval, than the next week;
   short-term Masuda future weekly stick drawing unit which collates a series of polarity-of-divergence strings calculated by the first polarity-of-divergence calculation unit with typical patterns prepared in advance and draws short-term Masuda future weekly sticks for the predetermined number of weeks after this week based on results of the collation and according to a predetermined rule;
   medium-term Masuda future weekly stick drawing unit which draws medium-term Masuda future weekly sticks for the predetermined number of weeks after this week according to a predetermined rule and based on results of determination as to which polarity is greater in number, positive or negative, in a breakdown, by polarity, of divergences in the series of polarity-of-divergence strings calculated by the second polarity-of-divergence calculation unit; and
   long-term Masuda future weekly stick string drawing unit which calculates a change per week on a straight line joining this week's long-term moving average price and the long-term moving average price a predetermined number of weeks earlier than this week, calculates a long-term moving average price string for the predetermined number of weeks after this week based on the calculated change per week and this week's long-term moving average price, and generates and draws a long-term Masuda future weekly stick string for the predetermined number of weeks after this week based on the calculated long-term moving average price string.

9. A method using a Masuda stick chart generation and display apparatus for expressing price trends of objects traded on the market, such as stocks, bonds, currencies, and commodities, using three Masuda stick curves, namely, a short-term Masuda stick curve, a medium-term Masuda stick curve, and a long-term Masuda stick curve corresponding to daily sticks, weekly sticks, and monthly sticks, respectively, comprising:
   storing basic data in a basic data storing unit including a series of daily price strings, weekly price strings, and monthly price strings going back to a predetermined period from the present point in time, and a series of short-term moving average price strings, medium-term moving average price strings, and long-term moving average price strings related, respectively, to the series of daily price strings, weekly price strings, and monthly price strings, as well as a pair of neighboring average price strings which define upper and lower ends of daily sticks, weekly sticks, and monthly sticks, and stick color value strings which represent distinctions between dark and light colors for the daily sticks, weekly sticks, and monthly sticks;
   generating and drawing, by an automated programmed computer, short-term, medium-term, and long-term Masuda stick curves related to daily sticks, weekly sticks, or monthly sticks based on the basic data stored in the basic data storing unit via a Masuda stick curve generating and drawing unit; and
   generating and drawing, by an automated programmed computer, short-term, medium-term, and long-term Masuda future stick curves related to the daily sticks or weekly sticks based on the basic data stored in the basic data storing unit via a Masuda future stick curve generating and drawing unit,
   wherein the Masuda future stick curve generating and drawing unit comprises medium-term Masuda future daily stick curve generating and drawing unit which generates and draws a medium-term Masuda future daily stick string of a predetermined number of days after today,
   wherein the medium-term Masuda future daily stick curve generating and drawing unit comprises a first medium-term Masuda future daily stick string generating and drawing unit which, if a trend change in stick color value is detected with a first stick color value continuing for a predetermined number of times or more and then a second stick color value continuing for a predetermined number of times or more up to today in a medium-term Masuda daily stick curve for a predetermined number of most recent days,
   generates a medium-term Masuda future daily stick string for a predetermined number of days after today according to a predetermined rule corresponding to the detected trend;
   wherein the medium-term Masuda future daily stick curve generating and drawing unit comprises a second medium-term Masuda future daily stick string generating and drawing unit which determines a divergence value string of divergences between a daily price of today and daily prices of days earlier, by the number of days in a medium-term interval, than a predetermined number of future days, determines a breakdown of the divergence value string by polarity, and generates and draws a medium-term Masuda future daily stick string for a predetermined number of days after today based on determination as to which polarity a majority belongs and according to a predetermined rule.

10. A non-transitory computer readable medium storing a program causing a computer to generate and display a Masuda stick chart which expresses price trends of objects traded on the market, such as stocks, bonds, currencies, and commodities, using three Masuda stick curves, namely, a short-term Masuda stick curve, a medium-term Masuda stick curve, and a long-term Masuda stick curve corresponding to daily sticks, weekly sticks, and monthly sticks, respectively, comprising:
   storing basic data in a basic data storing unit including a series of daily price strings, weekly price strings, and monthly price strings going back to a predetermined period from the present point in time, and a series of short-term moving average price strings, medium-term moving average price strings, and long-term moving average price strings related, respectively, to the series of daily price strings, weekly price strings, and monthly price strings, as well as a pair of neighboring average price strings which define upper and lower ends of daily sticks, weekly sticks, and monthly sticks, and stick color value strings which represent distinctions between dark and light colors for the daily sticks, weekly sticks, and monthly sticks;

generating and drawing short-term, medium-term, and long-term Masuda stick curves related to daily sticks, weekly sticks, or monthly sticks based on the basic data stored in the basic data storing unit via a Masuda stick curve generating and drawing unit; and generating and drawing short-term, medium-term, and long-term Masuda future stick curves related to the daily sticks or weekly sticks based on the basic data stored in the basic data storing unit via a Masuda future stick curve generating and drawing unit, wherein the Masuda future stick curve generating and drawing unit comprises medium-term Masuda future daily stick curve generating and drawing unit which generates and draws a medium-term Masuda future daily stick string of a predetermined number of days after today, wherein the medium-term Masuda future daily stick curve generating and drawing unit comprises a first medium-term Masuda future daily stick string generating and drawing unit which, if a trend change in stick color value is detected with a first stick color value continuing for a predetermined number of times or more and then a second stick color value continuing for a predetermined number of times or more up to today in a medium-term Masuda daily stick curve for a predetermined number of most recent days, generates a medium-term Masuda future daily stick string for a predetermined number of days after today according to a predetermined rule corresponding to the detected trend;

wherein the medium-term Masuda future daily stick curve generating and drawing unit comprises a second medium-term Masuda future daily stick string generating and drawing unit which determines a divergence value string of divergences between a daily price of today and daily prices of days earlier, by the number of days in a medium-term interval, than a predetermined number of future days, determines a breakdown of the divergence value string by polarity, and generates and draws a medium-term Masuda future daily stick string for a predetermined number of days after today based on determination as to which polarity a majority belongs and according to a predetermined rule.

11. A Masuda stick chart generation and display apparatus which expresses price trends of objects traded on the market, such as stocks, bonds, currencies, and commodities, using three Masuda stick curves, namely, a short-term Masuda stick curve, a medium-term Masuda stick curve, and a long-term Masuda stick curve corresponding to daily sticks, weekly sticks, and monthly sticks, respectively, comprising:

a programmable computer processor;

basic data storing means for storing basic data including a series of daily price strings, weekly price strings, and monthly price strings going back to a predetermined period from the present point in time, and a series of short-term moving average price strings, medium-term moving average price strings, and long-term moving average price strings related, respectively, to the series of daily price strings, weekly price strings, and monthly price strings, as well as a pair of neighboring average price strings which define upper and lower ends of daily sticks, weekly sticks, and monthly sticks, and stick color value strings which represent distinctions between dark and light colors for the daily sticks, weekly sticks, and monthly sticks;

Masuda stick curve generating and drawing means for generating and drawing short-term, medium-term, and long-term Masuda stick curves related to daily sticks, weekly sticks, or monthly sticks based on the basic data stored in the basic data storing means;

and Masuda future stick curve generating and drawing means for generating and drawing short-term, medium-term, and long-term Masuda future stick curves related to the daily sticks or weekly sticks based on the basic data stored in the basic data storing means, wherein the Masuda future stick curve generating and drawing means comprises medium-term Masuda future daily stick curve generating and drawing means for generating and drawing a medium-term Masuda future daily stick string of a predetermined number of days after today, wherein the medium-term Masuda future daily stick curve generating and drawing means comprises a first medium-term Masuda future daily stick string generating and drawing means which, if a trend change in stick color value is detected with a first stick color value continuing for a predetermined number of times or more and then a second stick color value continuing for a predetermined number of times or more up to today in a medium-term Masuda daily stick curve for a predetermined number of most recent days, generates a medium-term Masuda future daily stick string for a predetermined number of days after today according to a predetermined rule corresponding to the detected trend;

wherein the medium-term Masuda future daily stick curve generating and drawing unit comprises a second medium-term Masuda future daily stick string generating and drawing unit which determines a divergence value string of divergences between a daily price of today and daily prices of days earlier, by the number of days in a medium-term interval, than a predetermined number of future days, determines a breakdown of the divergence value string by polarity, and generates and draws a medium-term Masuda future daily stick string for a predetermined number of days after today based on determination as to which polarity a majority belongs and according to a predetermined rule.

* * * * *